United States Patent
Yokokawa et al.

(10) Patent No.: US 10,999,500 B2
(45) Date of Patent: May 4, 2021

(54) IMAGING APPARATUS AND IMAGING METHOD, AND IMAGE PROCESSING APPARATUS AND IMAGE PROCESSING METHOD

(71) Applicant: SONY CORPORATION, Tokyo (JP)

(72) Inventors: Masatoshi Yokokawa, Kanagawa (JP); Takahiro Nagano, Kanagawa (JP); Masashi Uchida, Tokyo (JP); Hideyuki Ichihashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/484,289

(22) PCT Filed: Feb. 22, 2018

(86) PCT No.: PCT/JP2018/006421
§ 371 (c)(1),
(2) Date: Aug. 7, 2019

(87) PCT Pub. No.: WO2018/163843
PCT Pub. Date: Sep. 13, 2018

(65) Prior Publication Data
US 2020/0007760 A1  Jan. 2, 2020

(30) Foreign Application Priority Data
Mar. 8, 2017 (JP) .............................. JP2017-043806

(51) Int. Cl.
*H04N 5/232* (2006.01)
*H04N 9/04* (2006.01)
(Continued)

(52) U.S. Cl.
CPC .......... *H04N 5/23235* (2013.01); *G06T 5/50* (2013.01); *H04N 5/265* (2013.01); *G06T 2207/20216* (2013.01); *G06T 2207/20228* (2013.01)

(58) Field of Classification Search
None
See application file for complete search history.

(56) References Cited

U.S. PATENT DOCUMENTS

2011/0037835 A1    2/2011  Morino et al.
2012/0188408 A1*   7/2012  Nakaoka ................ H04N 5/232
                                                  348/231.99

(Continued)

FOREIGN PATENT DOCUMENTS

CN      102812712 A    12/2012
JP      2012-029194 A   2/2012

(Continued)

OTHER PUBLICATIONS

Feb. 14, 2020, European Search Report issued for related EP Application No. 18763793.9.

*Primary Examiner* — Mark T Monk
(74) *Attorney, Agent, or Firm* — Paratus Law Group, PLLC

(57) ABSTRACT

There is provided an imaging apparatus and an imaging method, and an image processing apparatus and an image processing method each capable of capturing a high resolution image by effectively using respective pixel signals of a plurality of pixels defined by pupil division immediately below a microlens. A disparity is detected in units of pupil on the basis of respective pixel values of a plurality of divided pixels defined by pupil division. The pixel values of the plurality of divided pixels are added in units of pupil to obtain an added pixel value. The pixel value of the divided pixel and the added pixel value are blended in units of (Continued)

divided pixel in accordance with the disparity. The present disclosure is applicable to an imaging apparatus.

19 Claims, 37 Drawing Sheets

(51) Int. Cl.
    *G06T 5/50*           (2006.01)
    *H04N 5/265*         (2006.01)

(56) References Cited

U.S. PATENT DOCUMENTS

| | | | |
|---|---|---|---|
| 2013/0016256 A1 | 1/2013 | Yahagi et al. | |
| 2014/0168484 A1* | 6/2014 | Suzuki | H04N 5/23212 348/246 |
| 2016/0006924 A1* | 1/2016 | Takao | G06T 7/13 348/353 |
| 2016/0088218 A1 | 3/2016 | Kikuchi et al. | |
| 2016/0165164 A1* | 6/2016 | Harada | H04N 5/3696 348/250 |

FOREIGN PATENT DOCUMENTS

| | | |
|---|---|---|
| JP | 2016-163169 A | 9/2016 |
| JP | 2016-163220 A | 9/2016 |

\* cited by examiner

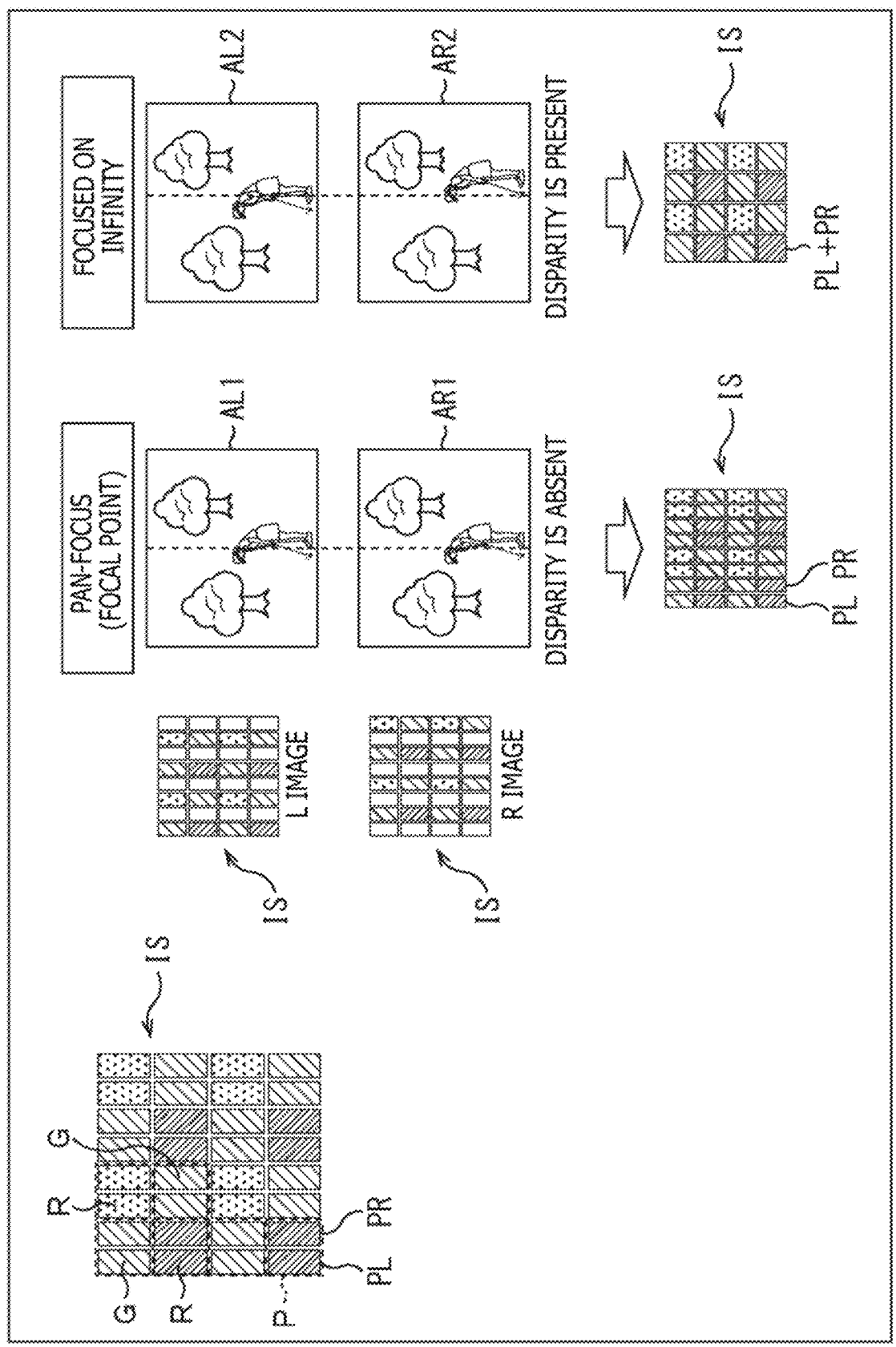

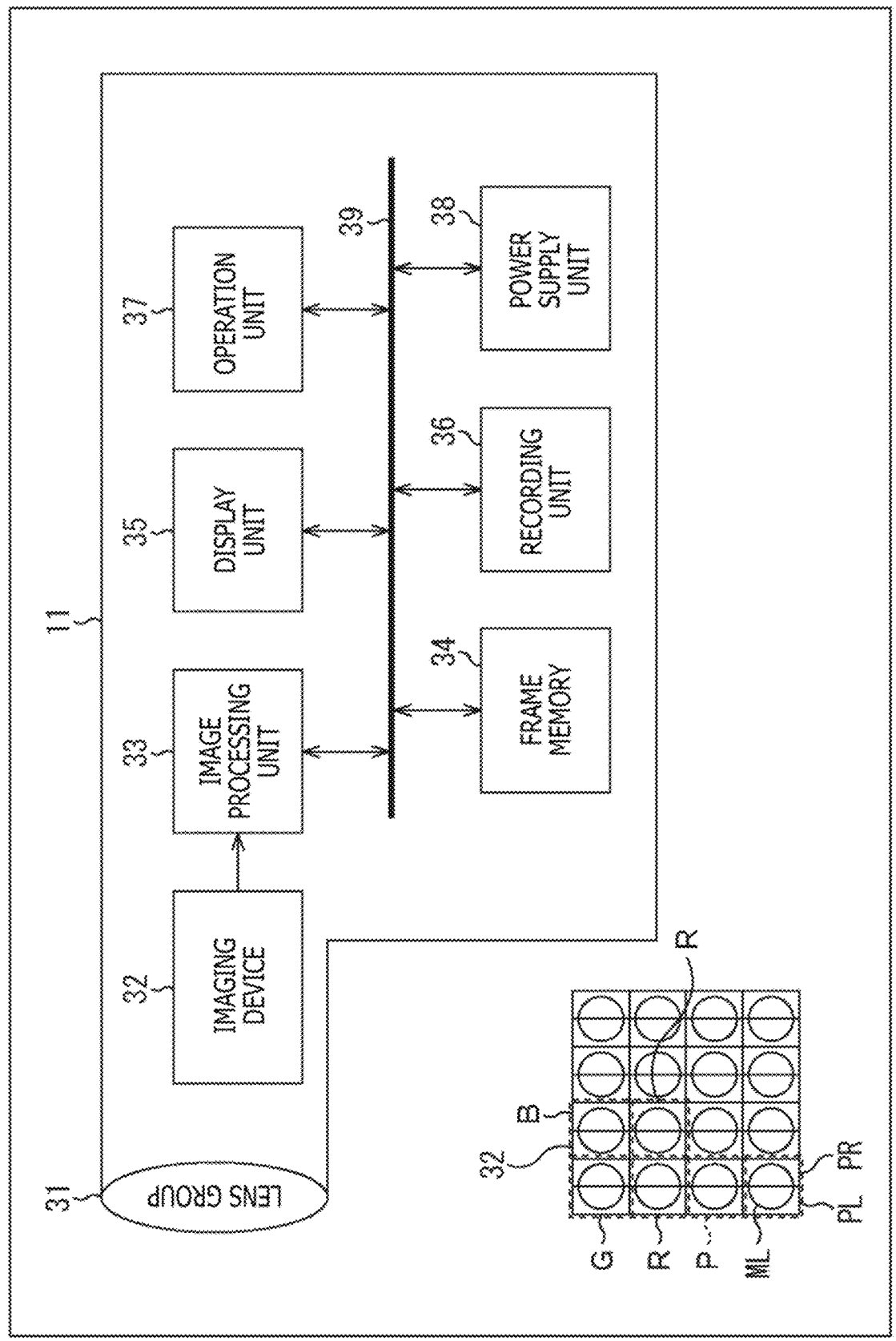

F I G. 1 3
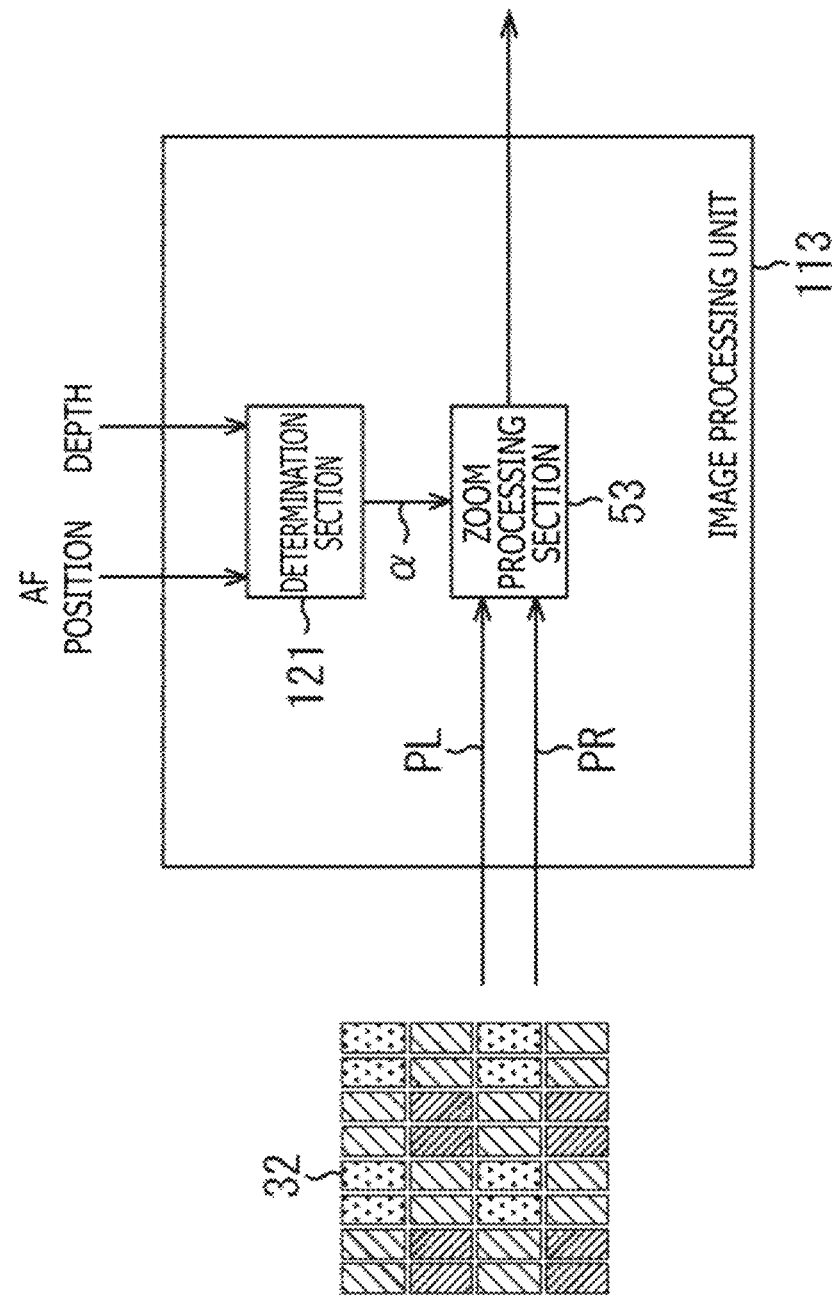

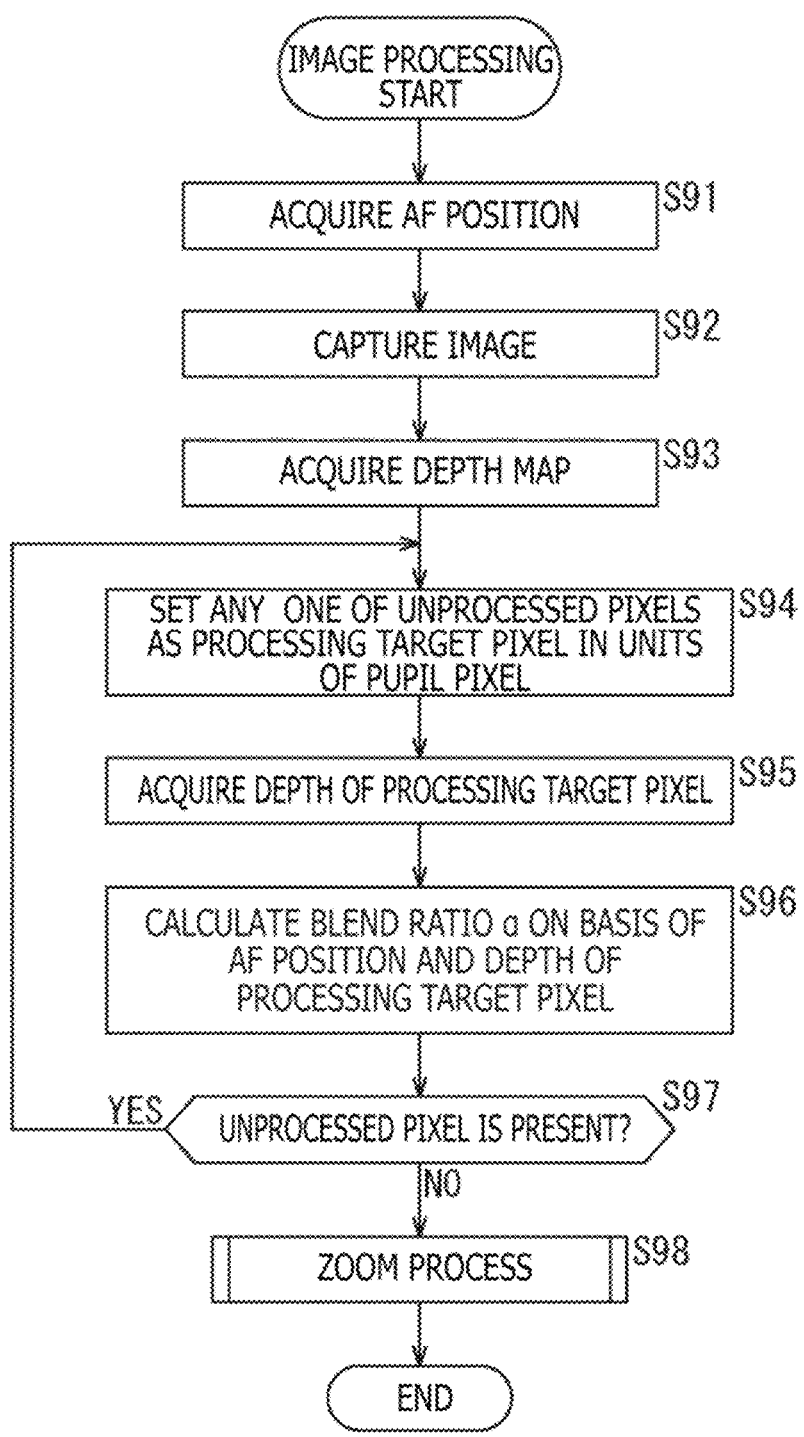

IMAGING APPARATUS AND IMAGING METHOD, AND IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2018/006421 (filed on Feb. 22, 2018) under 35 U.S.C. § 371, which claims priority to Japanese Patent Application No. 2017-043806 (filed on Mar. 8, 2017), which are all hereby incorporated by reference in their entirety.

TECHNICAL FIELD

The present disclosure relates to an imaging apparatus and an imaging method, and an image processing apparatus and an image processing method, and more particularly to an imaging apparatus and an imaging method, and an image processing apparatus and an image processing method each capable of capturing a high resolution image.

BACKGROUND ART

There has been proposed an imaging apparatus which defines a pair of left and right pixels immediately below one microlens by pupil division, and acquires disparity images using pixel values of the left and right pixels to measure a distance on the basis of the disparity images (see PTL 1).

According to the imaging apparatus described in PTL 1 identified above, a pixel signal corresponding to an average of pixel values of a plurality of pixels divided immediately below the microlens is used as a signal indicating a pixel value of one pixel constituting an image to be captured to generate the image to be captured.

CITATION LIST

Patent Literature

[PTL 1]
JP 2012-029194A

SUMMARY

Technical Problem

However, when an image is generated using the average of the pixel values of the left and right pixels as one pixel regardless of the presence or absence of a focal point on each of pixels of the imaging apparatus, only a blurred image with resolution lower than original resolution of a sensor may be acquired.

The present disclosure developed in consideration of these circumstances particularly achieves capture of a high resolution image by effectively using respective pixel signals of a plurality of pixels defined by pupil division immediately below a microlens.

Solution to Problem

An imaging apparatus according to an aspect of the present disclosure is an imaging apparatus including: an imaging device that includes a plurality of divided pixels defined by pupil division and captures an image; a disparity detection section that detects a disparity between the divided pixels in units of pupil; and a processing unit that performs processing for pixel values of the plurality of divided pixels defined by the pupil division, the processing being performed in units of pupil and in accordance with the disparity.

The processing unit may include: an addition section that calculates an average of pixel values of the plurality of divided pixels in units of pupil, and designates the average as an added pixel value; and a pixel value blend processing section that blends a pixel value of the divided pixel and the added pixel value in accordance with the disparity.

The imaging apparatus may further include a pixel value blend ratio calculation section that calculates a pixel value blend ratio for blending a pixel value of the divided pixel and the added pixel value in accordance with the disparity.

The pixel value blend processing section may blend a pixel value of the divided pixel and the added pixel value at the pixel value blend ratio calculated in accordance with the disparity.

The pixel value blend ratio calculation section may calculate a pixel value blend ratio which increases a proportion of the added pixel value as the disparity increases, and calculates a pixel value blend ratio which increases a proportion of the pixel value of the divided pixel as the disparity decreases.

The imaging device may include a first imaging device and a second imaging device. The first imaging device may include RGB pixels disposed in a predetermined color arrangement in units of pupil. The second imaging device may include only white pixels. The disparity detection section may include a first disparity detection section that detects a first disparity in units of pupil on the basis of a pixel value of each of the divided pixels captured by the first imaging device, and a second disparity detection section that detects a second disparity in units of pupil on the basis of a pixel value of each of the divided pixels captured by the second imaging device. The addition section may include a first addition section that adds pixel values of the plurality of divided pixels captured by the first imaging device in units of pupil to designate an average of the added pixel values as a first added pixel value, and a second addition section that adds pixel values of the plurality of divided pixels captured by the second imaging device in units of pupil to designate an average of the added pixel values as a second added pixel value. The pixel value blend processing section may include a first blend processing section that blends a pixel value of the divided pixel captured by the first imaging device and the first added pixel value in accordance with the first disparity, and a second blend processing section that blends a pixel value of the divided pixel captured by the second imaging device and the second added pixel value in accordance with the second disparity. The processing unit may include a luminance blend processing section that blends a first luminance of a pixel value blended by the first blend processing section and a second luminance of a pixel value blended by the second blend processing section.

The luminance blend processing section may blend the first luminance of the pixel value blended by the first blend processing section and the second luminance of the pixel value blended by the second blend processing section at a predetermined luminance blend ratio.

The imaging apparatus may further include a luminance blend ratio calculation section that calculates the luminance blend ratio on the basis of the first luminance and the second luminance.

The luminance blend ratio calculation section may include: a difference luminance blend ratio calculation section that calculates a difference luminance blend ratio on the basis of a difference between the first luminance and the second luminance; a dynamic range luminance blend ratio calculation section that calculates a dynamic range luminance blend ratio for the second luminance on the basis of a dynamic range obtained from a maximum value and a minimum value of peripheral pixels of each pixel; and a selection section that selects, as the luminance blend ratio, a smaller ratio from the difference luminance blend ratio and the dynamic range luminance blend ratio The imaging apparatus may further include: an optical unit that collects light that enters the imaging device in a stage preceding the imaging device; a focus controlling unit that controls a focal position at which the light is collected by controlling the optical unit, and outputs information associated with a position that is a reference of the focal position; and a depth detection unit that detects a depth and generates a depth map. The pixel value blend ratio calculation section may calculate a pixel blend ratio used for blending the added pixel value and a pixel value of the divided pixel in a region included in the depth map and having a depth substantially equivalent to a depth of the position on the basis of the depth map, the region being such a region where the disparity is considered to be substantially zero.

The processing unit may include an estimation section that estimates, on the basis of the disparity, a pixel value of the divided pixel from a sum of products of a coefficient of a predetermined numeral obtained by predetermined learning, and pixel values of respective pixels included in an estimation tap including a pixel group having a predetermined positional relationship with the divided pixel. The processing unit may output an estimation result received from the estimation section as a processing result obtained by processing in units of pupil in accordance with the disparity.

The imaging apparatus may further include: a classification section that classifies each of the divided pixels into a class on the basis of a class tap including a pixel group having a predetermined positional relationship with the divided pixel, and a disparity detected by the disparity detection section; and a coefficient set storage section that stores a coefficient set including a predetermined number of the coefficients for each of the classes. The estimation section may read the coefficient set corresponding to the class established by the classification section from the coefficient set storage section and estimate a pixel value of the divided pixel on the basis of a sum of products of respective coefficients of the coefficient set and pixel values of respective pixels included in an estimation tap that includes a pixel group having a predetermined positional relationship with the divided pixel.

The predetermined learning may be learning that uses a teacher image that includes a high resolution image, and a student image generated by warping the teacher image on the basis of the disparity in units of the pupil and lowering image quality of the teacher image, and determines a coefficient such that an error between a pixel value at a pixel position corresponding to the teacher image and a result of a sum of products of the coefficient of the predetermined numeral and pixel values of pixels included in an estimation tap including a pixel group having a predetermined positional relationship with each pixel of the student image becomes statistically minimum.

The imaging apparatus may further include a noise removal section that removes noise on the basis of the disparity from pixel values of the plurality of divided pixels processed by the processing unit on the basis of the disparity in units of pupil.

During zooming a part of the image, pixel values of pixels in a range for which the zooming may be designated include pixel values of the plurality of divided pixels defined by the pupil division and processed by the processing unit in units of pupil in accordance with the disparity.

The imaging device may include an image surface phase difference type imaging device.

The divided pixel of the imaging device may include a divided pixel defined by pupil division in a horizontal direction.

The imaging device may include a light field camera.

An imaging method according to an aspect of the present disclosure includes the steps of: detecting a disparity between a plurality of divided pixels of an imaging device that captures an image, the divided pixels included in the imaging device being defined by pupil division; and performing processing for pixel values of the plurality of divided pixels defined by the pupil division, the processing being performed in units of pupil and in accordance with the disparity.

An image processing apparatus according to an aspect of the present disclosure includes: an imaging device that includes a plurality of divided pixels defined by pupil division and captures an image; a disparity detection section that detects a disparity between the divided pixels in units of pupil; and a processing unit that performs processing for pixel values of the plurality of divided pixels defined by the pupil division, the processing being performed in units of pupil and in accordance with the disparity.

An image processing method according to an aspect of the present disclosure includes the steps of: detecting a disparity between a plurality of divided pixels of an imaging device that captures an image, the divided pixels included in the imaging device being defined by pupil division; and performing processing for pixel values of the plurality of divided pixels defined by the pupil division, the processing being performed in units of pupil and in accordance with the disparity.

According to an aspect of the present disclosure, a plurality of divided pixels defined by pupil division is provided to capture an image. A disparity between the divided pixels is detected in units of pupil. Processing corresponding to the disparity is performed in units of pupil for pixel values of the plurality of divided pixels defined by pupil division.

Advantageous Effect of Invention

According to an aspect of the present disclosure, a high resolution image can be captured by effectively using respective pixel signals of a plurality of pixels defined by pupil division immediately below a microlens.

BRIEF DESCRIPTION OF DRAWINGS

FIG. 1 is a diagram explaining an outline of an imaging apparatus according to the present disclosure.

FIG. 2 is a diagram explaining a configuration example of the imaging apparatus according to a first embodiment.

FIG. 13 is a diagram explaining a configuration example of an image processing unit in FIG. 12.

FIG. 14 is a flowchart explaining image processing performed by the image processing unit in FIG. 12.

DESCRIPTION OF EMBODIMENTS

Figure 3:
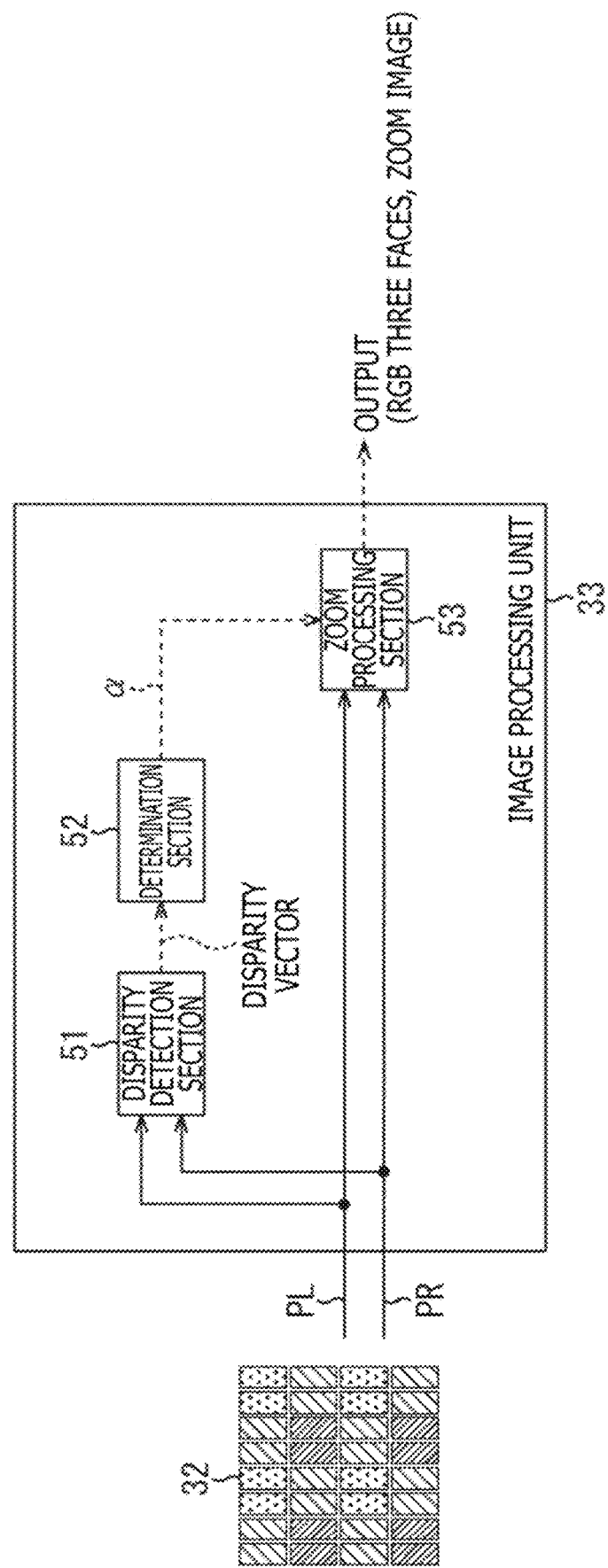
FIG. 3 is a diagram explaining a configuration example of an image processing unit in FIG. 1.

Preferred embodiments according to the present disclosure will be hereinafter described in detail with reference to the accompanying drawings. Note that constituent elements having substantially identical functional configurations in the present description and drawings are given identical reference signs, and the same description is not repeated.

Modes for carrying out the present disclosure (hereinafter referred to as embodiments) will be hereinafter described. Note that description will be made in a following order.
1. Outline of imaging apparatus of present disclosure
2. First Embodiment
2-1. First modified example of first embodiment
2-2. Second modified example of first embodiment
2-3. Third modified example of first embodiment
3. Second Embodiment
3-1. First modified example of second embodiment
3-2. Second modified example of second embodiment
3-3. Third modified example of second embodiment
3-4. Fourth modified example of second embodiment
4. Third Embodiment
5. Fourth Embodiment
6. Execution example by software 1. Outline of Imaging Apparatus of Present Disclosure An outline of an imaging apparatus to which a technology of the present disclosure has been applied will be initially touched upon before describing the imaging apparatus.

For example, the imaging apparatus according to the present disclosure includes a full image surface phase difference type imaging device as depicted in an upper left part of FIG. 1.

An imaging device IS of a full image surface phase difference type in the upper left part of FIG. 1 includes not-depicted microlenses (on-chip lenses) each constituting a unit indicated by a dotted line. RGB pixels are set in units of pixel P surrounded by a dotted line immediately below one microlens. The respective pixels in the upper left part of FIG. 1 are disposed in Bayer array.

In addition, each of the pixels P is divided into two parts in a horizontal direction by pupil division. Each of the pixels P includes divided pixels PL and PR.

Note that the pixel P set in units of one microlens surrounded by the dotted line within the imaging device IS in the upper left part of FIG. 1 will be hereinafter referred to as a pupil pixel P, while the divided pixels will be referred to as divided pixels PL and PR. Accordingly, the pupil pixel P includes a pair of the divided pixels PL and PR.

A pixel signal is output in units of divided pixels PL and PR. In this case, pixel signals of two pixels as the divided pixels PL and PR in the horizontal direction are obtained for the pupil pixel P covered by one microlens. Accordingly, distance measurement is achievable in units of pixel P on the basis of a phase difference between pixel values produced by a disparity between the divided pixels PL and PR.

The imaging device IS in the upper left part of FIG. 1 therefore can acquire a depth image (distance measurement image) in units of pupil pixel P.

In addition, in such an existing configuration, an average of the pixel values of the divided pixels PL and PR is calculated for each of the pupil pixels P, generates a common pixel signal in units of pupil pixel P, and generates an image using the pixel signal in units of pupil pixel P.

Meanwhile, in general, an image generated from the divided pixels PL and PR are substantially identical to each other in a case where the generated image is focused on a focal point. Deviation is produced in accordance with a disparity between the divided pixels PL and PR in a case where the generated image is focused not on the focal point, such as infinity.

More specifically, in a case of focusing on the focal point, an image AL1 generated from only a pixel signal of the divided pixel PL, and an image AR1 generated from only a pixel signal of the divided pixel PR are captured as depicted in an upper center part of FIG. 1.

In a case of the upper center part of FIG. 1, each of the images AL1 and AR1 is an image focused on the focal point, and therefore becomes an image identical to each other. Note that a dotted line is given to the center of each of the images AL1 and AR1 to check the presence or absence of deviation. A human playing golf is present substantially at the center of each of the images AL1 and AR1.

In contrast, in a case of focusing on infinity, an image AL2 generated from only a pixel signal of the divided pixel PL, and an image AR2 generated from only a pixel signal of the divided pixel PR are captured as depicted in an upper right part of FIG. 1.

In a case of the upper right part of FIG. 1, each of the images AL2 and AR2 becomes an image focused on infinity. Accordingly, deviation is produced in accordance with a disparity between the divided pixels PL and PR. Note that a dotted line is given to the center of each of the images AL2 and AR2 to check the presence or absence of deviation. A human playing golf is present substantially at the center of the image AL2, but is present at a position shifted toward the right in the image AR2.

Considering this difference, each of the divided pixels PR and PL forming the images AL1 and AR1 constitutes an image as an independent pixel signal as depicted in a lower center part of FIG. 1 in a case of focusing on the focal point. In this manner, the acquired image has resolution in the horizontal direction twice higher than resolution in the horizontal direction of an image generated from pupil pixels each including one pixel. Particularly when a zoom image is generated not by optical zoom but by what is called digital zoom which processes pixel signals, a high quality zoom image can be formed by using high resolution pixel signals.

On the other hand, in a case of focusing on infinity, the divided pixels PR and PL forming the images AL2 and AR2 constitute images at positions different from each other, and are impossible to use as an independent pixel signal for each. Accordingly, similarly to the existing case, an average of the pixel values of the divided pixels PL and PR is used as a common pixel value of the divided pixels PL and PR in units of pupil pixel to generate an image including pupil pixels each corresponding to one pixel as depicted in the lower right part of FIG. 1.

According to the imaging apparatus of the present disclosure provided on the basis of the foregoing principle, therefore, high resolution is achieved by independently using pixel signals in units of divided pixels PL and PR for pixels in a region close to a focal point within an image. For pixels in the other region, an average of the divided pixels PL and PR, which is calculated by adding (summing) the divided pixels PL and PR and dividing the sum by the number of pixels, is used as a common pixel signal in units of pupil pixel. As a result, a high resolution image can be captured by effectively using respective pixel signals of a plurality of divided pixels defined by pupil division immediately below a microlens.

2. First Embodiment

A configuration example of an imaging apparatus according to a first embodiment of the present disclosure will be next described with reference to a block diagram of FIG. 2. Note that a right part of FIG. 2 is a block diagram depicting a configuration example of the imaging apparatus according to the first embodiment of the present disclosure, while a left part of FIG. 2 is a front view of an imaging device 32 facing in an incident direction of incident light. As described above, the imaging apparatus in FIG. 2 captures a high resolution image by effectively using respective pixel signals of a plurality of divided pixels each defined by pupil division immediately below a microlens.

An imaging apparatus 11 in FIG. 2 includes an optical unit 31 including a lens group and others, and an imaging device 32 corresponding to the imaging device IS in FIG. 1 and including the pupil pixels P each of which includes the divided pixels PL and PR defined by pupil division immediately below a microlens ML and disposed in two-dimensional array. The imaging apparatus 11 also includes an image processing unit 33. The imaging apparatus 11 further includes a frame memory 34, a display unit 35, a recording unit 36, an operation unit 37, and a power supply unit 38. The image processing unit 33, the frame memory 34, the display unit 35, the recording unit 36, the operation unit 37, and the power supply unit 38 are connected to each other via a bus line 39.

The optical unit 31 receives incident light (image light) from an object and forms an image on an imaging surface of the imaging device 32. The imaging device 32 converts a light amount of the incident light of the image formed on the imaging surface by the optical unit 31 into an electric signal in units of pixel and outputs the electric signal as a pixel signal. As depicted in a left part of FIG. 2, the imaging device 32 includes the pupil pixels P disposed in array on the imaging surface. Each of the pupil pixels P converts a light amount of incident light into an electric signal in units of pixel and outputs the electric signal as a pixel signal.

The imaging device 32 further includes the microlens ML provided for each of the pupil pixels P and transmitting light in the incident direction of the incident light in units of pupil pixel P. Each of the microlenses ML collects light in units of pupil pixel P. The divided pixels PL and PR are provided immediately below each of the microlenses ML in the transmission direction of the incident light. A pair of the divided pixels PL and PR constitute the pupil pixel P. In addition, a not-depicted color filter of RGB is provided for each of the pupil pixels P. For example, the pupil pixels are disposed in Bayer array in units of 2 pixels×2 pixels. Note that color arrangement of pixels may be other arrangements.

The image processing unit 33 performs various types of image processing for a pixel signal output from the imaging device 32 and outputs the processed pixel signal. When performing the various types of image processing for the image signal output from the imaging device 32, the image processing unit 33 uses the frame memory 34 as necessary to store the image temporarily.

For example, the display unit 35 is a panel type display apparatus such as a liquid crystal panel and an organic EL (electro luminescence) panel and displays a moving image or a still image captured by the imaging device 32. The recording unit 36 records the moving image or still image captured by the imaging device 32 in a recording medium such as a hard disk and a semiconductor memory.

The operation unit 37 issues operation commands of various functions performed by the imaging apparatus 11 under operation by a user. The power supply unit 38 supplies various types of power to the image processing unit 33, the frame memory 34, the display unit 35, the recording unit 36, and the operation unit 37 as necessary, as operation power for these supply targets.

Note that the imaging apparatus 11 may be applied to various types of electronic equipment, such as an imaging apparatus like a digital still camera and a digital video camera, a cellular phone having imaging function, and other types of equipment having imaging function, for example.

<Configuration Example of Image Processing Unit in FIG. 2>

A configuration example of the image processing unit 33 will be next described with reference to a block diagram in FIG. 3.

The image processing unit 33 includes a disparity detection section 51, a determination section 52, and a zoom processing section 53.

The disparity detection section 51 detects a disparity between a pair of the divided pixels PL and PR constituting the pupil pixel P as a disparity vector on the basis of pixel signals of the divided pixels PL and PR and outputs the detected disparity vector to the determination section 52. More specifically, the disparity vector is an index indicating a disparity as deviation between the divided pixels PL and PR described above. The disparity between the divided pixels PL and PR on the pupil pixel P decreases with a high possibility of the focal point as the disparity vector becomes smaller. On the contrary, the disparity between the divided pixels PL and PR increases as the disparity vector becomes larger.

The determination section 52 calculates a blend ratio of a non-addition value to an added pixel value on the basis of the magnitude of the disparity vector and outputs the blend ratio to the zoom processing section 53. The non-added pixel value is a value obtained in a case where the divided pixels PL and PR are handled by the zoom processing section 53 as independent pixel signals in units of divided pixel, while the added pixel value is a value obtained in a case where a pixel signal is handled in units of pupil pixel P by replacing pixel values of the divided pixels PL and PR with an average of the pixel values of the divided pixels PL and PR added in units of pupil pixel P.

More specifically, the pupil pixel P having a smaller disparity vector is considered as a pixel having a smaller disparity and located closer to the focal point as described above. In this case, the pixel signals in units of divided pixels PL and PR used as independent non-added pixel values are high resolution pixel signals.

On the contrary, the pupil pixel P having a larger disparity vector is considered as a pixel having a larger disparity between the divided pixels PL and PR and not located close to the focal point. In this case, an average of pixel signals added in units of divided pixels PL and PR is calculated, and the pixel signals of the divided pixels PL and PR are replaced with the calculated average to use the average as an added pixel value equalized in units of pupil pixel P.

As described above, in a region near a focal point within an image, a high resolution image is generated by handling pixel signals as non-added pixel values independently used in units of divided pixels PL and PR.

On the other hand, in a region other than the focal point, the divided pixels PL and PR are each handled as an added pixel value, which is an average of the divided pixels PL and PR in units of pupil pixel P and replacement of the divided pixels PL and PR, to effectively use pixel signals in units of divided pixels PL and PR and generate a high resolution image without a breakdown.

Note that an image including independent pixel signals in units of divided pixels PL and PR will be hereinafter referred to as a divided pixel image. In addition, an image generated from pixel signals, each of which is obtained from an identical average of the divided pixels PL and PR as replacement of the image signals of the divided pixels PL and PR for each of the pupil pixels P, will be referred to as a pupil pixel image.

The pupil pixel image herein is generated from the identical pixel value corresponding to the average of the respective pixel values of the divided pixels PL and PR constituting the pupil pixel P as replacement of the pixel values of the divided pixels PL and PR. In this case, the substantially smallest pixel becomes the unit of the pupil pixel P. Accordingly, the divided pixel image becomes an image having substantially twice higher resolution in a horizontal direction than resolution in the horizontal direction of the pupil pixel image. However, resolution in a vertical direction is equivalent for both the pupil pixel image and the divided pixel image.

Accordingly, the determination section 52 calculates, in units of divided pixels PL and PR, a blend ratio for blending, in units of divided pixels PL and PR, on the basis of the magnitude of the disparity vector, the pixel signal of the pupil pixel image including the pixel signal as the average of the divided pixels PL and PR, and the pixel values of the pixel signals of the divided pixels PL and PR independently used without change. The determination section 52 outputs the calculated blend ratio to the zoom processing section 53.

The zoom processing section 53 performs demosaicing for respective pupil pixel images of RGB and also demosaicing for divided pixel images of RGB.

Thereafter, the zoom processing section 53 blends the divided pixel images of RGB and the pupil pixel images of RGB in units of divided pixels PL and PR at a blend ratio $\alpha$ ($0 \leq \alpha \leq 1$) which is a determination result from the determination section 52, and outputs the blended image as an RGB image and a zoom image. Note that a detailed configuration of the zoom processing section 42 will be described below with reference to FIG. 4. In a case where the blend ratio $\alpha$ is switched to 0 or 1, the divided pixel image of RGB and the pupil pixel image of RGB are completely switched in accordance with the value of the blend ratio $\alpha$. In addition, in a case where the blend ratio $\alpha$ varies in a range of 0 to 1, blending is performed such that the divided pixel image of RGB has a larger weight as the blend ratio $\alpha$ approaches 0, and on the contrary, such that the pupil pixel image of RGB has a larger weight as the blend ratio $\alpha$ approaches 1.

<Configuration Example of Zoom Processing Section in FIG. 3>

A configuration example of the zoom processing section 53 will be next described with reference to a block diagram of FIG. 4.

The zoom processing section 53 includes an addition section 71, a frame memory 72, demosaic processing sections 73-1 and 73-2, frame memories 74-1 and 74-2, and a blend processing section 75.

The addition section 71 adds pixel signals of the divided pixels PL and PR supplied from the imaging device 32 in units of divided pixel to calculate an average of the added pixel signals, replaces the pixel signals of the divided pixels PL and PR with the calculated average, and causes the frame memory 72 to store the pixel signal as replacement.

More specifically, the addition section 71 calculates an average of the pixel signals in units of divided pixels PR and PL and replaces the respective pixel signals of the divided pixels PR and PL with the calculated pixel signal. In other words, the addition section 71 converts the pixel signals of the divided pixels PR and PL into the average in units of pupil pixel to obtain a pixel signal in units of pupil pixel. Accordingly, in the RGB pupil pixel image which has an identical pixel signal for each pupil pixel, the divided pixels PL and PR has an identical pixel signal for each pupil pixel.

The demosaic processing section 73-1 performs a demosaic process for a divided pixel image including an independent pixel signal in units of divided pixels PL and PR and received from the imaging device 32, generates a divided pixel image for each of RGB, and causes the frame memory 74-1 to store the generated image.

The demosaic processing section 73-2 performs a demosaic process for a pupil pixel image including an identical average in units of pupil pixel P stored in the frame memory 72 as a pixel signal in units of divided pixels PL and PR, generates a pupil pixel image for each of RGB, and causes the frame memory 74-2 to store the generated pupil pixel image.

The blend processing section 75 blends the RGB divided pixel image and the RGB pupil pixel image stored in the frame memories 74-1 and 74-2 in units of divided pixel and at the blend ratio α supplied from the determination section 52, causes the frame memory 76 to store the blended image as an RGB image or a zoom image, and outputs the blended image at the time of generation of one frame image. The blend processing section 75 outputs all pixels blended in units of divided pixel in a case where zooming is not designated. The blend processing section 75 outputs only pixels within a designated range of zooming of all the pixels blended in units of divided pixel in a case where zooming is designated.

<Image Processing by Image Processing Unit in FIG. 3>

Figure 5:
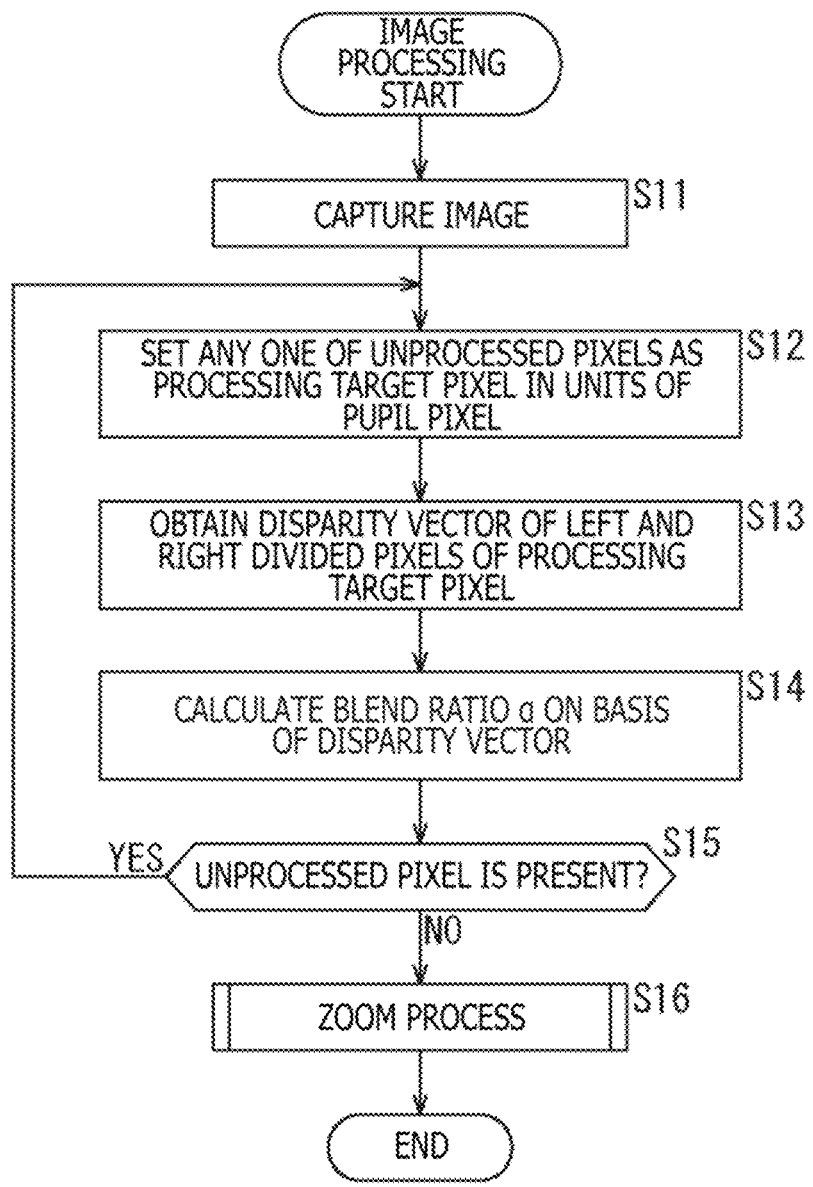
FIG. 5 is a flowchart explaining image processing performed by the image processing unit in FIG. 3.

Image processing performed by the image processing unit 33 in FIG. 3 will be next described with reference to a flowchart in FIG. 5.

In step S11, the imaging device 32 captures an image and outputs pixel signals of the captured image in units of divided pixel. In this manner, an image including pixel values in units of divided pixels PL and PR is input to the image processing unit 33.

In step S12, the disparity detection section 51 sets any one of unprocessed pixels as a processing target pixel in units of pupil pixel.

In step S13, the disparity detection section 51 obtains a disparity vector using the pixel values of the left and right divided pixels PL and PR constituting the pupil pixel P corresponding to the processing target pixel and outputs the obtained disparity vector to the determination section 52 as a disparity vector of the processing target pixel.

More specifically, the disparity detection section 51 calculates the disparity vector by ordinary optical flow estimation. Examples of methods using the ordinary optical flow estimation include a method using block matching, and KLT (Kanade Lucas-Tomasi) method.

Examples of the method using block matching include a method of searching a similar region in units of block using a cost value such as SSD (Sum of Squared Differences) defined by following Equation (1), and SAD (Sum of Absolute Differences) defined by following Equation (2).

[Math. 1]

$$\varepsilon = \int_w [J(x+d)-I(x)]^2 dx \qquad (1)$$

[Math. 2]

$$\varepsilon = \int_w |J(x+d)-I(x)|^2 dx \qquad (2)$$

In these equations, E is a cost value, w is a search region, J is a reference image, I is a standard image, x is a coordinate of a pixel corresponding to a processing target, and d is a displacement.

A disparity vector is obtained using two pixels constituting a similar region obtained in this manner.

For more details of KLT method, see Bruce D. Lucas and Takeo Kanade. An Iterative Image Registration Technique with an Application to Stereo Vision. International Joint Conference on Artificial Intelligence, pages 674-679, 1981., or Carlo Tomasi and Takeo Kanade. Detection and Tracking of Point Features. Carnegie Mellon University Technical Report CMU-CS-91-132, April 1991.

In step S14, the determination section 52 calculates the blend ratio α for blending pixel values of the pixel of the divided pixel image and the pixel of the pupil pixel image of the processing target pixel on the basis of the magnitude of the disparity vector of the processing target pixel and causes the zoom processing section 53 to store the calculated blend ratio α.

Figure 6:
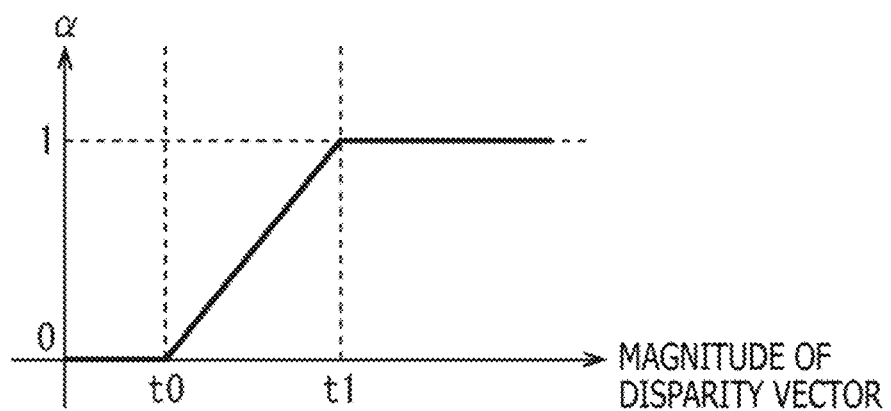
FIG. 6 is a diagram explaining a method of determining a blend ratio α based on a magnitude of a disparity vector.

The determination section 52 calculates the blend ratio α on the basis of the magnitude of the disparity vector using a relationship represented in FIG. 6, for example.

FIG. 6 represents a function which has a horizontal axis expressing the magnitude of the disparity vector and a vertical axis expressing the blend ratio α.

More specifically, the determination section 52 sets the blend ratio α to 0 when the magnitude of the disparity vector is smaller than a threshold t0. The determination section 52 sets the blend ratio α to a value proportional to the magnitude of the disparity vector in a range of 0 to 1 when the magnitude of the disparity vector ranges from the threshold t0 to a threshold t1. The determination section 52 sets the blend ratio α to 1 when the magnitude of the disparity vector is larger than the threshold t1. Note that the thresholds t1 and t2 may be set to any values. Accordingly, as depicted in FIG. 6, the determination section 52 decreases the blend ratio α as the magnitude of the disparity vector decreases. The determination section 52 increases the blend ratio α as the magnitude of the disparity vector increases.

In step S15, the disparity detection section 51 determines whether or not any pupil pixel remains unprocessed. The process returns to step S12 in a case where any pupil pixel remains unprocessed. More specifically, processing from step S12 to step S15 is repeated until no pupil pixel remains unprocessed. The blend ratio α is sequentially calculated in units of pupil pixel and stored in the blend processing section 75 of the zoom processing section 53.

In a case where no pupil pixel remains unprocessed in step S15, the process proceeds to step S16.

In step S16, the zoom processing section 53 executes a zoom process to generate a divided pixel image and a pupil pixel image using the divided pixels PL and PR, and then blends the divided pixel image and the pupil pixel image at the blend ratio α set in units of pupil pixel, and outputs the blended image to end the process.

Figure 4:
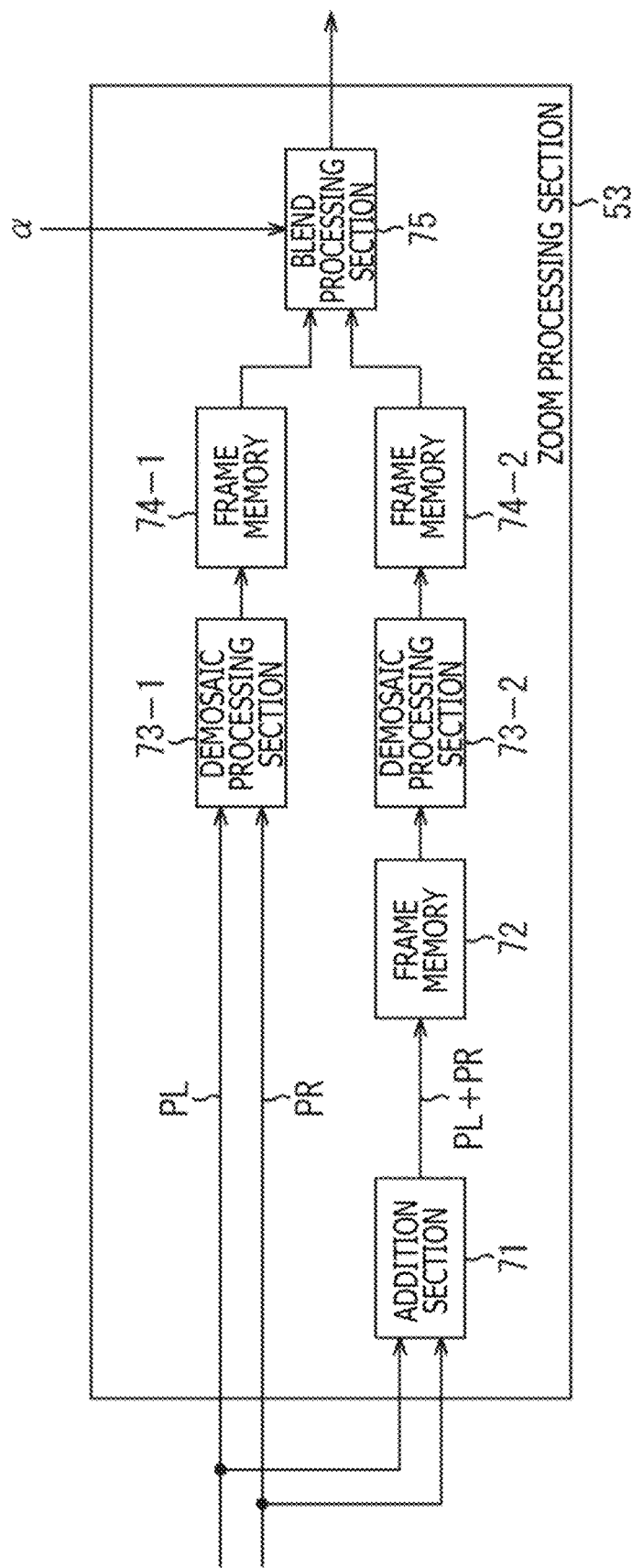
FIG. 4 is a diagram explaining a configuration example of a zoom processing section in FIG. 3.

<Zoom Process by Zoom Processing Section in FIG. 4>

Figure 7:
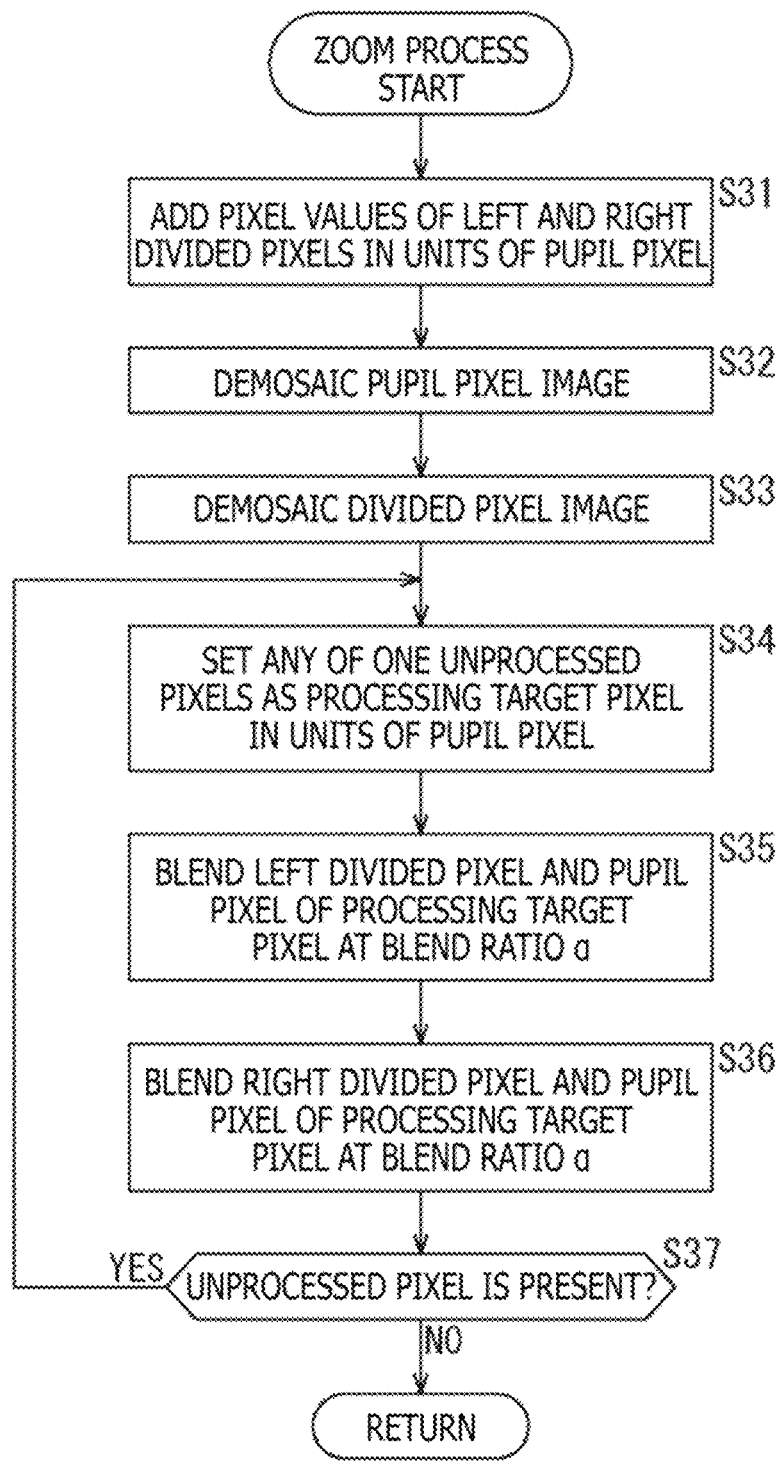
FIG. 7 is a flowchart explaining a zoom process performed by the zoom processing section in FIG. 4.

The zoom process performed by the zoom processing section 53 in FIG. 4 will be herein described with reference to a flowchart in FIG. 7.

In step S31, the addition section 71 adds pixel values of the left and right divided pixels PL and PR supplied from the imaging device 32 in units of pupil pixel to calculate an average of the pixel values, replaces the respective divided pixels PL and PR with the calculated average to generate a pupil pixel image, and causes the frame memory 72 to store the generated pupil pixel image. Note that the pupil pixel image has the pixel value corresponding to the average of the divided pixels PL and PR in units of pupil pixel P as described above. Accordingly, the divided pixels PL and PR of the pupil pixel image each have the same pixel value in units of pupil pixel P, but the pixel value itself is stored for each of the divided pixels PL and PR.

In step S32, the demosaic processing section 73-2 performs demosaicing for the pupil pixel image stored in the frame memory 72 in units of pupil pixel, generates a pupil pixel image of RGB, and causes the frame memory 74-2 to store the generated pupil pixel of RGB.

In step S33, the demosaic processing section 73-1 performs demosaicing for the divided pixel image in units of divided pixels PL and PR supplied from the imaging device 32, generates a divided pixel image of RGB, and causes the frame memory 74-1 to store the generated divided pixel image of RGB.

In step S34, the blend processing section 75 sets any one of unprocessed pixels as a processing target pixel in units of pupil pixel.

In step S35, the blend processing section 75 blends a pixel value of the left divided pixel PL corresponding to the pupil pixel P as the processing target pixel in the RGB divided pixel image, and a pixel value of the divided pixel PL constituting the pupil pixel P as the processing target pixel in the RGB pupil pixel image at the blend ratio α, and causes the frame memory 76 to store the blended pixel value as a pixel value of the left divided pixel of the processing target pixel. More specifically, the blend processing section 75 performs calculation of following Equation (3) and causes the frame memory 76 to store a blended result, for example.

$$\text{Image}_{out\_L} = \alpha \times \text{Image}_{COMB\_L} + (1-\alpha) \times \text{Image}_{DIV\_L} \quad (3)$$

In this equation, α is a blend ratio, $\text{Image}_{COMB\_L}$ is a pixel value of the left divided pixel PL corresponding to the pupil pixel P as the processing target pixel in the RGB pupil pixel image, $\text{IMAGE}_{DIV\_L}$ is the pixel value of the left divided pixel PL corresponding to the pupil pixel P as the processing target pixel in the RGB divided pixel image, and $\text{Image}_{out\_L}$ is a pixel value of the left divided pixel PL in the blended processing target pixel.

In step S36, the blend processing section 75 blends a pixel value of the right divided pixel PR corresponding to the pupil pixel P as the processing target pixel in the RGB divided pixel image, and a pixel value of the divided pixel PR constituting the pupil pixel P as the processing target pixel in the RGB pupil pixel image at the blend ratio α, and causes the frame memory 76 to store the blended pixel value as a pixel value of the right divided pixel of the processing target pixel. More specifically, the blend processing section 75 performs calculation of following Equation (4) and causes the frame memory 76 to store a blended result, for example.

$$\text{Image}_{out\_R} = \alpha \times \text{Image}_{COMB\_R} + (1-\alpha) \times \text{Image}_{DIV\_R} \quad (4)$$

In this equation, α is a blend ratio, $\text{Image}_{COMB\_R}$ is a pixel value of the right divided pixel PR corresponding to the pupil pixel as the processing target pixel in the RGB pupil pixel image, $\text{Image}_{DIV\_R}$ is the pixel value of the right divided pixel PR corresponding to the pupil pixel as the processing target pixel in the RGB divided pixel image, and $\text{Image}_{out\_R}$ is a pixel value of the right divided pixel PR in the blended processing target pixel.

In step S37, the blend processing section 75 determines whether or not any pupil pixel remains unprocessed. The process returns to step S34 in a case where any pupil pixel remains unprocessed. More specifically, similar processing is repeated until all the divided pixels PL and PR of the RGB divided pixel images and the RGB pupil pixel images are blended at the blend ratio α in units of pupil pixel.

Subsequently, the process proceeds to step S38 in a case where no pupil pixel is considered to remain unprocessed in step S37.

In step S38, the blend processing section 75 outputs the blended image stored in the frame memory 76. In this case, a range of the pixel signal output herein is switched in accordance with a zoom magnification and a zoom center position.

Figure 8:
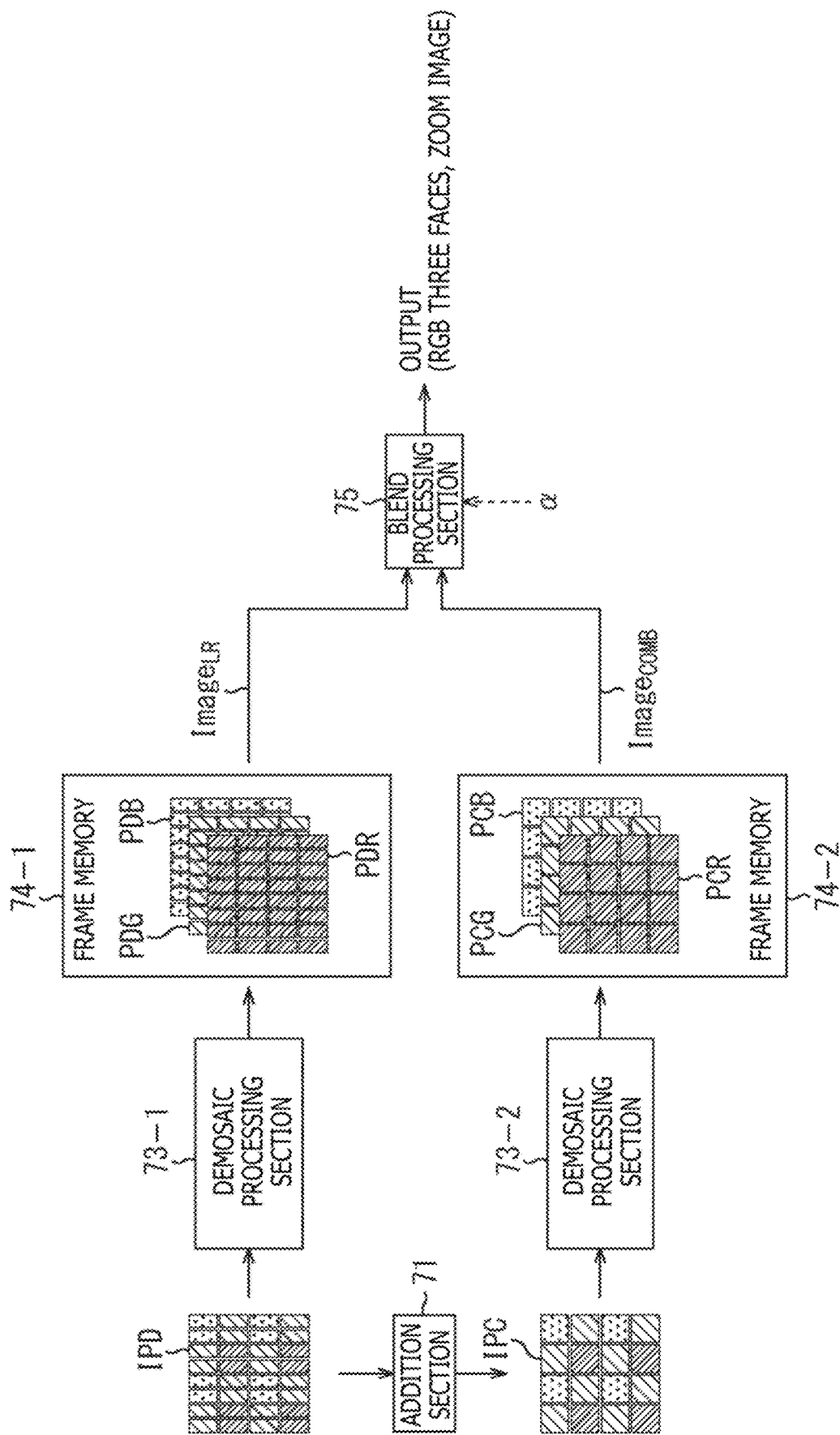
FIG. 8 is a flowchart explaining the zoom process performed by the zoom processing section in FIG. 4.

A process depicted in FIG. 8 is implemented by performing the foregoing process.

More specifically, as depicted in FIG. 8, the demosaic processing section 73-1 performs demosaicing for a divided pixel image IPD received from the imaging device 32 in units of divided pixel, and thus an R divided pixel image PDR, a G divided pixel image PDG, and a B divided pixel image PDB corresponding to RGB, respectively, are generated and stored in the frame memory 74-1.

On the other hand, the addition section 71 adds pixel signals of the divided pixels PL and PR in units of pupil pixel P in the divided pixel image IPD received from the imaging device 32, calculates an average of the added pixel signals, and replaces each of pixel values of the divided pixels PL and PR with the calculated average in units of pupil pixel to generate a pupil pixel image IPC.

Subsequently, the demosaic processing section 73-2 performs demosaicing for the pupil pixel image IPC in units of pupil pixel, and thus an R pupil pixel image PCR, a G pupil pixel image PCG, and a B pupil pixel image PCB corresponding to RGB, respectively, are generated and stored in the frame memory 74-2.

The blend processing section 75 further blends the pixel values of the divided pixels PL and PR in the pupil pixel image and the pixel values of the divided pixels PL and PR in the divided pixel image for each of RGB at the blend ratio α set in units of pupil pixel for the divided pixels PL and PR in units of pupil pixel, and outputs the blended images as output images OPR, OPG, and OPB each including the corresponding divided pixel image of RGB, respectively.

In a case where the magnitude of the disparity vector is small and considered to produce substantially no disparity herein, that is, in a case of a pupil pixel near the focal point, the blend ratio α is set to a small value as represented in FIG. 6. In this case, the second term of each of Equation (3) and Equation (4) described above becomes dominant. Accordingly, the blend ratio of the divided pixels PL and PR increases, wherefore higher resolution pixels can be produced.

On the other hand, in a case where the magnitude of the disparity vector is large, that is, in a case of a pupil pixel not located near the focal point, the blend ratio α is set to a large value. In this case, the first term in each of Equation (3) and Equation (4) described above becomes dominant, wherefore the blend ratio of the pupil pixel P increases.

Accordingly, an image region near the focal point within the image has high resolution, wherefore the image becomes an appropriately high resolution image generated by effectively using each of pixel signals of a plurality of divided pixels defined by pupil division immediately below the microlenses.

<2-1. First Modified Example of First Embodiment>

According to the case described above by way of example, in blending the divided pixel image and the pupil pixel image, the proportion of the divided pixel image is raised in a region near the focal point, while the proportion of the pupil pixel image is raised in the other region. However, a boundary between the region near the focal point and the other region may be viewed as noise irregularity due to a different S/N ratio (Signal to Noise Ratio). Accordingly, a noise removal section of an edge preservation type may be added as post processing for reducing noise irregularity.

Figure 9:
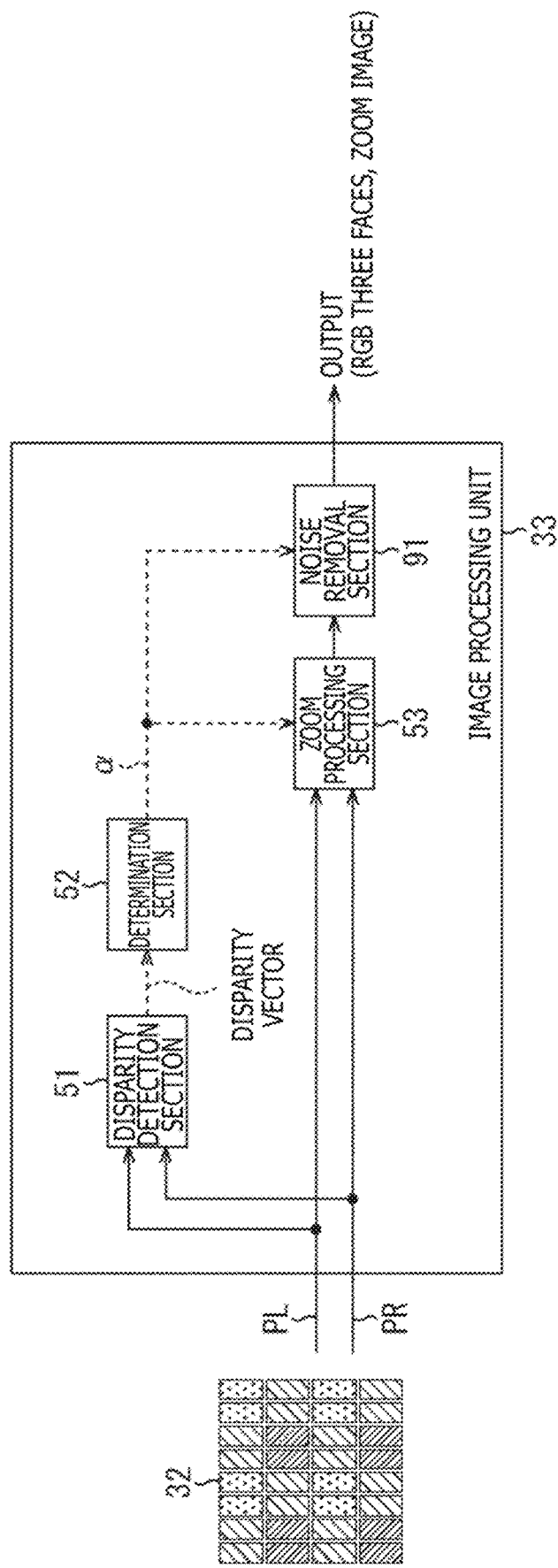
FIG. 9 is a diagram explaining a configuration example of an image processing unit according to a first modified example of the first embodiment.

FIG. 9 depicts a configuration example of the image processing unit 33 to which a noise removal section of an edge preservation type is added as post processing for reducing noise irregularity produced in the vicinity of the boundary between the region near the focal point and the other region.

The image processing unit 33 in FIG. 9 is different from the image processing unit 33 in FIG. 3 in a point that a noise removal section 91 is provided in a stage following the zoom processing section 53.

The noise removal section 91 is a bilateral filter which is defined by following Equation (5), for example, and removes noise in units of pixel by varying the level of noise removal applied to each pixel on the basis of an intensity parameter σ.

[Math. 3]

$$g(i, j) = \frac{\sum_n \sum_m f(i+m, j+n)w(m, n)}{\sum_n \sum_m w(m, n)} \quad (5)$$

$$w = w_{space} w_{color}$$

$$w_{space}(x, y) = \frac{1}{2\pi\sigma_{space}} \exp\left(-\frac{x^2 + y^2}{2\sigma_{space}^2}\right)$$

$$w_{color}(x, y) = \frac{1}{2\pi\sigma_{color}} \exp\left(-\frac{(f(i, j) - f(i+m, j+n))^2}{2\sigma_{color}^2}\right)$$

In this equation, f is a processing image of the zoom processing section 53 as an input image, i and j are center pixel positions, m and n are parameters each specifying a pixel position of a pixel having a predetermined positional relationship with a processing target pixel, and w is a filter coefficient. In addition, σ is an intensity parameter of noise removal. For example, σ becomes larger as dominance of a pixel signal of a divided pixel image increases at a smaller disparity, while σ becomes weaker and smaller as dominance of a pixel signal of a pupil pixel image increases at a larger disparity.

In a configuration using the bilateral filter of Equation (5), the intensity parameter σ increases to intensely perform noise removal in a case of the blend ratio α close to 0, i.e., in a case of a pixel in a region near the focal point. On the other hand, in a case of the blend ratio α close to 1, i.e., in a case of a pixel in a region not at the focal point, the intensity parameter σ decreases to weakly perform noise removal.

<Noise Removal Process>

Figure 10:
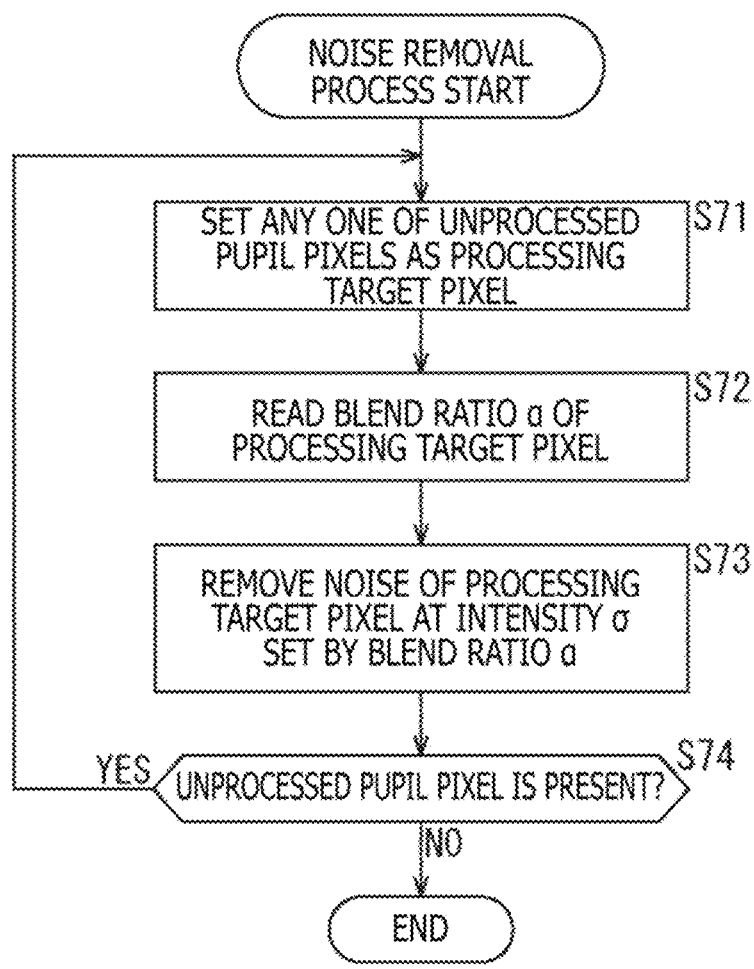
FIG. 10 is a flowchart explaining a noise removal process performed by the image processing unit in FIG. 9.

A noise removal process performed by the image processing unit 33 in FIG. 9 will be next described with reference to a flowchart in FIG. 10. Note that the noise removal process is a process performed after processing in step S16 in FIG. 5 described above, that is, a process performed after a divided pixel image and a pupil pixel image are blended at the blend ratio α by the zoom process. In addition, it is assumed that the blend ratio a calculated in processing in step S14 is also stored in units of pupil pixel in the noise removal section 91 in processing in step S14.

More specifically, in step S71, the noise removal section 91 sets any one of unprocessed pupil pixels as a processing target pixel.

In step S72, the noise removal section 91 reads the blend ratio α stored in association with the processing target pixel stored in the noise removal section 91.

In step S73, the noise removal section 91 removes noise from each of the divided pixels PL and PR constituting the processing target pixel at the intensity a corresponding to the value of the blend ratio α by performing calculation expressed in Equation (5) described above.

In step S74, the noise removal section 91 determines whether or not any pupil pixel remains unprocessed. In a case where any pupil pixel remains unprocessed, the process returns to step S71. In other words, processing from step S71 to step S74 is repeated until no pupil pixels is considered to remain unprocessed.

Subsequently, in a case where no pupil pixel remains unprocessed in step S74, i.e., in a case where noise removal from all the pupil pixels is considered to be completed, the process ends.

The process described above can reduce noise irregularity produced by a difference in S/N ratio (Signal to Noise Ratio) at the boundary between a region near the focal point and the other region.

<2-2. Second Modified Example of First Embodiment>

According to the example case described above, the focal point or not is determined using the disparity vector in units of pupil pixel. In a case of the focal point, the weight of the divided pixel image is raised in blending. In a case of other positions, the weight of the pupil pixel image is raised in blending. However, other methods may be adopted as long as the focal point or not can be determined.

Figure 11:
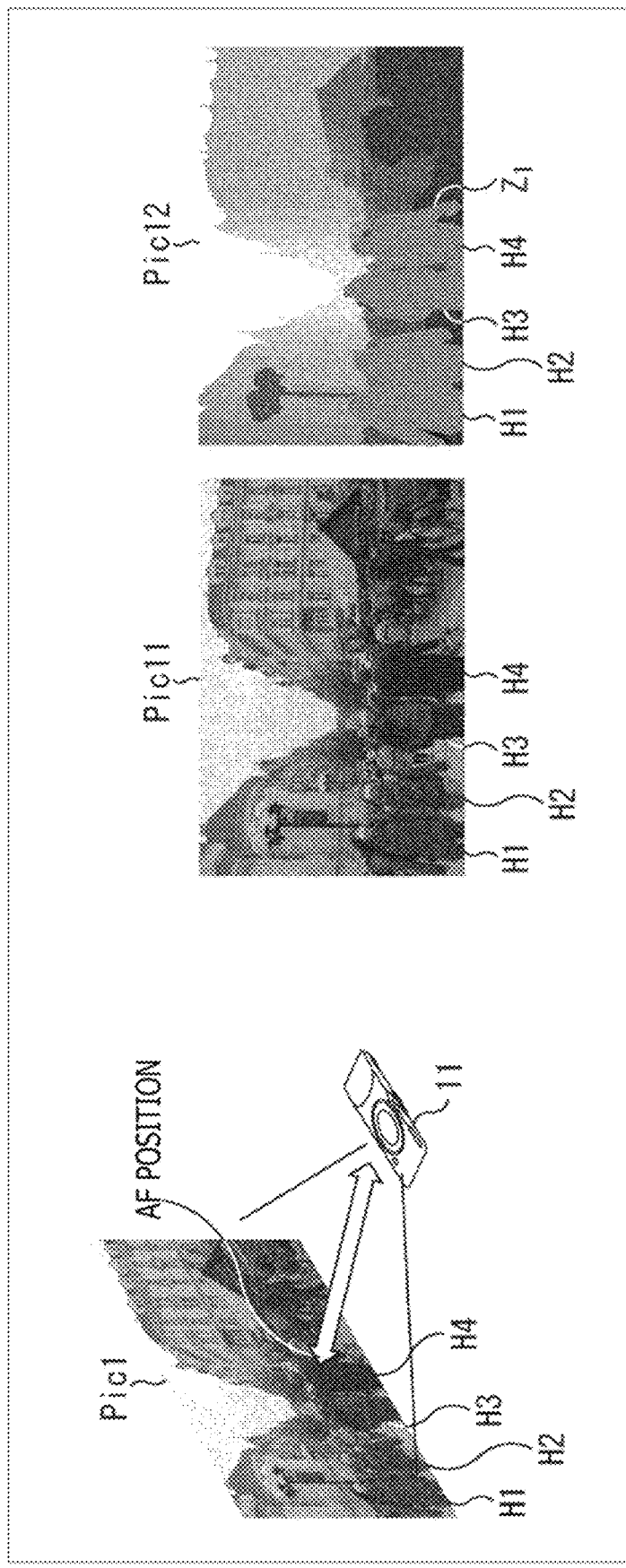
FIG. 11 is a view explaining an outline of an imaging apparatus according to a second modified example of the first embodiment.

For example, as depicted in a left part of FIG. 11, a position (AF position) corresponding to a reference of AF (Auto Focus) within an image Pic11 is obtained during capturing of an image Pic1 by the imaging apparatus 11. Simultaneously, as depicted in a right part in FIG. 11, an image Pic12 including a depth map corresponding to the image Pic11 is obtained by a depth estimation method such as TOF (Time Of Flight) and Structured Light. Subsequently, blending may be performed on the basis of the images Pic11 and Pic12, in such a manner that the weight of the pixel value of the divided pixel image is raised at the focal point located in a region identical to a depth of the AF position or a region at a depth close to this depth, and that the weight of the pixel value of the pupil pixel image is raised in the other region.

The image Pic11 in FIG. 11 depicts a case where humans H1 to H4 corresponding to objects are present on the front side. In this case, the human H4 is located at the AF position, for example. The depth map image Pic12 depicts such a case that a region Z1 including the humans H1 to H4 located substantially at the same depth of the depth of the human H4 present at the AF position in the image Pic11 is considered as the focal point, and that the other region is considered as a non-focal point. In this manner, appropriate blending of the pupil pixel image and the divided pixel image can be achieved by setting the blend ratio α to a value close to 0 in units of pupil pixel in the region Z1 considered as the focal point, and setting the blend ratio α to a value close to 1 in the other region.

<Configuration Example of Imaging Apparatus which Obtains Focal Point Using AF Position and Depth Map>

A configuration example of the imaging apparatus which obtains the focal point using the AF position and the depth map will be next described with reference to a block diagram of FIG. 12.

Figure 12:
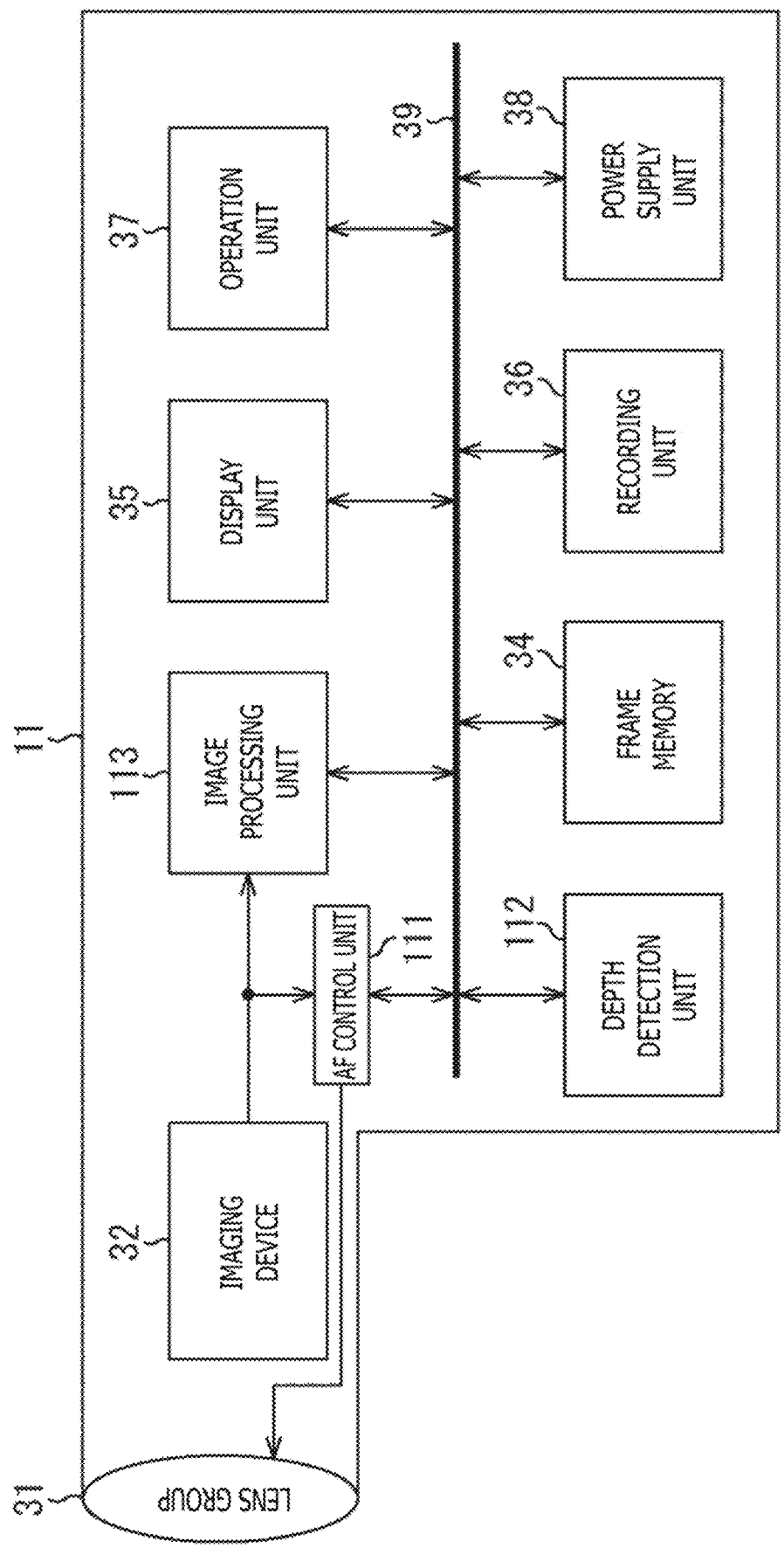
FIG. 12 is a diagram explaining a configuration example of an imaging apparatus according to a second modified example of the first embodiment.

The imaging apparatus 11 in FIG. 12 is different from the imaging apparatus 11 in FIG. 1 in points that an image processing unit 113 is provided in place of the image processing unit 33, and that an AF control unit 111 and a depth detection unit 112 are additionally provided.

The AF (Auto Focus) control unit 111 controls focus by controlling a focal position of the optical unit 31 on the basis of an image output from the imaging device 32 using contrast method, phase difference method, or a system utilizing an image surface phase difference between the divided pixels PL and PR or the like. In this case, the AF control unit 111 outputs, to the image processing unit 113, information associated with the AF position which indicates a position as a reference of the focus within the image.

The depth detection unit 112 generates a depth map in a range corresponding to an angle of view imaged by the imaging device 32 by TOF (Time of Flight) method, Structure Light method or the like and outputs the generated depth map to the image processing unit 113.

The image processing unit 113 calculates the blend ratio α on the basis of the AF position received from the AF control unit 111 and the depth map received from the depth detection unit 112 and executes the zoom process. Note that a detailed configuration of the image processing unit 113 will be described below with reference to FIG. 13.

<Configuration Example of Image Processing Unit in FIG. 12>

A configuration example of the image processing unit 113 will be next described with reference to a block diagram in FIG. 13.

The image processing unit 113 in FIG. 13 is different from the image processing unit 33 in FIG. 3 in a point that a determination section 121 is provided in place of the disparity detection section 51 and the determination section 52.

The determination section 121 obtains a depth at an AF position on the basis of an AF position received from the AF control unit 111 and a depth map received from the depth detection unit 112, sets the blend ratio α to 0 in units of pupil pixel in a range having a depth identical, or substantially identical to the obtained depth and considered as a focal point region, and sets the blend ratio α to 1 in the other region.

However, in the vicinity of the boundary between the region including the focal point corresponding to the AF position and the other region, noise may be produced by a sharp change of the blend ratio α. Accordingly, for example, for the pupil pixel in the vicinity of the boundary, the blend ratio α of the pupil pixel adjacent to the boundary may be set to 0.5, the blend ratio α of the pupil pixel on the focal point region side in the vicinity of the boundary may be gradually decreased in accordance with the distance from the boundary, and the blend ratio α of the pupil pixel in the region other than the focal point may be gradually increased in accordance with the distance from the boundary.

Alternatively, the blend ratio α may be set on the basis of the depth map in accordance with a depth difference between a region having a depth identical to or substantially identical to the depth of the AF position corresponding to the focal point and the other region.

<Image Processing by Image Processing Unit in FIG. 12>

Image processing performed by the image processing unit 33 in FIG. 12 will be next described with reference to a flowchart in FIG. 14.

In step S91, the AF control unit 111 controls AF by controlling the optical unit 31. In this case, the AF control unit 111 outputs an AF position to the image processing unit 113.

In step S92, the imaging device 32 captures an image and outputs the captured image to the image processing unit 113 in units of divided pixels PL and PR constituting the pupil pixel P.

In step S93, the depth detection unit 112 generates a depth map corresponding to an angle of view imaged by the imaging device 32 and outputs the depth map to the image processing unit 33.

In step S94, the determination section 121 of the image processing unit 113 sets any one of unprocessed pixels as a processing target pixel in units of pupil pixel.

In step S95, the determination section 121 acquires a depth of the processing target pixel using the depth map supplied from the depth detection unit 112.

In step S96, the determination section 121 calculates the blend ratio α on the basis of information associated with a depth at an AF position and the depth of the processing target pixel.

In step S97, the determination section 121 determines whether or not any pupil pixel remains unprocessed. The process returns to step S94 in a case where any pupil pixel remains unprocessed. More specifically, processing from step S94 to step S97 is repeated until no pupil pixel is considered to remain unprocessed, i.e., the blend ratios α are obtained for all the pupil pixels. Thereafter, the process proceeds to step S98 in a case where no unprocessed pupil pixel is considered to remain in step S97.

In step S98, the zoom processing section 53 executes the zoom process, blends a divided pixel image and a pupil pixel image at the blend ratio α in units of pupil pixel, and outputs the blended image. Note that the zoom process is similar to the process described with reference to the flowchart in FIG. 7, and therefore is not further explained.

Accordingly, the process described above can obtain the blend ratio α on the basis of the depth map detected by the depth detection unit 112 and the AF position received from the AF control unit 111. In this manner, the necessity of calculation for obtaining a disparity vector as described above is eliminated, wherefore resolution of an image region in the vicinity of the focal point within an image increases while reducing a calculation load. Accordingly, a high resolution image can be captured by effectively using respective pixel signals of a plurality of pixels defined by pupil division immediately below a microlens.

<2-3. Third Modified Example of First Embodiment>

According to the zoom process described above by way of example, each of the divided pixel image and the pupil pixel image is blended at the blend ratio α in units of divided pixel. However, a learning type zoom process, which estimates a pixel value to be obtained by the zoom process, may be implemented on the basis of a sum of products of coefficient sets obtained by learning beforehand, and pixel values of a plurality of pixels having a predetermined positional relationship with each pixel.

Figure 15:
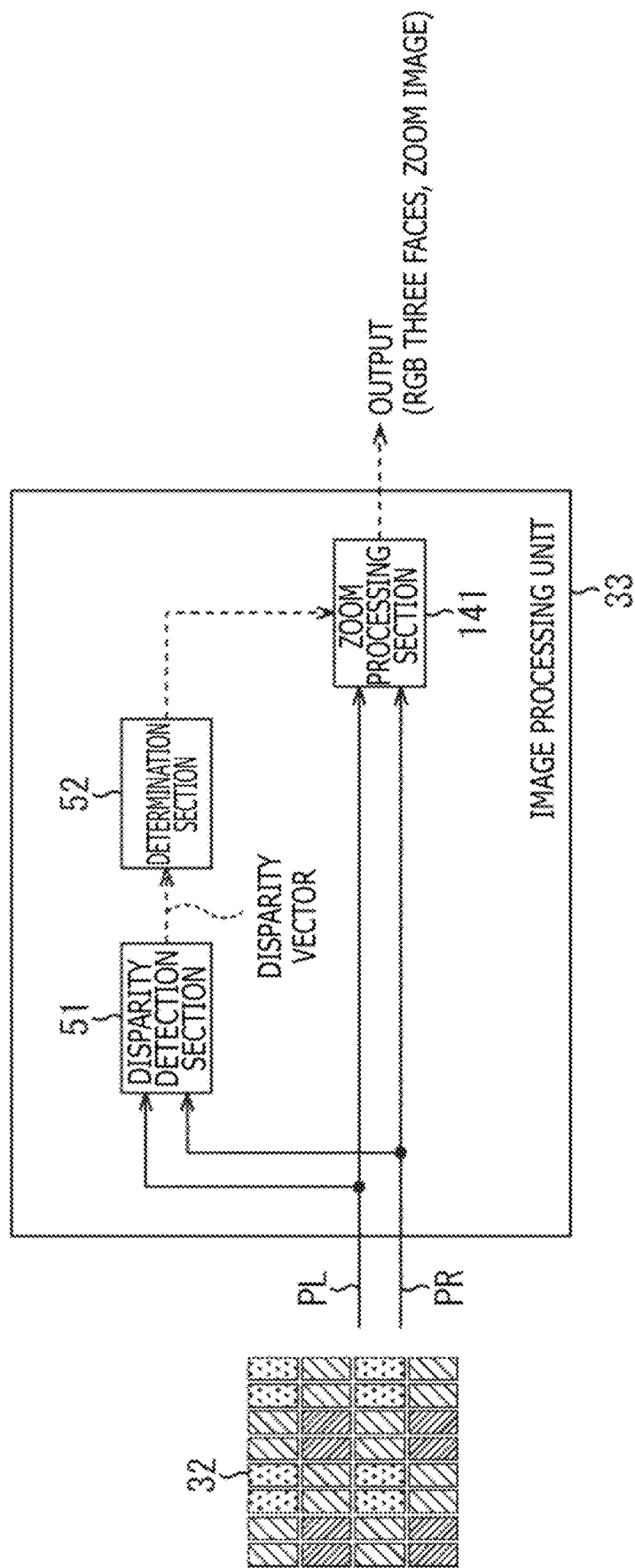
FIG. 15 is a diagram explaining a configuration example of an imaging apparatus according to a third modified example of the first embodiment.

FIG. 15 is a block diagram depicting a configuration example of the image processing unit 33 configured to implement a learning type zoom process.

The image processing unit 33 in FIG. 15 is different from the image processing unit 33 in FIG. 3 in a point that a zoom processing section 141 is provided in place of the zoom processing section 53.

The zoom processing section 141 stores coefficient sets obtained by learning beforehand and estimates a pixel value, which is to be obtained by the zoom process, on the basis of a sum of products of coefficients and pixel values of pixels having a predetermined positional relationship with each pixel in units of divided pixel. Note that a detailed configuration of the zoom processing section 141 will be described below with reference to FIG. 16.

<Configuration Example of Zoom Processing Section in FIG. 15>

Figure 16:
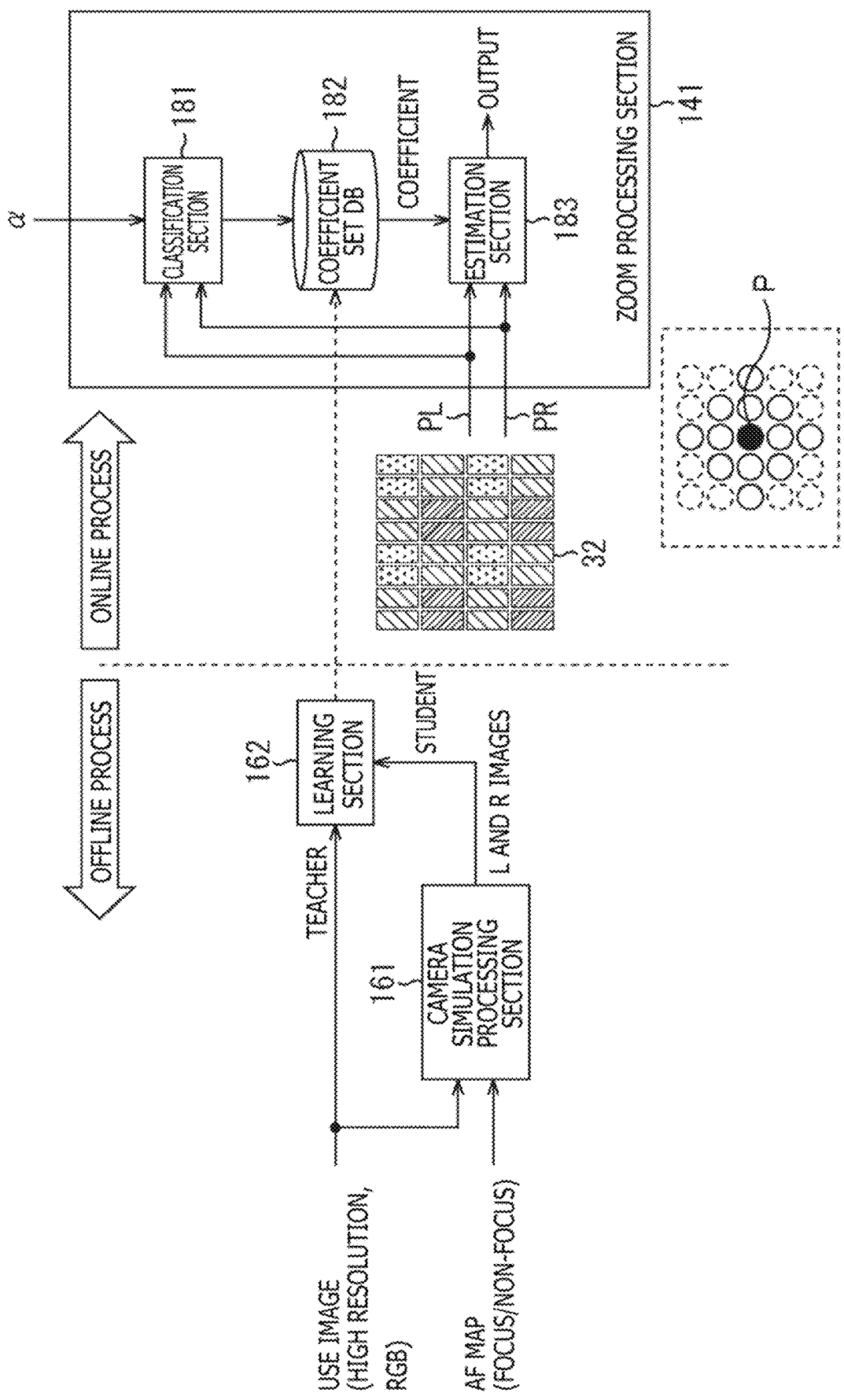
FIG. 16 is a diagram explaining a configuration example of a zoom processing section in FIG. 15.

A configuration example of the zoom processing section 141 in FIG. 15 will be next described with reference to a block diagram in FIG. 16. Note that a right part of FIG. 16 depicts a configuration example of the zoom processing section 141 in FIG. 15, while a left part of FIG. 16 is a diagram explaining learning by a coefficient set DB (database) 182 depicted in the right part of FIG. 16. In addition, a process performed by the zoom processing section 141 in the right part of the figure is an online process executed during imaging, while a process performed by a learning section 162 in the left part of the figure is an offline process executed before imaging.

As depicted in the right part of FIG. 16, the zoom processing section 141 includes a classification section 181, the coefficient set DB 182, an estimation section 183, and a frame memory 184.

The classification section 181 classifies processing target pixels into classes on the basis of pixel signals of the processing target pixels, and pixel signals of pixels having a predetermined positional relationship with the processing target pixels included in pixel signals supplied from the imaging device 32, and the blend ratio α, and outputs information associated with classes as classification results to the estimation section 183.

For example, assuming that round marks indicated in a lower right part of FIG. 16 are respective pixels of the imaging device 32, pixels having a corresponding positional relationship with a processing target pixel indicated by a black round mark are set as two pixels adjacent to the processing target pixel in each of the up-down direction and the left-right direction, and four pixels adjacent to the processing target pixels in the oblique directions, i.e., 12 pixels in total, for example. Note that a pixel group including 12 pixels having a predetermined positional relationship with a predetermined pixel as designated in the lower right part of FIG. 16 is referred to as a class tap of a processing target pixel as a group of pixels for classifying the processing target pixel.

For example, an adoptable method for this classification is ADRC (Adaptive Dynamic Range Coding) for quantizing a pixel value (of a pixel) of a class tap.

According to the method using ADRC, (pixel values of) pixels constituting a class tap are quantized, and a class of a processing target pixel is determined in accordance with ADRC codes obtained by the quantization.

More specifically, according to L-bit ADRC, a maximum value MAX and a minimum value MIN of pixel values of pixels constituting a class tap are detected, for example. Pixel values of respective pixels constituting the class tap are quantized into L bits on the basis of a dynamic range DR expressed by DR=MAX−MIN as a local dynamic range of a group of the pixels constituting the class tap. More specifically, the minimum value MIN is subtracted from the pixel values of the respective pixels constituting the class tap. A value obtained by the subtraction is divided by $DR/2^L$ (quantized).

Subsequently, the pixel values of the respective pixels of L bits constituting the class tap and obtained in the above manner are arranged in a predetermined order to generate a bit stream, and the bit stream thus generated is output as an ADRC code.

In this case, the blend ratio α of the pixel values of the divided pixels PL and PR to the pixel value of the pupil pixel including an average of the divided pixels PL and PR is further added as a feature value for each of the divided pixels PL and PR. Accordingly, when the blend ratio α has two values of 0 and 1, for example, a code including L+1 bits becomes a class code for classification into the ADRC code. In a case where the blend ratio α has 2 bits or more, a code having (L+1) bits or more becomes a class code.

The coefficient set DB 182 stores coefficient sets obtained by learning beforehand for each class established by the classification section 181.

The estimation section 183 reads a coefficient set set for a corresponding class from the coefficient set DB 182 on the basis of information associated with the class supplied from the classification section 181, and estimates and outputs a pixel value of a processing target pixel used for estimation on the basis of a sum of products of coefficients and pixel values of respective pixels constituting an estimation tap which is a pixel group having a predetermined positional relationship with the processing target pixel. More specifically, the estimation section 183 estimates the pixel value of the processing target pixel by calculation of following Equation (6), and stores the estimated pixel value in the frame memory 184.

[Math. 4]

$$X_{(i,j)} = \sum_{n}^{tanp\,num} w_{(i,j),n} \times x_{(i,j),n} \qquad (6)$$

In this equation, $X_{(i,j)}$ is a pixel value estimated as a processing target pixel, (i, j) is a coordinate of the processing target pixel, $x_{(i,j),n}$ is a pixel value of corresponding one of n pixel values constituting an estimation tap set in accordance with a pixel position of the processing target pixel, $w_{(i,j),n}$ is a coefficient multiplied by the pixel value of corresponding one of the n pixels constituting the estimation tap.

A coefficient set stored in the coefficient set DB 182 will be touched upon herein.

A coefficient set is obtained by a learning process which uses a teacher image and a student image. The teacher image is an ideal image as a high resolution image generated by a camera simulation processing section 161 and a learning section 162 depicted in a left part of FIG. 16. The student image is a pseudo image generated on the basis of the ideal image as the high resolution image.

More specifically, the camera simulation processing section 161 generates, from a high resolution image as an ideal image, an image including a disparity and estimated to be captured by warping on the basis of the divided pixels PL and PR using AF map information which indicates a distribution of focus or non-focus levels in accordance with degrees of deviation in disparity between respective pixels. The camera simulation processing section 161 further performs a quality lowering process such as a thinning process to generate a pseudo student image and outputs the generated student image to the learning section 162.

Note that the AF map is a map indicating a focus or non-focus level for each pupil pixel, i.e., a level of disparity. For example, the AF map may indicate a magnitude of a disparity vector, a depth difference value, or the blend ratio $\alpha$. Described herein by way of example is a case where the AF map is used as one-bit information that indicates a focal point or non-focal point on the assumption that the blend ratio $\alpha$ is 0 or 1.

The learning section 162 executes the learning process which uses the generated student image and the high resolution image as an ideal image to learn a coefficient set. In this case, for learning the coefficient set, the learning section 162 extracts pixels constituting a class tap from respective pixels of the student image in units of divided pixel to classify the respective pixels using the class tap. Note that the class tap used herein is identical to the class tap used by the classification section 181. Class codes are generated by the same method for classification in accordance with the class codes.

The learning section 162 further extracts respective pixel values of an estimation tap which includes a pixel group having a predetermined positional relationship with each pixel of the student image in units of divided pixel, and generates simultaneous equations (normal equations) based on a least-squares method for calculating, using the sum of products of the estimation tap and a coefficient as an unknown numeral, a coefficient minimizing an error between a result of the above-mentioned sum of products and the pixel value of the teacher image. The learning section 162 solves the simultaneous equations thus generated to determine a coefficient set. The learning section 162 stores the determined coefficient set in the coefficient set DB 182 in association with the class established by the class tap. Note that the estimation tap is identical to the estimation tap used by the estimation section 183.

<Learning Process>

Figure 17:
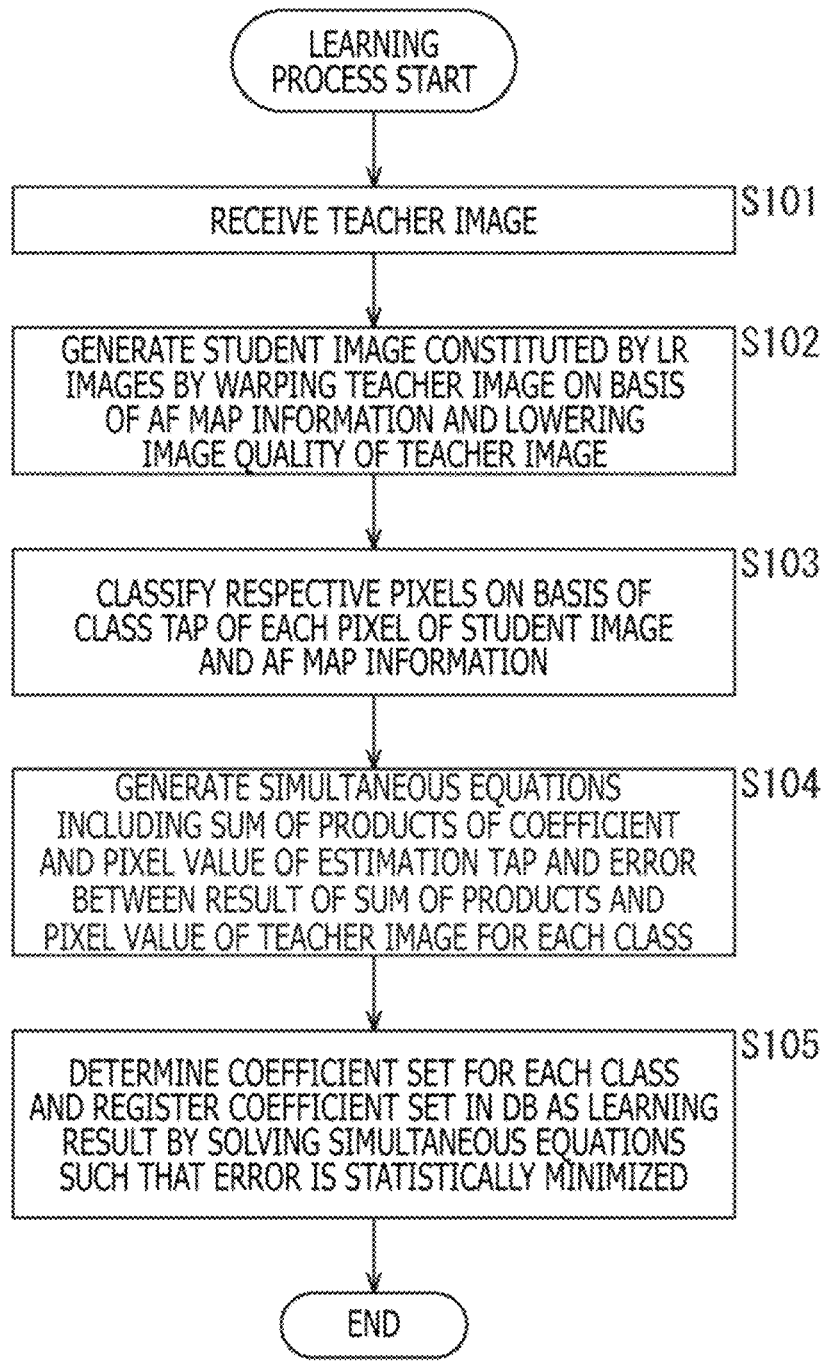
FIG. 17 is a flowchart explaining a learning process.

The learning process will be next described with reference to a flowchart in FIG. 17. Note that this process is an offline process performed prior to imaging by the imaging apparatus 11.

In step S101, the camera simulation processing section 161 and the learning section 162 receive input of a high resolution RGB divided pixel image, which is an ideal image, as a teacher image.

In step S102, the camera simulation processing section 161 generates images having various disparities from the divided pixels PL and PR by warping the teacher image using AF map information indicating focus or non-focus, and further performs a quality lowering process such as a thinning process to generate a plurality of student images from the divided pixels PL and PR and output the generated student images to the learning section 162.

In step S103, the learning section 162 generates class codes from pixel values of pixels constituting each class tap and the blend ratio $\alpha$ corresponding to the AF map information in units of divided pixel of each of the student images and achieves classification on the basis of the class codes.

In step S104, the learning section 162 generates simultaneous equations (normal equations) for each class on the basis of a sum of products of pixel values of pixels constituting an estimation tap and a coefficient as an unknown numeral for each of the pixels of the student images, and a relationship between the pixels of the student images and the pixel value of the pixel of the corresponding teacher image.

In step S105, the learning section 162 solves the generated simultaneous equations (normal equations) to determine a coefficient set including coefficients which statistically minimizes an error for each class, and stores the determined coefficient set in the coefficient set DB 182 in association with the class established using the class tap.

By performing the foregoing learning process, the learning section 162 can obtain a coefficient set for each class and cause the coefficient set DB 182 to store the obtained coefficient set in association with the corresponding class.

Accordingly, by performing the learning using an ideal image, which is a high resolution image, as a teacher image obtained by the zoom process, a coefficient set generating an ideal image as a high resolution image by the zoom process can be obtained beforehand for each class.

<Zoom Process by Zoom Processing Section in FIG. 16>

Figure 18:
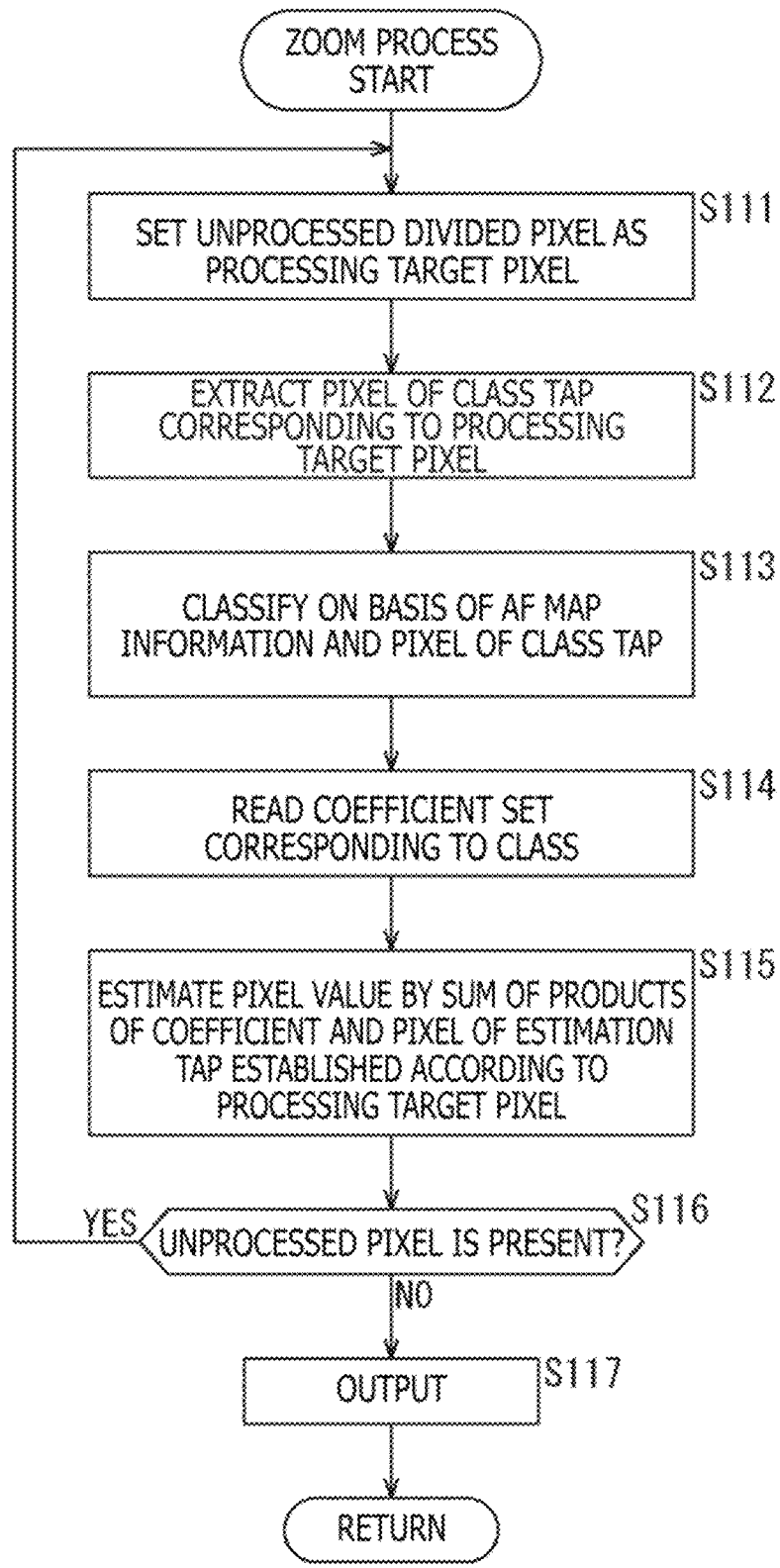
FIG. 18 is a flowchart explaining a zoom process performed by the zoom processing section in FIG. 15.

The zoom process performed by the zoom processing section 141 in FIG. 16 will be next described with reference to a flowchart in FIG. 18. Note that this process is an online process performed during imaging by the imaging apparatus 11.

In step S111, the classification section 181 sets an unprocessed pixel included in pixels output from the imaging device 32 in units of divided pixel as a processing target pixel.

In step S112, the classification section 181 extracts, as feature values, pixel values of respective pixels of a class tap including pixels having a predetermined positional relationship with the pixel position of the processing target pixel, and the blend ratio $\alpha$ as AF map information.

In step S113, the classification section 181 calculates class codes on the basis of the feature values of the processing target pixel, performs classification on the basis of the class codes, and supplies a classification result to the estimation section 183.

In step S114, the estimation section 183 reads, from the coefficient set DB 182, a coefficient set corresponding to the class of the processing target pixel indicated by the classification result.

In step S115, the estimation section 183 reads pixel values of pixels constituting an estimation tap in correspondence with the processing target pixel, estimates a pixel value of the processing target pixel on the basis of a sum of products of the read pixel values and the respective coefficients of the coefficient set, and stores the estimated pixel value in the frame memory 184.

In step S116, the classification section 181 determines whether or not any divided pixel remains unprocessed. The process returns to step S111 in a case where any divided pixel remains unprocessed. In other words, processing from step S111 to step S116 is repeated until estimation of pixel values of all the divided pixels after the zoom process is completed.

Subsequently, when estimation of pixel values of all the divided pixels after the zoom process is completed in step S116, the process proceeds to step S117.

In step S117, a pixel signal constituting an image stored in the frame memory 184 and subjected to the zoom process is output.

The process described above can perform classification using class codes based on the class tap, read a coefficient set corresponding to the established class from coefficient sets obtained beforehand by the learning process for each class, and estimate pixel values of respective pixels obtained by the zoom process on the basis of a sum of products of the coefficient set and pixel values of pixels constituting the estimation tap. Note that the class tap and the estimation tap may be identical to each other for the processing target pixel, or different taps.

As a result, a high resolution image can be captured by effectively using respective pixel signals of a plurality of pixels defined by pupil division immediately below a microlens.

3. Second Embodiment

While the configuration example of the imaging apparatus 11 which includes the one imaging device 32 has been described above, the imaging apparatus 11 may include the two imaging devices 32.

Figure 19:
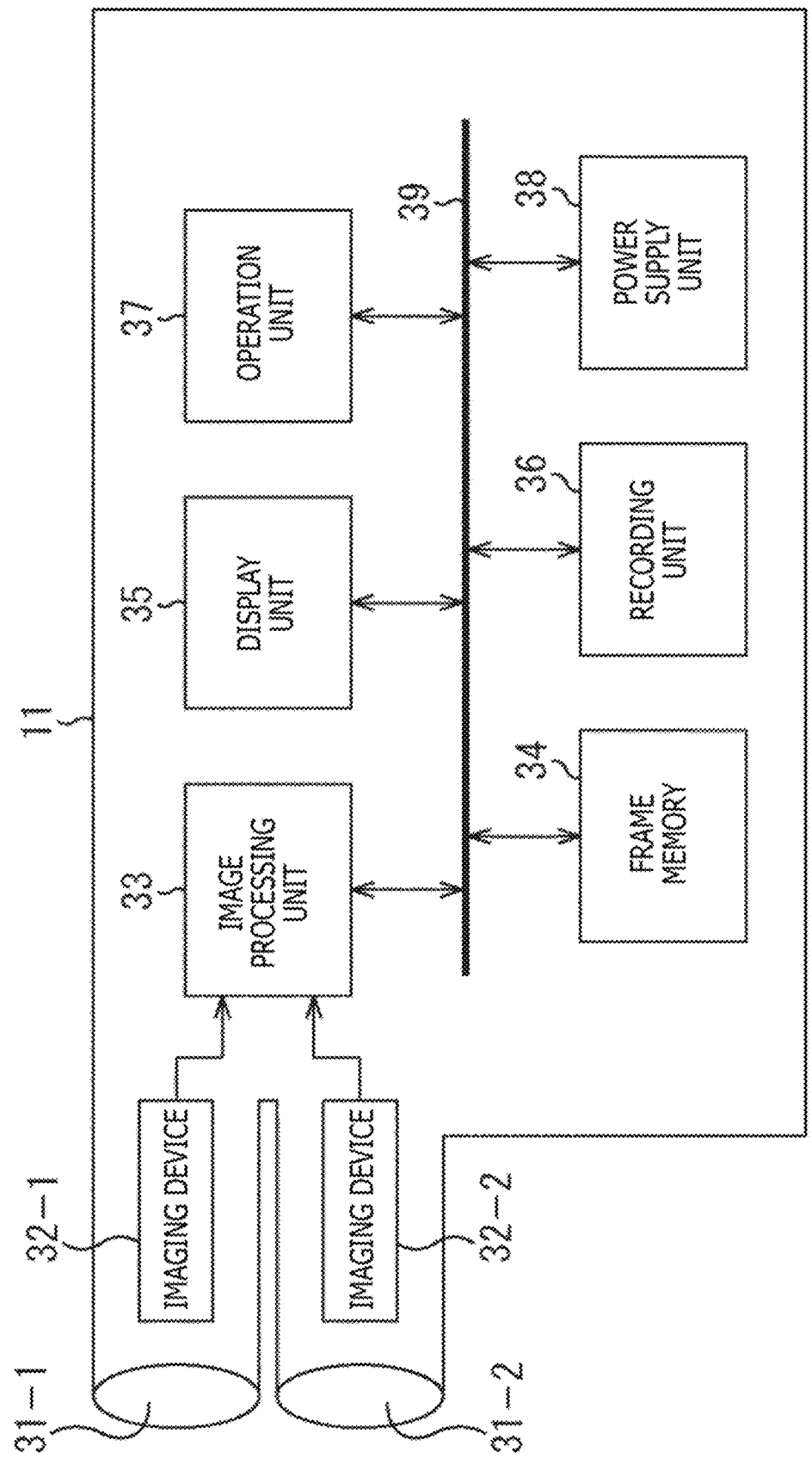
FIG. 19 is a diagram explaining a configuration example of an imaging apparatus according to a second embodiment.

FIG. 19 depicts a configuration example of the imaging apparatus 11 which includes the two imaging devices 32.

More specifically, the imaging apparatus 11 in FIG. 19 is different from the imaging apparatus 11 in FIG. 2 in points that the imaging device 32 includes two imaging devices 32-1 and 32-2, that the optical unit 31 includes two optical units 31-1 and 31-2 accordingly, and that an image processing unit 191 is provided in place of the image processing unit 33.

In this case, the imaging device 32-2 does not have a color filter and detects a pixel signal whose pixels are all white (also referred to as white and black pixels or BW (Black & White) pixels), in other words, a pixel signal including luminance values.

Each of the imaging devices 32-1 and 32-2 outputs a captured image to the image processing unit 191.
<Configuration Example of Image Processing Unit in FIG. 19>

A configuration example of the image processing unit 191 in FIG. 19 will be next described with reference to FIG. 20.

The image processing unit 191 includes L-R addition sections 201-1 and 201-2, a disparity detection section 202, a warp processing section 203, disparity detection sections 204-1 and 204-2, determination sections 205-1 and 205-2, zoom processing sections 206-1 and 206-2, and a fusion processing section 207.

The L-R addition sections 201-1 and 201-2 each add the divided pixels PR and PL supplied from the imaging devices 32-1 and 32-2, respectively, to calculate an average of the added pixels, and outputs the calculated average to the disparity detection section 202. More specifically, the L-R addition sections 201-1 and 201-2 calculates, as an addition value, the average of the respective pixel values of the divided pixels PR and PL supplied from the imaging devices 32-1 and 32-2, respectively, and outputs the calculated average to the disparity detection section 202 as a pixel signal in units of pupil pixel.

The disparity detection section 202 has a function identical to the function of the disparity detection section 51 in FIG. 2. However, the disparity detection section 202 herein obtains not the divided pixels PL and PR, but a disparity vector of the pixel P in units of pupil pixel for each of the imaging devices 32-1 and 32-2, and outputs the obtained disparity vectors to the warp processing section 203. More specifically, a disparity is produced between the imaging devices 32-1 and 32-2 having different optical axes, wherefore a disparity vector corresponding to the produced disparity is obtained and supplied to the warp processing section 203.

The warp processing section 203 warps the pixel signal in units of divided pixels supplied from the imaging device 32-1 in a visual line direction identical to a visual line direction of the imaging device 32-2 on the basis of information associated with the disparity vector received from the disparity detection section 202 and outputs the warped pixel signal to the disparity detection section 204-1. This process thus compensates for the disparity of images captured by the respective imaging devices 32-1 and 32-2 and allows the respective images to be handled as images of an identical visual line. Note that the warp process may be performed such that the divided pixel signal of the image captured by the imaging device 32-2 is matched with the visual line direction of the image captured by the imaging device 32-1. However, it is more advantageous to perform warp such that the pixel signal of the imaging device 32-2 including a pixel signal in Bayer array is matched with the pixel signal of the imaging device 31-1 in view of resolution and difficulty in recognition of deviation of disparity.

The disparity detection sections 204-1 and 204-2, the determination sections 205-1 and 205-2, and the zoom processing sections 206-1 and 206-2 are similar to the disparity detection section 51, the determination section 52, and the zoom processing section 53 in FIG. 3, respectively, wherefore the same description is not repeated. Note that blend ratios output from the determination sections 205-1 and 205-2 are expressed as α1 and α2, respectively, for distinction in FIG. 20.

The fusion processing section 207 performs blending at a blend ratio based on noise intensity and a difference between luminance Y obtained from an RGB divided pixel image supplied from the imaging device 32-1 and luminance W supplied as a pixel signal of a white pixel from the imaging device 32-2. Note that a configuration example of the fusion processing section 207 will be described in detail below with reference to FIG. 21.
<Configuration Example of Fusion Processing Section>

A configuration example of the fusion processing section 207 will be next described with reference to FIG. 21.

The fusion processing section 207 includes a signal conversion section 221, a blend processing section 222, a signal conversion section 223, a frame memory 224, and a blend ratio calculation section 225.

The signal conversion section 221 converts a pixel signal into luminance Y and color difference signals U and V in units of divided pixel on the basis of an RGB divided pixel image supplied from the zoom processing section 206-1 and outputs the luminance Y to the blend processing section 222 and the blend ratio calculation section 225, and the color difference signals U and V to the signal conversion section 223.

The blend processing section 222 blends the luminance Y of the divided pixel image generated on the basis of an RGB divided pixel image supplied from the signal conversion section 221, and the luminance W as a pixel value obtained from a divided pixel image of white pixels supplied from the imaging device 32-2 at a blend ratio R supplied from the blend ratio calculation section 225, and outputs the blended luminance to the signal conversion section 223 as luminance $Y'(=\beta \times Y+(1-\beta) \times W)$.

The signal conversion section 223 converts the luminance Y' supplied from the blend processing section 222, and the color difference signals U and V supplied from the signal conversion section 221 into an RGB signal, generates an RGB divided pixel image, and outputs the generated RGB divided pixel image to the frame memory 224. All pixels are generated and output. Note that the luminance Y of the divided pixel image generated on the basis of the RGB divided pixel image supplied from the signal conversion section 221 will be hereinafter simply referred to as luminance Y. The luminance W corresponding to a pixel value of the divided pixel image of white pixels supplied from the imaging device 32-2 will be simply referred to as luminance W. The luminance Y' output from the blend processing section 222 will be referred to as luminance Y'.

The blend ratio calculation section 225 calculates the blend ratio β on the basis of the luminance Y, the luminance W, and the noise intensity σ, and supplies the blend ratio to the blend processing section 222. Note that a configuration of the blend ratio calculation section 225 will be described below with reference to FIG. 22.

Figure 21:
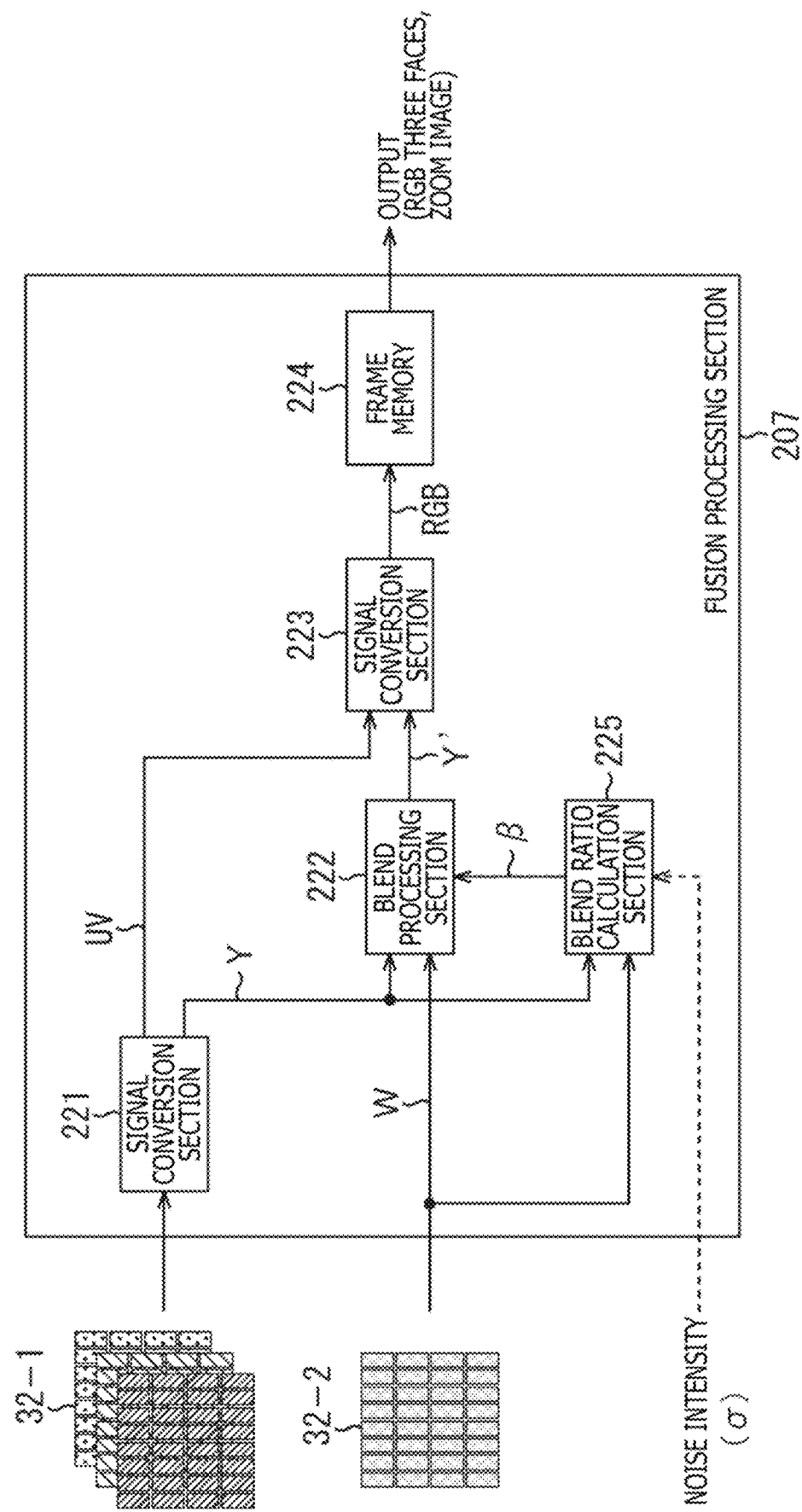
FIG. 21 is a diagram explaining a configuration example of a fusion processing section in FIG. 20.

<Configuration Example of Blend Ratio Calculation Section in FIG. 21>

Figure 22:
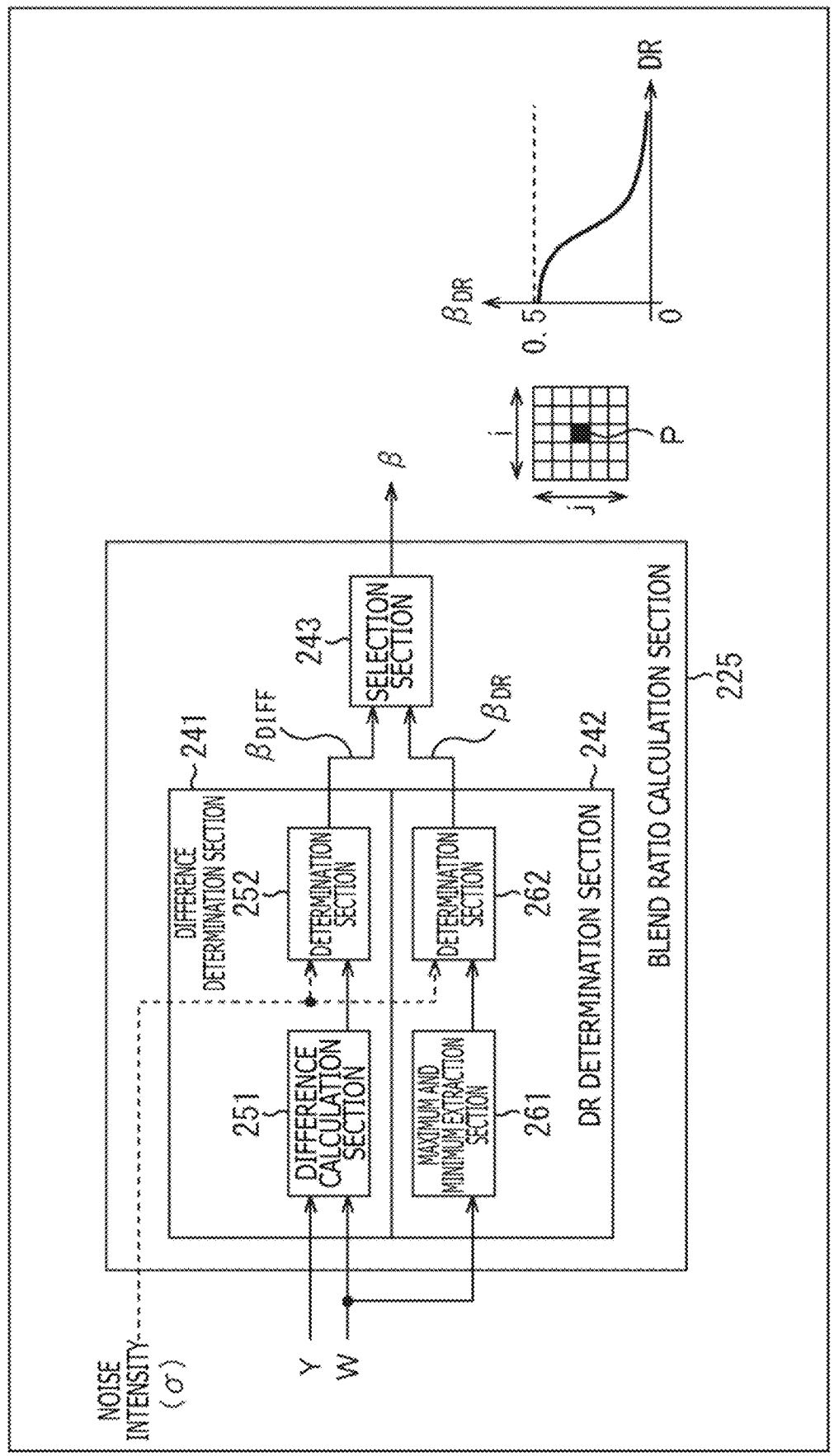
FIG. 22 is a diagram explaining a configuration example of a blend ratio calculation section in FIG. 21.

A configuration example of the blend ratio calculation section 225 will be next described with reference to a block diagram in FIG. 22.

The blend ratio calculation section 225 includes a difference determination section 241, a DR (Dynamic Range) determination section 242, and a selection section 243.

The difference determination section 241 selects a blend ratio $\beta_{DIFF}$ based on a difference between the luminance Y and the luminance W on the basis of the luminance Y, the luminance W, and the noise intensity σ, and outputs the calculated blend ratio $\beta_{DIF}$ to the selection section 243.

More specifically, the difference determination section 241 includes a difference calculation section 251 and a determination section 252.

The difference calculation section 251 calculates a difference between the luminance Y and the luminance W (W−Y) and outputs the calculated difference to the determination section 252.

The determination section 252 obtains the blend ratio $\beta_{DIFF}$ by calculation of following Equation (7), for example, on the basis of the difference (W−Y) and the noise intensity σ.

[Math. 5]

$$\beta_{DIFF} = \frac{1}{2}\exp\left(-\frac{(W-Y)^2}{2\sigma^2}\right) \quad (7)$$

In this equation, (W−Y) is the difference between the luminance W and the luminance Y, while σ is the noise intensity as an adjustment parameter. Note that the blend ratio $\beta_{DIFF}$ in Equation (7) has a maximum value of 0.5, but may have other values such as an inverse ratio of the noise intensity σ.

The DR (Dynamic Range) determination section 242 calculates the blend ratio $\beta_{DR}$ on the basis of a difference between a maximum value and a minimum value of the luminance W in a predetermined range of each of white pixels output from the imaging device 32-2 and outputs the blend ratio $\beta_{DR}$ to the selection section 243.

More specifically, the DR determination section 242 includes a maximum and minimum extraction section 261 and a determination section 262. The maximum and minimum extraction section 261 extracts a maximum value and a minimum value of the luminance W in a range of i pixels×j pixels in the horizontal direction around a center of a processing target pixel P which is colored as depicted in a lower right part of FIG. 22, for example, for each of white pixels supplied from the imaging device 32-2, and outputs the extracted maximum value and minimum value to the determination section 262.

The determination section 262 performs calculation of following Equation (8), for example, on the basis of a difference between the maximum value and the minimum value of the luminance W supplied from the maximum and minimum extraction section 261 to calculate the blend ratio $\beta_{DR}$.

[Math. 6]

$$\beta_{DR} = \exp\left(-\frac{(DR)^2}{2\sigma^2}\right) \quad (8)$$

$$DR = \underset{i,j}{\text{MAX}} - \underset{ij}{\text{MIN}}$$

In this equation, MAX and MIN are a maximum value and a minimum value of the luminance W, respectively, in a range of i pixels×j pixels around a center of each pixel, and DR is a dynamic range which is a difference between the maximum value MAX and the minimum value MIN of the luminance W.

More specifically, a possibility of edge or texture increases as the dynamic range DR enlarges. Accordingly, the blend ratio $\beta_{DR}$ is reduced from a viewpoint that dominance of the value of the luminance W over the value of the luminance Y is more preferable as depicted in a lower right part of FIG. 22.

The selection section 243 compares the blend ratio $\beta_{DIFF}$ supplied from the difference determination section 241 and the blend ratio $\beta_{DR}$ supplied from the DR determination section 242, selects the smaller ratio as the blend ratio β, and outputs the selected ratio to the blend processing section 222.

Figure 20:
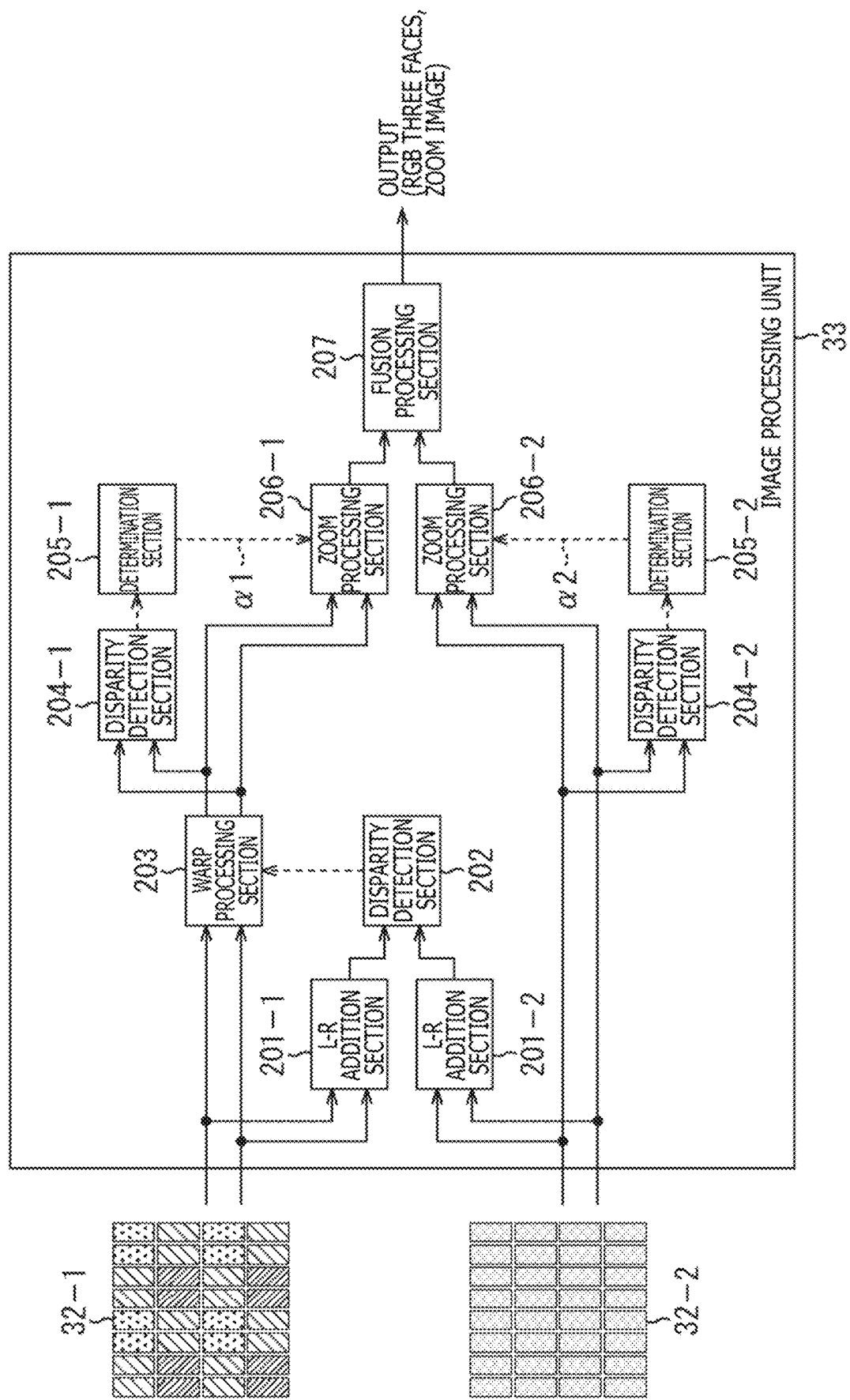
FIG. 20 is a diagram explaining a configuration example of an image processing unit in FIG. 19.

<Image Processing by Image Processing Unit in FIG. 20>

Figure 23:
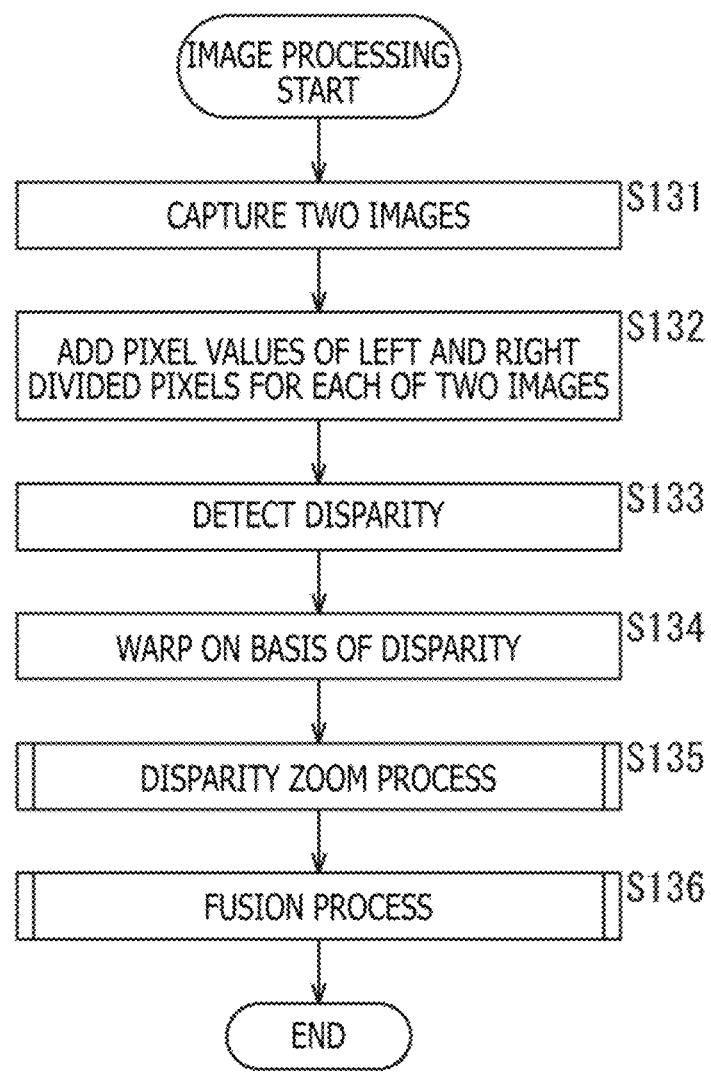
FIG. 23 is a flowchart explaining image processing performed by the image processing unit in FIG. 20.

Image processing performed by the image processing unit 191 in FIG. 20 will be next described with reference to a flowchart in FIG. 23.

In step S131, images are captured by the imaging devices 32-1 and 32-2, and a divided pixel image including pixel signals in Bayer array of RGB, and a divided pixel image including pixel signals of only white pixels are supplied to the image processing unit 191.

In step S132, each of the L-R addition sections 201-1 and 201-2 calculates, as an addition value, an average of pixel values of the left and right divided pixels PR and PL supplied from the imaging devices 32-1 and 32-2, respectively, and outputs the calculated average to the disparity detection section 202 as a pixel value in units of pupil pixel P.

In step S133, the disparity detection section 202 obtains a disparity vector of the pixel P in units of pupil pixel for a disparity between the imaging devices 32-1 and 32-2 on the basis of the pixel values of the imaging devices 32-1 and 32-2 in units of pupil pixel P, and outputs the disparity vector to the warp processing section 203.

In step S134, the warp processing section 203 warps the pixel value in units of divided pixel, which has been supplied from the imaging device 32-1, in a visual line direction identical to a visual line direction of the imaging device 32-2 on the basis of information associated with the disparity vector, and outputs the warped pixel value to the disparity detection section 204-1.

In step S135, each of the disparity detection sections 204-1 and 204-2, the determination sections 205-1 and 205-2, the zoom processing sections 206-1 and 206-2 each executes a disparity zoom process and outputs an RGB divided pixel image including a result of the zoom process and an image including white pixels to the fusion processing section 207. Note that the disparity zoom process herein is the same as the image processing performed by the image processing unit 33 in FIG. 3 described with reference to the flowchart in FIG. 5, and therefore is not repeatedly explained herein.

In step S136, the fusion processing section 207 executes a fusion process, generates the luminance Y' by blending the luminance Y and the luminance W using the RGB divided pixel image and the W divided pixel image on the basis of the disparity between the imaging devices 32-1 and 32-2 and noise intensity, generates an RGB divided pixel image using the luminance Y', and outputs the RGB divided pixel image.

<Fusion Process>

Figure 24:
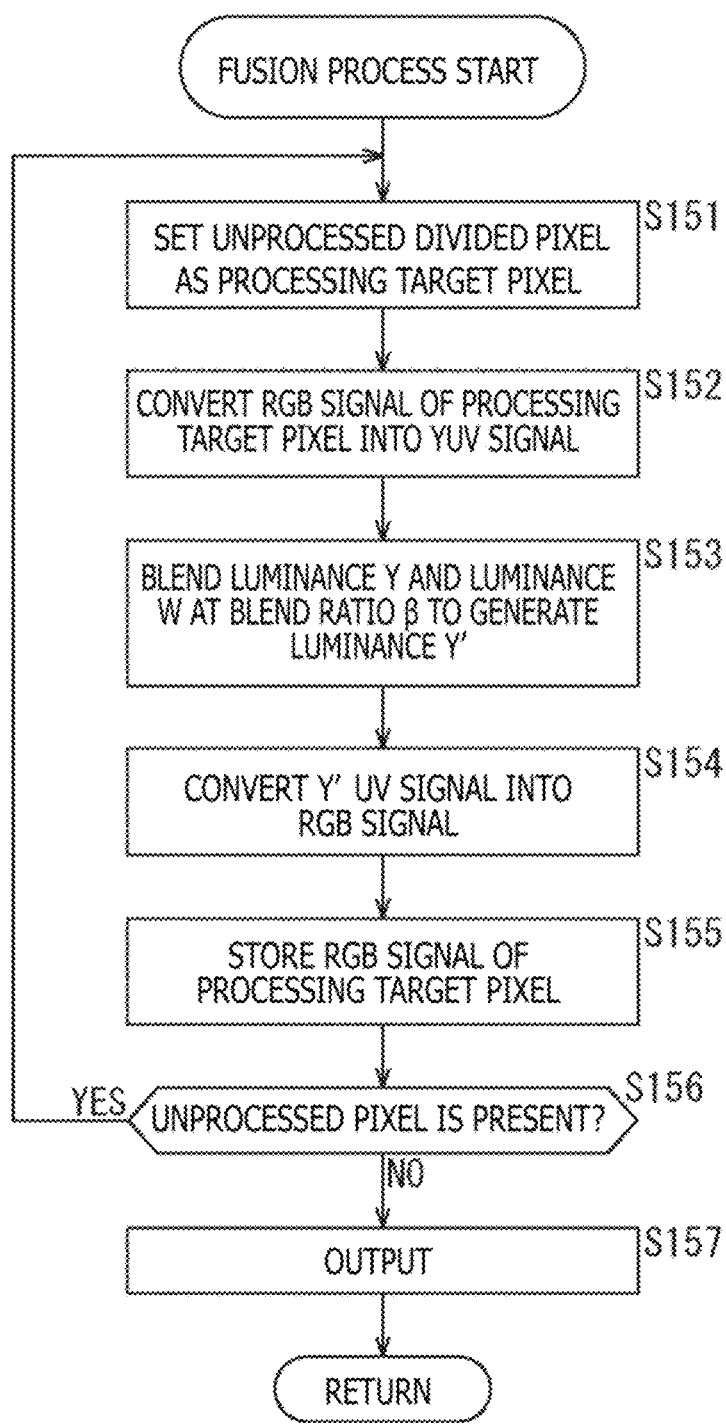
FIG. 24 is a flowchart explaining a fusion process performed by the fusion processing section in FIG. 20.

The fusion process will be described herein with reference to a flowchart in FIG. 24.

In step S151, the signal conversion section 221, the blend processing section 222, and the signal conversion section 223 set an unprocessed divided pixel as a processing target pixel.

In step S152, the signal conversion section 221 converts a pixel signal of a processing target pixel of each of RGB divided pixel images into the luminance Y and the color difference signals U and Y, and outputs the luminance Y to the blend processing section 222 and the blend ratio calculation section 225, and the color difference signals U and V to the signal conversion section 223.

In step S153, the blend processing section 222 blends the luminance W and the luminance Y of the processing target pixel on the basis of the blend ratio $\beta$ to generate the luminance Y'(=$\beta \times$Y+(1−Q$\times$W) and outputs the generated luminance Y' to the signal conversion section 223.

The blend ratio $\beta$ herein is calculated by a blend ratio calculation process described below and performed by the blend ratio calculation section 225. The blend ratio calculation process will be described below in detail with reference to FIG. 25.

In step S154, the signal conversion section 233 converts the luminance Y' and the color difference signals U and V of the processing target pixel into an RGB pixel signal and causes the frame memory 224 to store the RGB pixel signal.

In step S155, each of the signal conversion section 221, the blend processing section 222, and the signal conversion section 223 determines whether or not any divided pixel remains unprocessed. In a case where any divided pixel remains unprocessed, the process returns to step S151. More specifically, processing from step S151 to step S156 is repeated until a divided pixel image, which has an RGB signal converted from a YUV signal obtained in a blended state of the luminance Y and the luminance W at the blend ratio $\beta$, is generated for all divided pixels. Thereafter, the process proceeds to step S157 in a case where no unprocessed divided pixel is considered to remain in step S156.

In step S157, the signal conversion section 223 outputs a divided pixel image which has an RGB signal converted from a Y'UV signal obtained in the blended state of the luminance Y and the luminance W at the blend ratio Q and stored in the frame memory 224.

The foregoing process can obtain the divided pixel image which has the RGB signal converted from the Y'UV signal obtained in the blended state of the luminance Y and the luminance W at the blend ratio R. As a result, the luminance W produced by white pixels can compensate for sensitivity lowered by the color filter disposed in Bayer array, thereby producing an image having improved sensitivity of edge, texture and the like.

<Blend Ratio Calculation Process>

Figure 25:
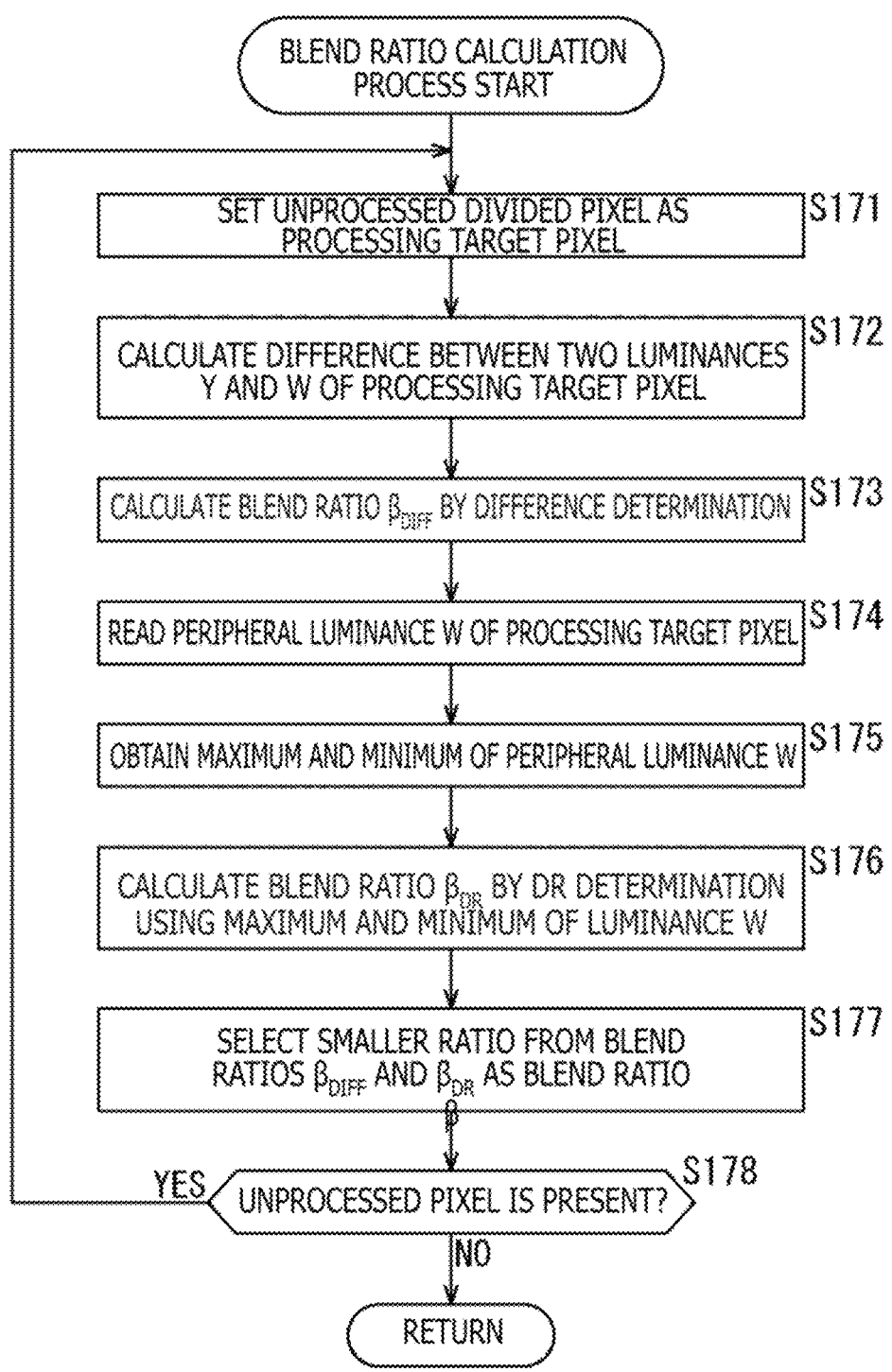
FIG. 25 is a flowchart explaining a blend ratio calculation process performed by the blend ratio calculation section in FIG. 21.

The blend ratio calculation process performed by the blend ratio calculation section 225 in FIG. 22 will be next described with reference to a flowchart in FIG. 25.

In step S171, any one of unprocessed divided pixels is set as a processing target pixel.

In step S172, the difference calculation section 251 calculates a difference between the luminance Y and the luminance W (W−Y) of the processing target pixel and outputs the calculated difference to the determination section 252.

In step S173, the determination section 252 performs calculation of Equation (7) described above on the basis of the difference (W−Y) and the value of the noise intensity a to calculate a blend ratio $\beta_{DIFF}$ of the processing target pixel based on difference determination and outputs the calculated blend ratio $\beta_{DIFF}$ to the selection section 243.

In step S174, the maximum and minimum extraction section 261 reads the luminance W of peripheral pixels in a range of i pixels$\times$j pixels around a center of the processing target pixel.

In step S175, the maximum and minimum extraction section 261 extracts a maximum value and a minimum value of the luminance W from the peripheral pixels of the processing target pixel and outputs the extracted values of the luminance W to the determination section 262.

In step S176, the determination section 262 performs calculation of Equation (8) described above using the maximum luminance W and the minimum luminance W in the peripheral pixels of the processing target pixel to calculate a blend ratio $\beta_{DR}$ based on DR determination and outputs the calculated blend ratio $\beta_{DR}$ to the selection section 243.

In step S177, the selection section 243 sets the smaller ratio of the blend ratio $\beta_{DIFF}$ based on the difference determination and the blend ratio $\beta_{DR}$ based on the DR determination as the blend ratio $\beta$ for the luminance Y and the luminance W and outputs the blend ratio $\beta$ to the blend processing section 222.

In step S178, it is determined whether or not any divided pixel remains unprocessed. In a case where any divided pixel remains unprocessed, the process returns to step S171. More specifically, processing from step S171 to step S178 is repeated until the blend ratio Q is obtained for all of the units of divided pixel. Thereafter, in a case where no unprocessed divided pixel is considered to remain in step S178, i.e., the blend ratio $\beta$ is considered to be calculated for all divided pixels, the process ends.

By performing the foregoing process, the smaller ratio of the blend ratio $\beta_{DIFF}$ based on the difference determination and the blend ratio $\beta_{DR}$ based on the DR determination is calculated as the blend ratio $\beta$ for the luminance Y and the luminance W in units of divided pixel.

Accordingly, the luminance Y and the luminance W can be appropriately blended on the basis of the disparity and DR for each pixel. As a result, the luminance W produced by white pixels can compensate for sensitivity lowered by the color filter disposed in Bayer array, thereby producing an image having improved sensitivity of edge, texture and the like.

<3-1. First Modified Example of Second Embodiment>

According to the example described above, a disparity vector is detected after warping using a disparity of each of divided pixel images captured by the imaging devices 32-1 and 32-2 in units of pupil pixel. Thereafter, the zoom process, and then the fusion process are performed at the blend ratio α calculated for pupil pixels and divided pixels. However, warping and the fusion process may be performed after completion of the zoom process.

Figure 26:
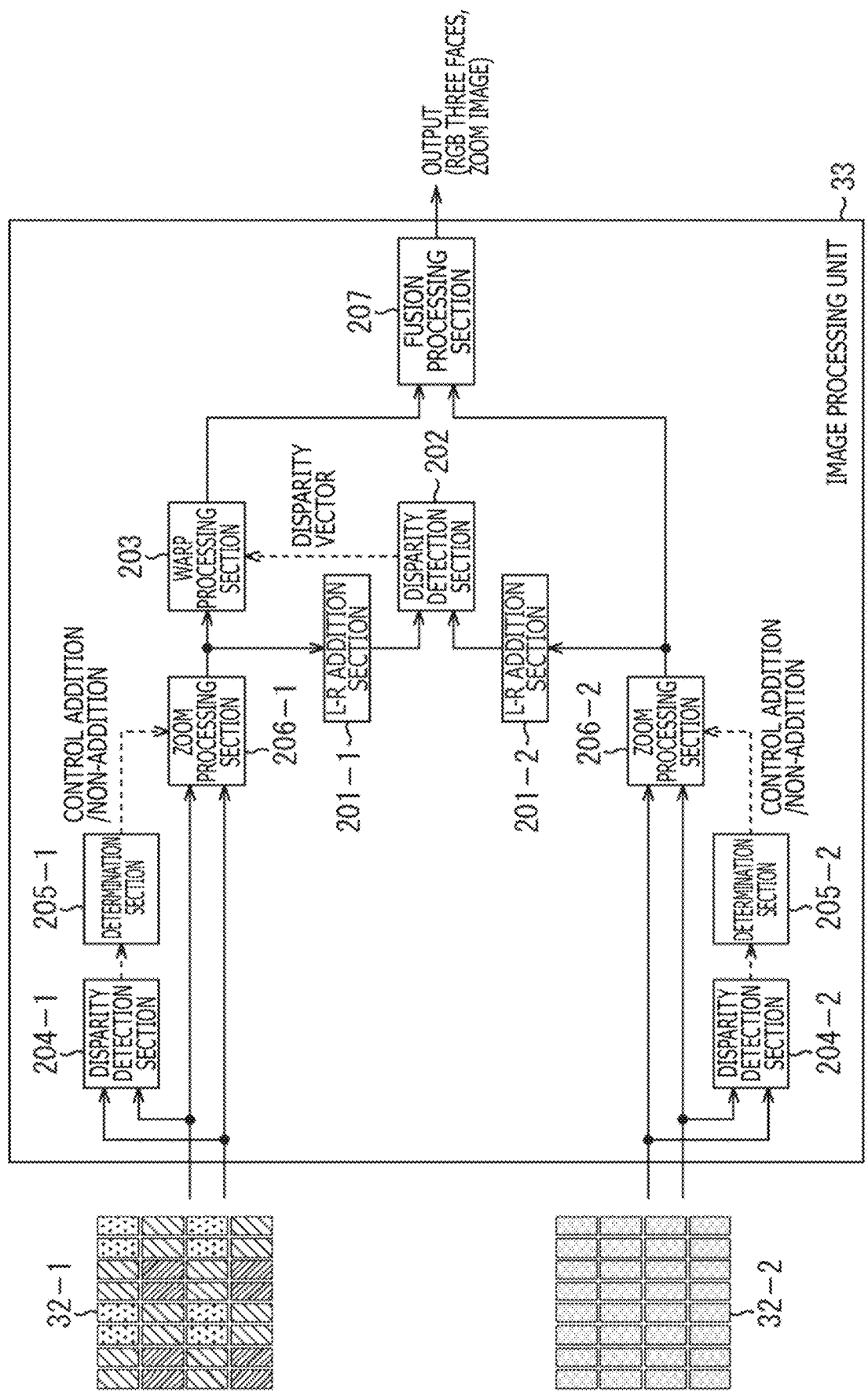
FIG. 26 is a diagram explaining a configuration example of an image processing unit according to a first modified example of the second embodiment.

FIG. 26 depicts a configuration example of the image processing unit 191 configured to perform warping and the fusion process after completion of the zoom process.

More specifically, the disparity detection sections 204-1 and 204-2, the determination sections 205-1 and 205-2, and the zoom processing sections 206-1 and 206-2 are provided in the preceding stage, and the L-R addition sections 201-1 and 201-2, the disparity detection section 202, and the warp processing section 203 are provided in the following stage.

Image processing by the image processing unit 191 in FIG. 26 is implemented by performing the disparity zoom process in step S135 of the image processing, which is performed by the image processing unit 191 in FIG. 20 described with reference to the flowchart in FIG. 23, in a stage following the processing in step S131 and preceding the processing in step S132. Note that respective processing is similar to the corresponding processing described with reference to the flowchart in FIG. 23, and therefore is not repeatedly described.

<3-2. Second Modified Example of Second Embodiment>

According to the example described above, the disparity detection sections 204-1 and 204-2, the determination sections 205-1 and 205-2 of the image processing unit 191 in FIG. 20, and the zoom processing sections 206-1 and 206-2 are implemented by configurations similar to the disparity detection section 51, the determination section 52, and the zoom processing section 53 of the image processing unit 33 in FIG. 3. However, the zoom processing sections 206-1 and 206-2, and the fusion processing section 207 may be implemented by estimation using a coefficient set obtained by learning similarly to the zoom processing section 141 of the image processing unit 33 in FIG. 15.

Figure 27:
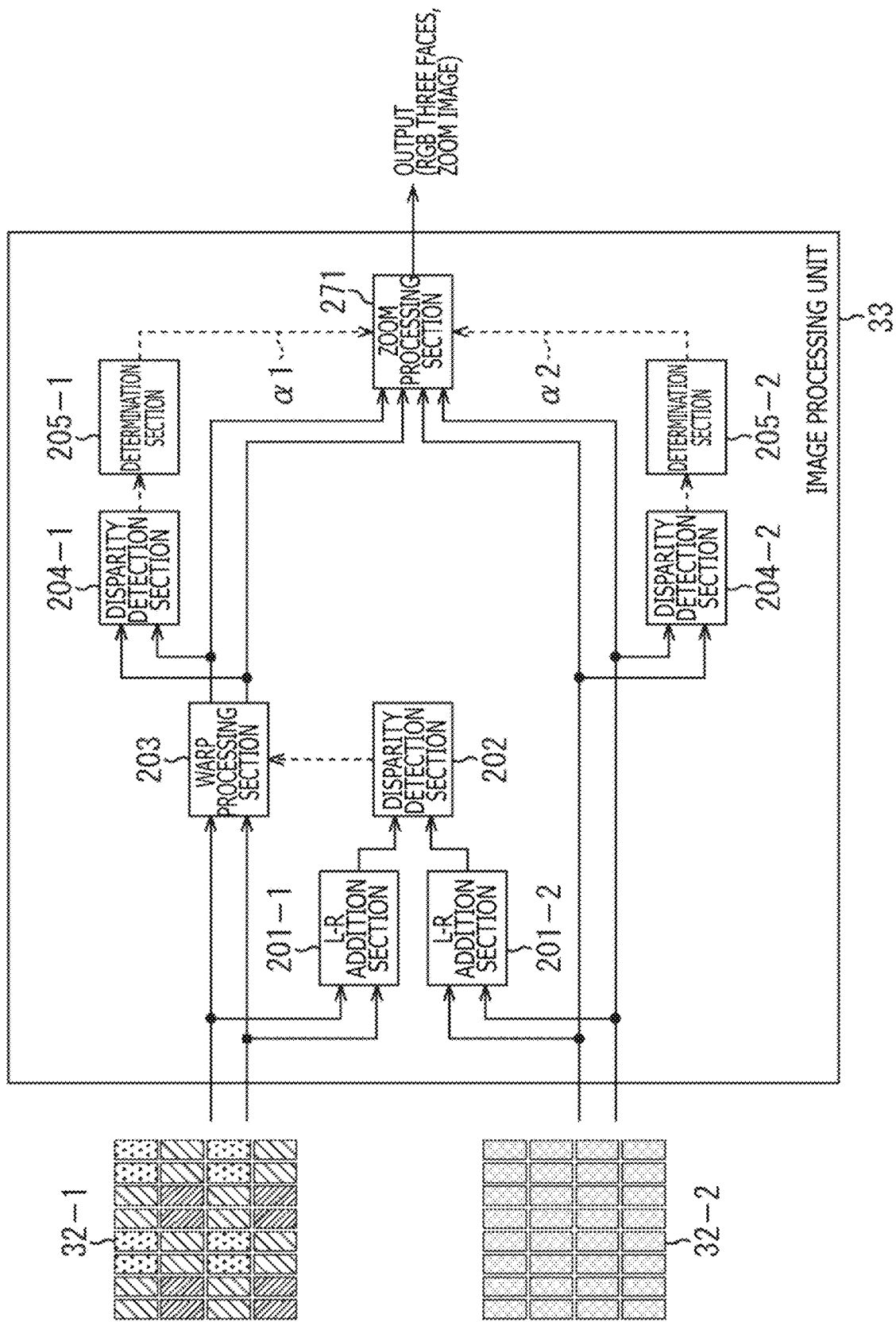
FIG. 27 is a diagram explaining a configuration example of an image processing unit according to a second modified example of the second embodiment.

The image processing unit 191 in FIG. 27 is a configuration example of the image processing unit 191 which includes a zoom processing section 271 for implementation based on estimation using coefficient sets obtained by learning similarly to the zoom processing section 141 of the image processing unit 33 in FIG. 15, in place of the zoom processing sections 206-1 and 206-2 and the fusion processing section 207.

The image processing unit 191 in FIG. 26 is different from the image processing unit 191 in FIG. 20 in a point that the zoom processing section 271 is provided in place of the zoom processing sections 206-1 and 206-2 and the fusion processing section 207.

Similarly to the zoom processing section 141, the zoom processing section 271 extracts, as feature values, respective coefficients constituting coefficient sets obtained by learning beforehand, and pixel values of pixels constituting a class tap set for each pixel and classifies the pixel values into classes, and estimates pixel values on the basis of a sum of products of an estimation tap and respective coefficients of coefficient sets established beforehand in association with the classes.

The zoom processing section 271 obtains a processing tap from each of the imaging devices 32-1 and 32-2 as a tap extracted as a feature value for a processing target pixel and further obtains the blend ratios α1 and α2. Accordingly, each of the number of class taps used for classification and the number of estimation taps used for estimation is doubled, wherefore the number of coefficients constituting the coefficient sets is also doubled.

In addition, images corresponding to the imaging devices 32-1 and 32-2 are also used as images for the learning process. In this case, the image used as the teacher image is a high resolution divided pixel image for which the zoom process and the fusion process have been applied, while the image used as the student image is a low resolution divided pixel image having lowered resolution, and obtained by lowering resolution of the teacher image not in the state subjected to the fusion process for fusion with a disparity between images captured by the imaging devices 32-1 and 32-2.

Accordingly, the process performed by the zoom processing section 271 becomes a process substantially similar to the process performed by the zoom processing section 141 in a point that a pixel signal of each pixel is estimated on the basis of a sum of products of an estimation tap and a coefficient set for each class obtained by classification in accordance with a class tap.

<Image Processing by Image Processing Unit in FIG. 27>

Figure 28:
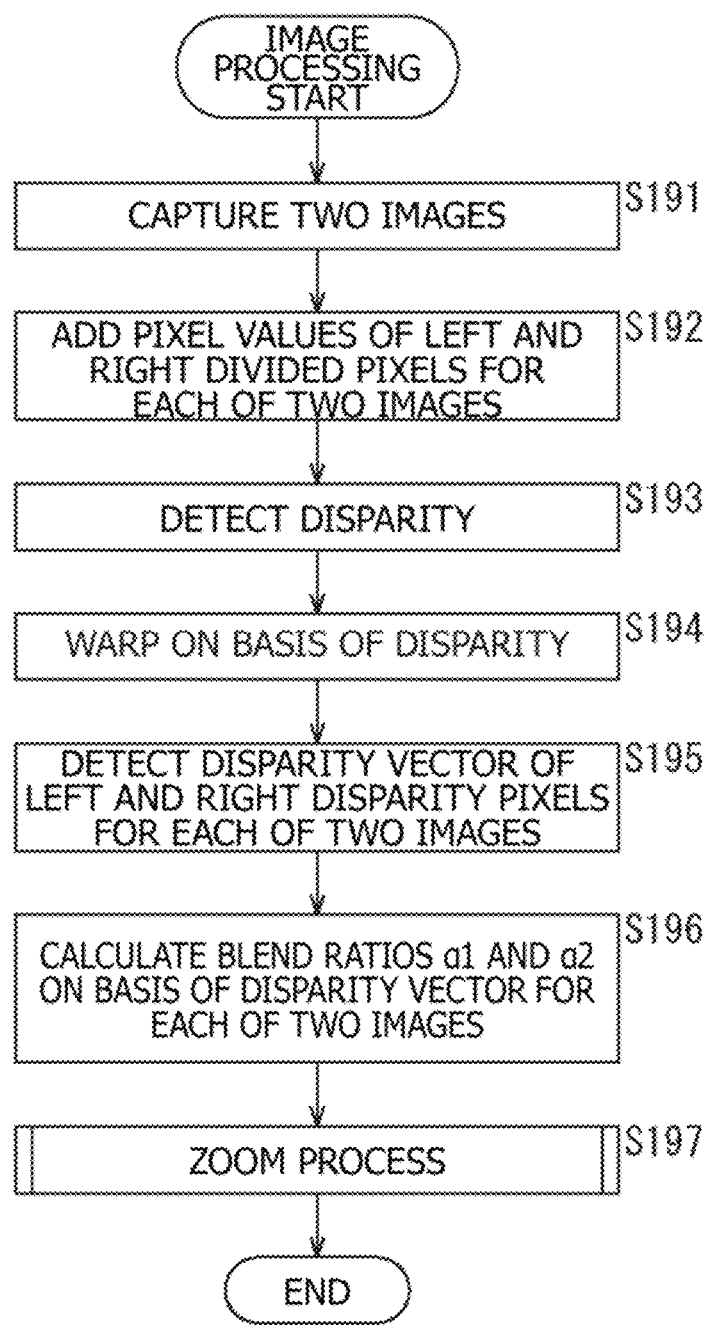
FIG. 28 is a flowchart explaining image processing performed by the image processing unit in FIG. 27.

Image processing performed by the image processing unit 191 in FIG. 27 will be next described with reference to a flowchart in FIG. 28. Note that processing from steps S191 to S194 is similar to processing from step S131 to step S134 in FIG. 23, and that processing in steps S195 and S196 is similar to processing from step S12 to step S14 in FIG. 5. Accordingly, the same description is not repeated.

In addition, a zoom process in step S197 is a process estimated from a pixel corresponding to a processing tap set for each pixel, and a sum of products of coefficients and pixel signals of pixels of a processing tap both set for each class established according to the blend ratios α1 and α2. Accordingly, the zoom process in step S197 is substantially similar to the zoom process in FIG. 18, wherefore the same description of this process is not repeated.

By performing the foregoing process, pixels subjected to the zoom process and the fusion process can be estimated using a coefficient set obtained by learning.

As a result, a high resolution image can be captured by effectively using respective pixel signals of a plurality of pixels defined by pupil division immediately below a microlens.

<3-3. Third Modified Example of Second Embodiment>

Figure 29:
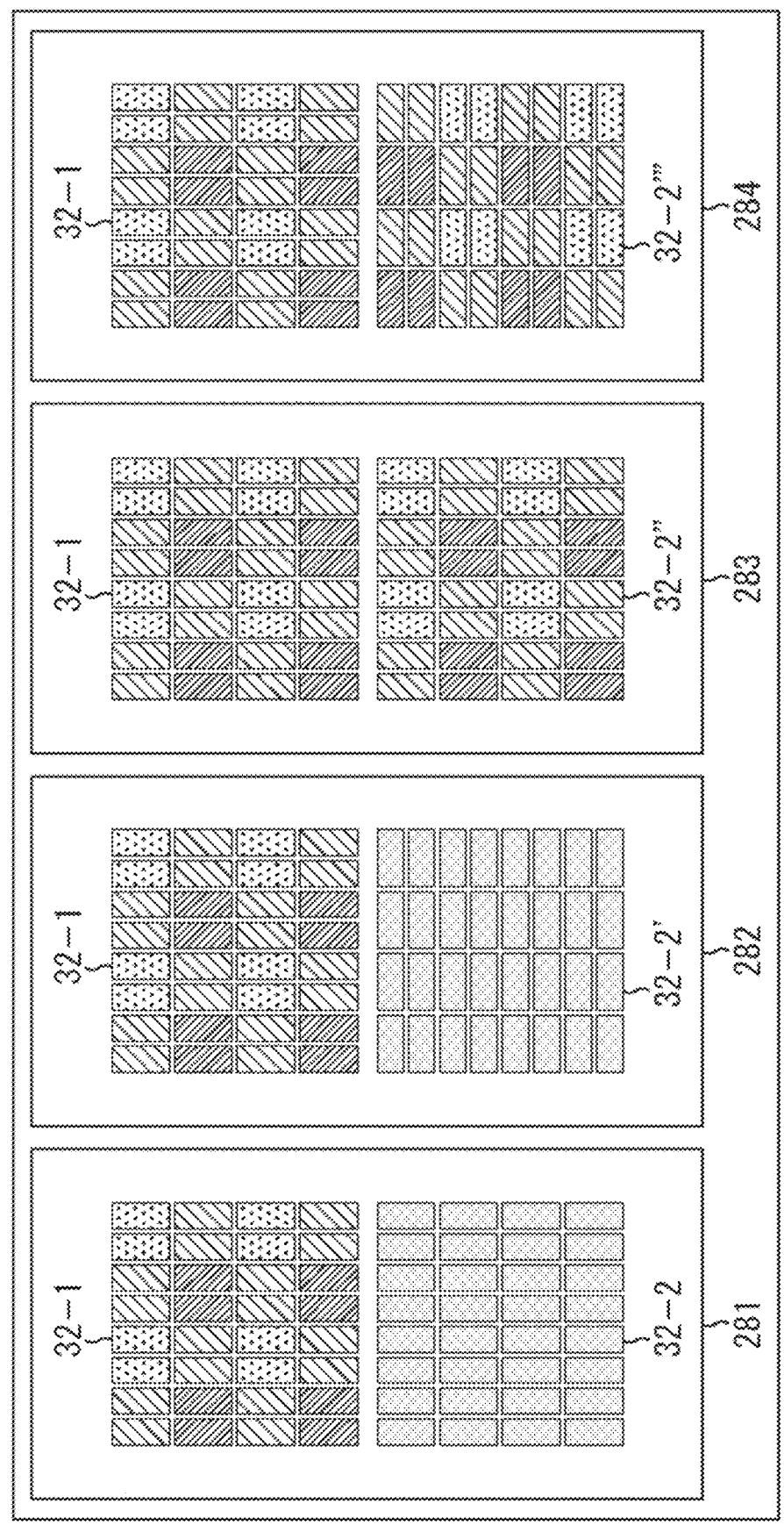
FIG. 29 is a diagram explaining a configuration example of imaging devices according to a third modified example of the second embodiment.

According to the example described above, the imaging device 32-2 is configured to produce twice higher resolution in the horizontal direction than resolution in the vertical direction. Alternatively, a combination of configurations producing different resolutions may be adopted. For example, following four combinations 281 to 284 depicted in FIG. 29 may be adopted.

More specifically, in the combination 281 of the imaging devices 32-1 and 32-2 described above, each of the imaging devices 32-1 and 32-2 produces resolution in the horizontal direction twice higher than resolution in the vertical direction. Accordingly, the combination 281 corresponds to the configuration of the imaging devices 32-1 and 32-2 provided on the imaging apparatus 11 in FIG. 19 described above.

Moreover, in the combination 282 of the imaging device 32-1 and an imaging device 32-2' described above, the imaging device 32-2' produces resolution in the vertical direction twice higher than resolution in the horizontal direction. Accordingly, the imaging device 32-2' is obtained by rotating the imaging device 32-2 around an optical axis of incident light by 90 degrees.

Furthermore, in the combination 283 of the imaging device 32-1 and an imaging device 32-2" described above, the imaging device 32-2" is arranged in Bayer array similarly to the imaging device 32-1.

Moreover, in the combination 284 of the imaging device 32-1 and an imaging device 32-2''' described above, the imaging device 32-2''' has resolution in the vertical direction twice higher than resolution in the horizontal direction. Accordingly, the imaging device 32-2''' is obtained by rotating the imaging device 32-1 around the optical axis of incident light by 90 degrees.

Figure 30:
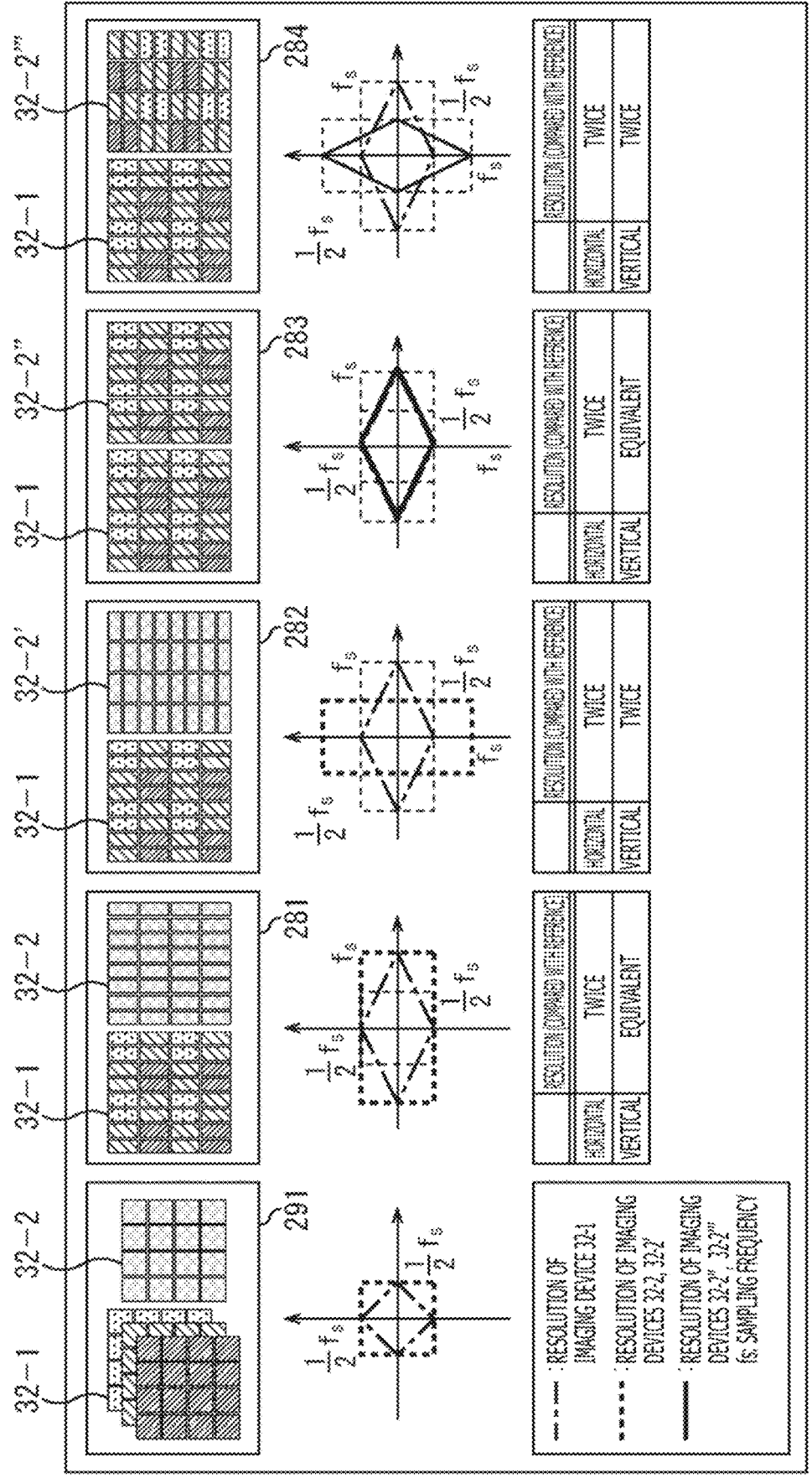
FIG. 30 is a diagram explaining a resolution difference between the imaging devices in FIG. 29.

For example, distributions of Nyquist frequency for respective resolutions of the combinations 281 to 284 in the horizontal direction and the vertical direction are relations represented in FIG. 30.

Note that FIG. 30 represents distributions based on a reference distribution of Nyquist frequency in the horizontal direction and the vertical direction when each of the imaging devices 32-1 and 32-2 includes units of pupil pixel as depicted in a leftmost part in FIG. 30.

As depicted in the leftmost part in FIG. 30, resolution of the imaging device 32-1 in units of pupil pixel in a combination 291 as a reference lies in a rhomboidal range whose vertex are each located at Nyquist frequency fs/2 in the horizontal direction and the vertical direction, while resolution of the imaging device 32-2 in units of pupil pixel lies in a square range whose upper end and lower end in the horizontal direction, and left end and right end in the vertical direction are each located at Nyquist frequency fs/2.

As depicted in the second part from the left in FIG. 30, resolution of the imaging device 32-1 in units of divided pixel in the combination 281 lies in a rhomboidal range which is a twice wider range than the reference of the Nyquist frequency fs/2 in the horizontal direction, and an equivalent range to the reference of the Nyquist frequency fs/2 in the vertical direction. In addition, resolution of the imaging device 32-2 in units of divided pixel lies in a square range which is a twice wider range than the reference of the Nyquist frequency fs/2 in the horizontal direction, and an equivalent range to the reference of the Nyquist frequency fs/2 in the vertical direction. Accordingly, resolution is twice higher than the reference in the horizontal direction, and is equivalent to the reference in the vertical direction.

Note that the second to fifth parts from the left in FIG. 30 depict the combinations 281 to 284 in upper stages, distributions of sampling frequencies in the horizontal direction and the vertical direction in middle stages, and resolution ratios in the horizontal direction and the vertical direction with respect to the reference in lower stages.

As depicted in the third part from the left in FIG. 30, resolution of the imaging device 32-2' in units of divided pixel in the combination 282 lies in a square range which is an equivalent range to the reference of the Nyquist frequency fs/2 in the horizontal direction, and a twice wider range than the reference of the Nyquist frequency fs/2 in the vertical direction. Accordingly, resolution is twice higher than the reference in the horizontal direction, and is twice higher than the reference in the vertical direction.

As depicted in the fourth part from the left in FIG. 30, resolution of the imaging device 32-2" in units of divided pixel in the combination 283 lies in a rhomboidal range which is a twice wider range than the reference of the Nyquist frequency fs/2 in the horizontal direction, and an equivalent range to the reference of the Nyquist frequency fs/2 in the vertical direction. Accordingly, resolution is twice higher than the reference in the horizontal direction, and is equivalent to the reference in the vertical direction.

As depicted in the fifth part from the left in FIG. 30, resolution of the imaging device 32-2''' in units of divided pixel in the combination 284 lies in a rhomboidal range which is an equivalent range to the reference of the Nyquist frequency fs/2 in the horizontal direction, and a twice wider range than the reference of the Nyquist frequency fs/2 in the vertical direction. Accordingly, resolution is twice higher than the reference in the horizontal direction, and is twice higher than the reference in the vertical direction.

By the foregoing combinations, resolution necessary for resolution distribution in units of pupil pixel is switchable in each of the horizontal direction and the vertical direction.

As a result, a high resolution image can be captured by effectively using respective pixel signals of a plurality of pixels defined by pupil division immediately below a microlens.

<3-4. Fourth Modified Example of Second Embodiment>

According to the example described above, the optical axes of imaging by the imaging devices 32-1 and 32-2 are different from each other, wherefore a disparity is produced between images captured by the imaging devices 32-1 and 32-2. However, light from an identical light supply may be split using a beam splitter to process images having an identical optical axis and producing no disparity.

Figure 31:
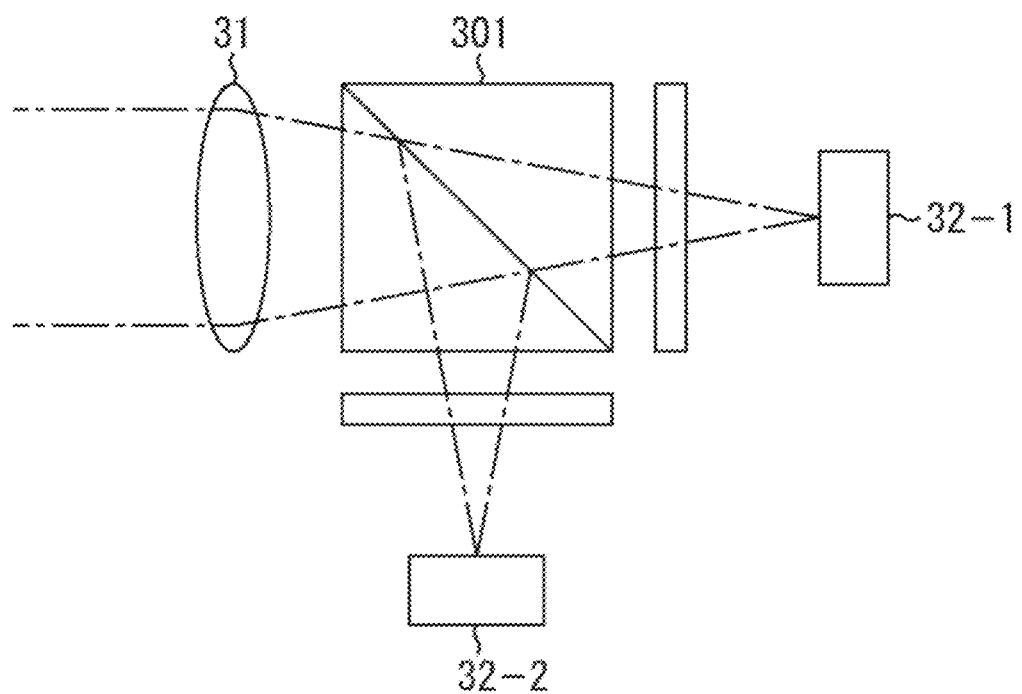
FIG. 31 is a diagram explaining a configuration example of imaging devices according to a fourth modified example of the second embodiment.

More specifically, as depicted in FIG. 31, for example, a beam splitter 301 may be provided in a stage following the optical unit 31 such that incident light entering in the left direction in the figure can be split and transmitted through each of the imaging devices 32-1 and 32-2.

This configuration allows light having an identical optical axis and transmitting the optical unit 31 to transmit the imaging devices 32-1 and 32-3.

Accordingly, the necessity of providing the warp processing section 203 is eliminated in the following processing.

4. Third Embodiment

According to the example described above, each of the imaging devices 32-1 and 32-2 includes the two divided pixels PL and PR for the pupil pixel P constituted immediately below the one microlens ML as depicted in the left part of FIG. 32. However, the number of pixels divided and disposed immediately below the microlens ML may be equal to or larger than this number. For example, as depicted in a center part of FIG. 32, divided pixels P1 to P9 which are 3 pixels×3 pixels are provided for the pupil pixel P immediately below the one microlens ML. The imaging device 32 in FIG. 32 is what is called a light field camera.

Figure 32:
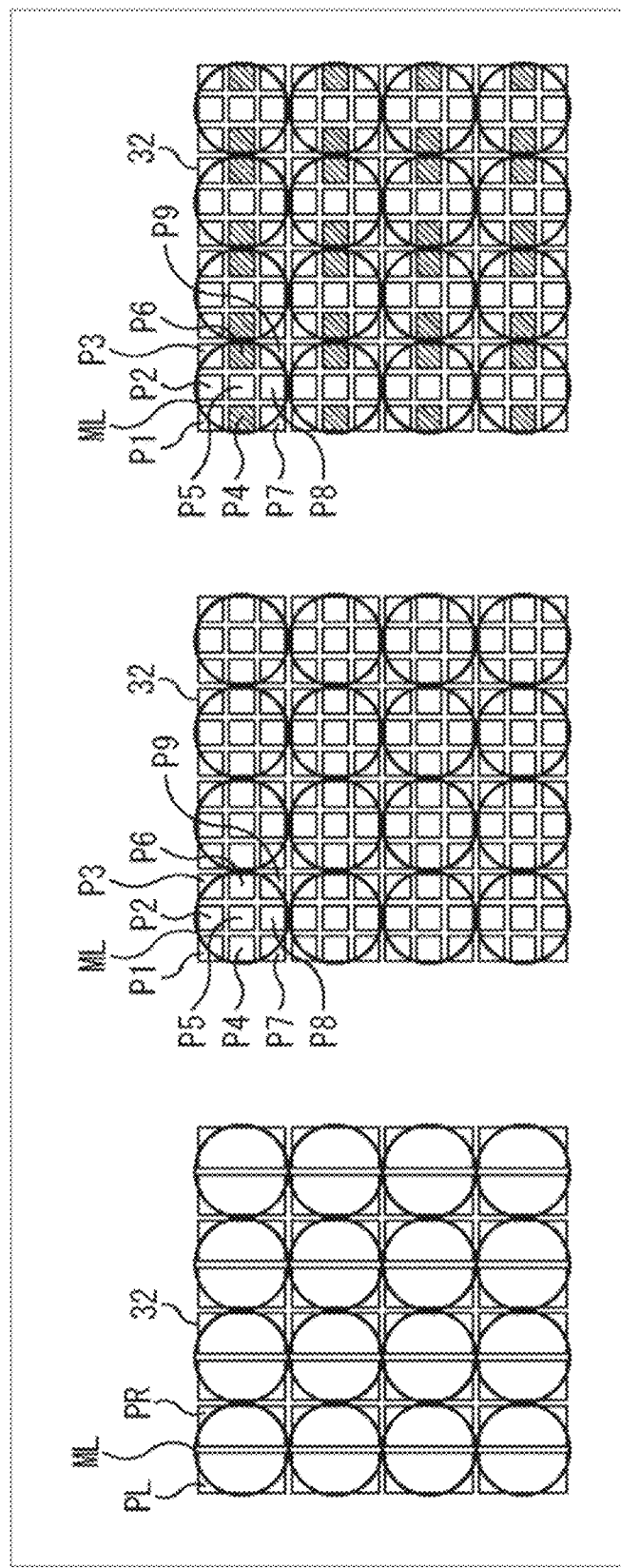
FIG. 32 is a diagram explaining a configuration example of an imaging device according to a third embodiment.

A disparity vector in the center part of FIG. 32 may be obtained using a difference between pixel values of the divided pixels P4 and P6 of each of the pupil pixels P as depicted in a right part of FIG. 32.

Figure 33:
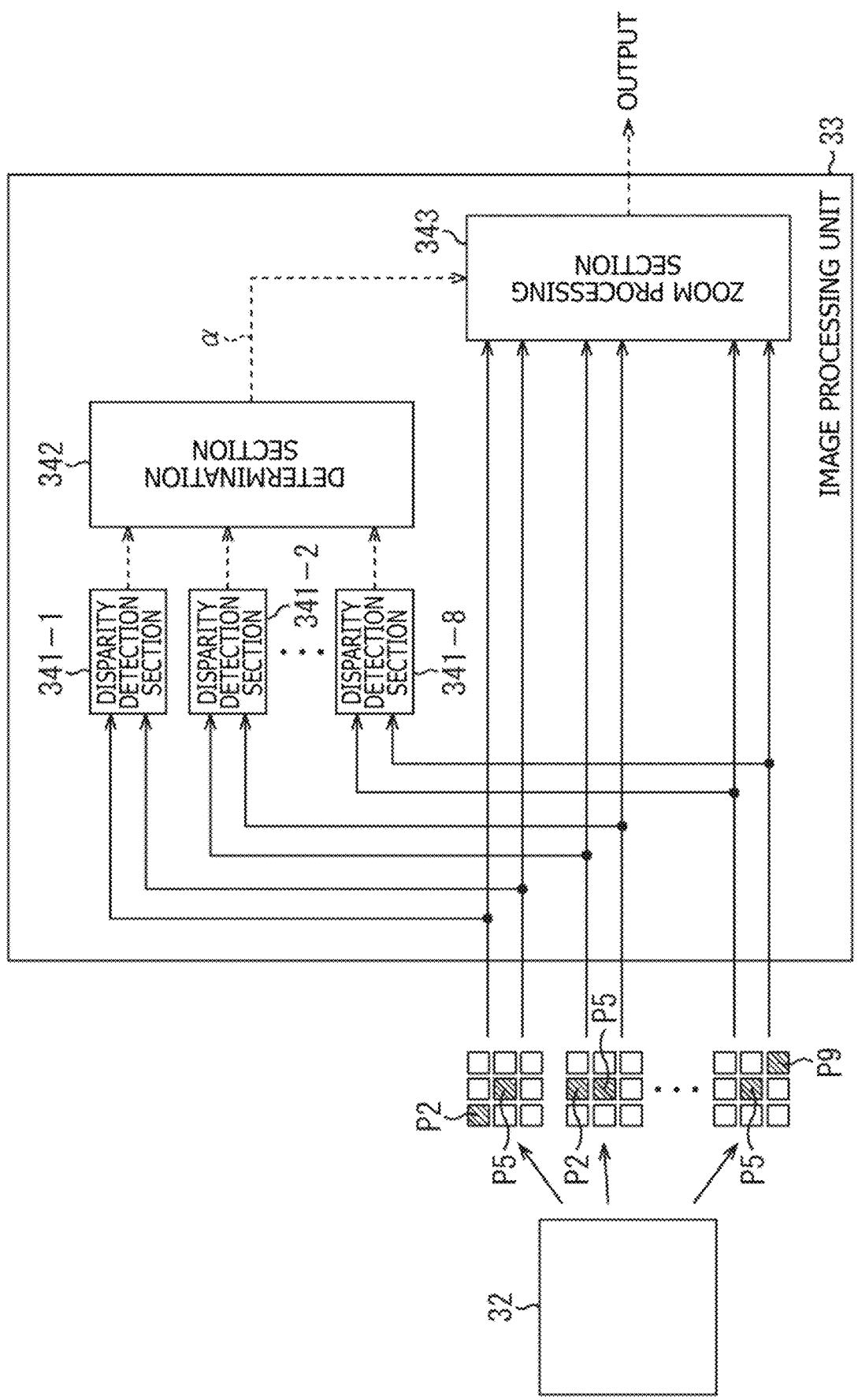
FIG. 33 is a diagram explaining a configuration example of an image processing unit corresponding to the imaging device in FIG. 32.

Moreover, as depicted in a left part of FIG. 33, an average of blend ratios of the pixels P1 to P3, P4, P6, and P7 to P9 may be calculated using a disparity vector between the pixel P5 at the center in the 3 pixels×3 pixels constituting the pupil pixel P and each of the peripheral pixels P1 to P3, P4, P6, and P7 to P9. In this case, the calculated average may be set as the blend ratio α. Furthermore, the divided pixel P5 may be synthesized with the disparity vector of each of the peripheral divided pixels P1 to P3, P4, P6, and P7 to P9, and the blend ratio α may be calculated on the basis of the synthesized disparity vector.

A right part of FIG. 33 depicts a configuration example of the image processing unit 33 which calculates an average of the blend ratios of the pixels P1 to P3, P4, P6, and P7 to P9 using a disparity vector of the pixel P5 at the center in the 3 pixels×3 pixels constituting the pupil pixel P and each of the peripheral pixels P1 to P3, P4, P6, and P7 to P9, and sets the calculated average as the blend ratio α.

The image processing unit 33 in FIG. 33 includes disparity detection sections 341-1 to 341-8, a determination section 342, and a zoom processing section 343.

The disparity detection sections 341-1 to 341-8 obtains disparity vectors of the divided pixel P5 at the center in 3 pixels×3 pixels constituting the pupil pixel P, and the peripheral divided pixels P1 to P3, P4, P6, and P7 to P9, and outputs the obtained disparity vectors to the determination section 342.

The determination section 342 calculates a blend ratio on the basis of the respective disparity vectors of the divided pixel P5 and the peripheral divided pixels P1 to P3, P4, P6, and P7 to P9 for each of the pupil pixels P, and outputs an average of the blend ratios thus obtained to the zoom processing section 343 as the blend ratio α. In addition, the determination section 342 may synthesize the divided pixel P5 with the disparity vector of each of the peripheral divided pixels P1 to P3, P4, P6, and P7 to P9 to calculate the blend ratio α on the basis of the synthesized disparity vector.

The zoom processing section 343 may obtain a pixel value in units of pupil pixel P by calculating an average of pixel values of the divided pixels P1 to P9, blend the calculated average with each of the pixel values of the divided pixels P1 to P3, P4, P6, and P7 to P9 at the blend ratio α, and replace the divided pixel P5 with the average of the pixel values, for example.

Note that a method of obtaining the disparity vectors, a method of calculating the respective blend ratios, and a basic process for blending the average and the pixel values of the respective divided pixels at the blend ratio are similar to the corresponding processes performed by the disparity detection section 51, the determination section 52, and the zoom processing section 53 of the image processing unit 33 in FIG. 3, and therefore are not repeatedly described.

In addition, according to the configuration described above, divided pixels of 3 pixels×3 pixels are provided immediately below the one microlens ML. However, divided pixels of other than 3 pixels×3 pixels may be provided such as divided pixels of 5 pixels×5 pixels, 7 pixels×7 pixels, for example.

5. Fourth Embodiment

The example described above is blending in accordance with a magnitude of a disparity vector of the divided pixels PL and PR constituting the pupil pixel P. However, addition or non-addition of the divided pixels PL and PR may be designated for each region within an image, for example.

Figure 34:
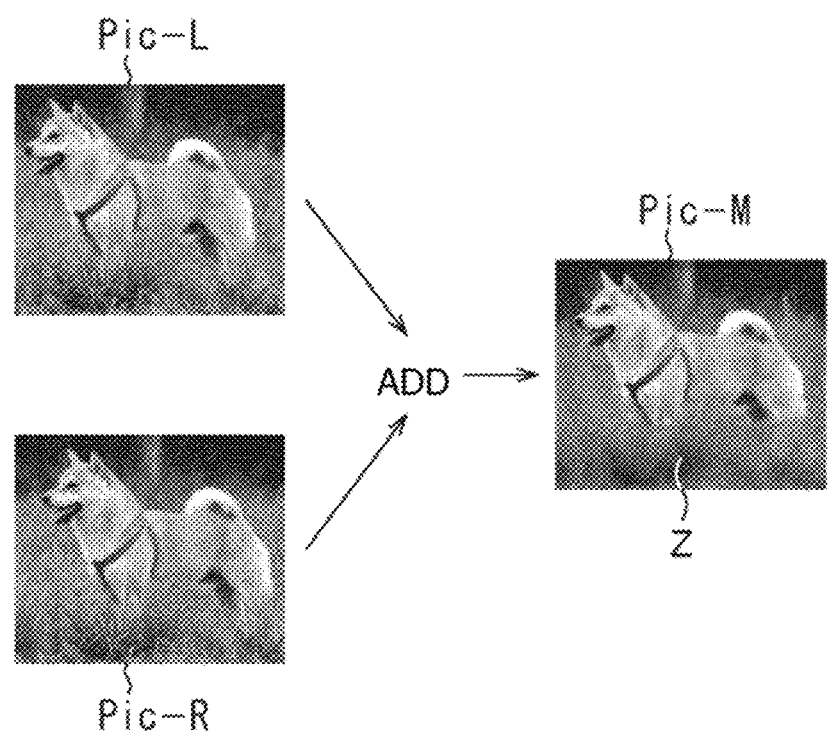
FIG. 34 is a diagram explaining an outline of an image processing unit according to a fourth embodiment.

For example, in a case of use of an image Pic-L including the divided pixel PL and an image Pic-R including the divided pixel PR as depicted in a left part of FIG. 34, a blur can be generated in a region Z as indicated by an image Pic-M by replacing pixel values of the divided pixels PL and PR with an average of added pixels of the divided pixels PL and PR in the region Z, for example.

Figure 35:
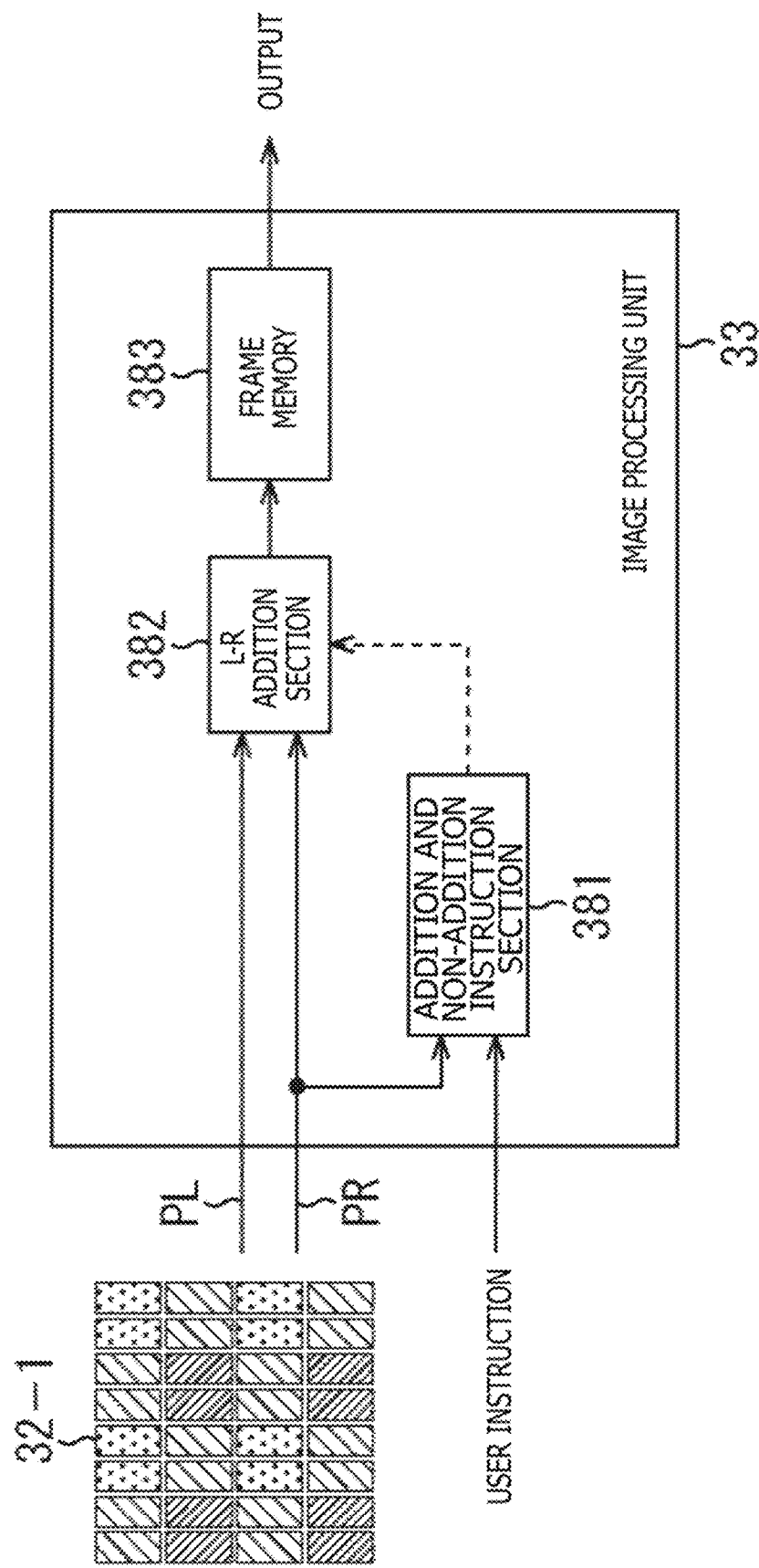
FIG. 35 is a diagram explaining a configuration example of the image processing unit according to the fourth embodiment.

FIG. 35 depicts a configuration example of the image processing unit 33 configured to designate addition or non-addition of the divided pixels PL and PR for each region within an image.

The image processing unit 33 in FIG. 35 includes an addition and non-addition instruction section 381, an L-R addition section 382, and a frame memory 383.

The addition and non-addition instruction section 381 outputs, to the L-R addition section 382, information which designates an addition region or a non-addition region at a pixel position of a corresponding divided pixel in accordance with operation details for designating an addition region or a non-addition region within an image in response to operation of the operation unit 37.

The L-R addition section 382 calculates an average of pixel values of the divided pixels PL and PR corresponding to the pupil pixel P in the addition region on the basis of information designating the addition region or the non-addition region supplied from the addition and non-addition instruction section 381, replaces the pixel values of the divided pixels PL and PR with the average, and causes the frame memory 383 to store the average.

As a result, each of the pixel values of the divided pixels PL and PR is replaced with the same average for the pupil pixel P in the region for which addition has been designated. Accordingly, a blur can be generated within the image by equalization of the pixel value in units of pupil pixel P.

<Image Processing by Image Processing Unit in FIG. 35>

Figure 36:
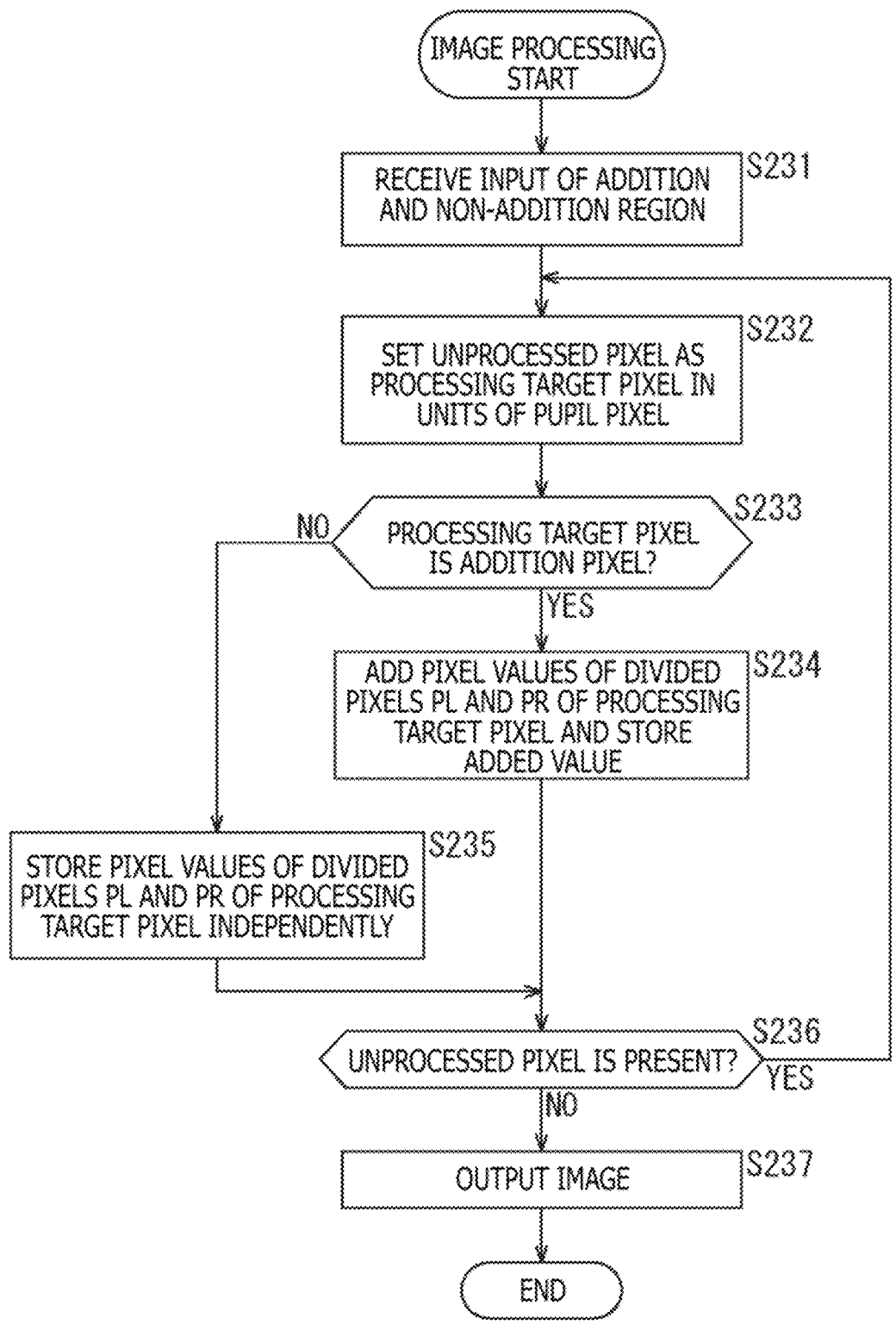
FIG. 36 is a flowchart explaining image processing performed by the image processing unit in FIG. 35.

Image processing performed by the image processing unit 33 in FIG. 35 will be next described with reference to a flowchart in FIG. 36.

In step S231, the addition and non-addition instruction section 381 receives input of information associated with the divided pixel PR of the imaging device 32-1 and designating addition and non-addition region within an image in response to an operation signal corresponding to operation details of the display unit operation unit 37.

In step S232, the addition and non-addition instruction section 381 sets any one of unprocessed pixels as a processing target pixel in units of pupil pixel.

In step S233, the addition and non-addition instruction section 381 determines whether or not a processing target pixel has been designated as an addition pixel.

In a case of designation as the addition pixel in step S233, the process proceeds to step S234.

In step S234, the addition and non-addition instruction section 381 instructs the L-R addition section 382 to add pixel values of the divided pixels PL and PR constituting the pupil pixel P of the processing target pixel. In response to this instruction, the L-R addition section 382 obtains an addition value of pixel values of the divided pixels PL and PR, further calculates an average of the pixel values, replaces the pixel values of the divided pixels PL and PR with the average, and cause the frame memory 383 to store the average.

In a case of no designation as the addition pixel in step S233, the process proceeds to step S235.

In step S235, the addition and non-addition instruction section 381 instructs storage of the pixel values of the divided pixels PL and PR constituting the pupil pixel P of the processing target pixel without change. In response to this instruction, the L-R addition section 382 causes the frame memory 383 to store each of the pixel values of the divided pixels PL and PR without change.

In step S236, the addition and non-addition instruction section 381 determines whether or not any pixel remains unprocessed in units of pupil pixel. In a case where any pixel remains unprocessed, the process returns to step S232.

More specifically, until no unprocessed pixel in units of pupil pixel remains, the divided pixels PL and PR are stored in the frame memory 383 as an average of the added divided pixels PL and PR, or stored in the frame memory 383 as pixel values of the divided pixels without change on the basis of information indicating addition or non-addition.

Thereafter, in a case where no unprocessed pixel is considered to remain in step S236, the process proceeds to step S237.

In step S237, images each including the divided pixels PL and PR in an addition state or a non-addition state is output for all the pupil pixels from the frame memory 383 on the basis of the information designating addition or non-addition.

By performing the foregoing process, calculation of the average of pixel values of the divided pixels PL and PR and replacement with the average in a region designated by the user are achieved. Accordingly, a blur can be produced in the region for which addition has been designated.

As a result, a high resolution image can be captured by effectively using respective pixel signals of a plurality of pixels defined by pupil division immediately below a microlens.

6. Execution Example by Software

Meanwhile, a series of processes performed by the image processing units 33 and 191 described above may be executed either by hardware or by software. In a case where the series of processes are executed by software, a program constituting the software is installed from a recording medium into a computer incorporated in dedicated hardware, or a general-purpose personal computer or the like capable of executing various functions under various programs installed into the computer.

Figure 37:
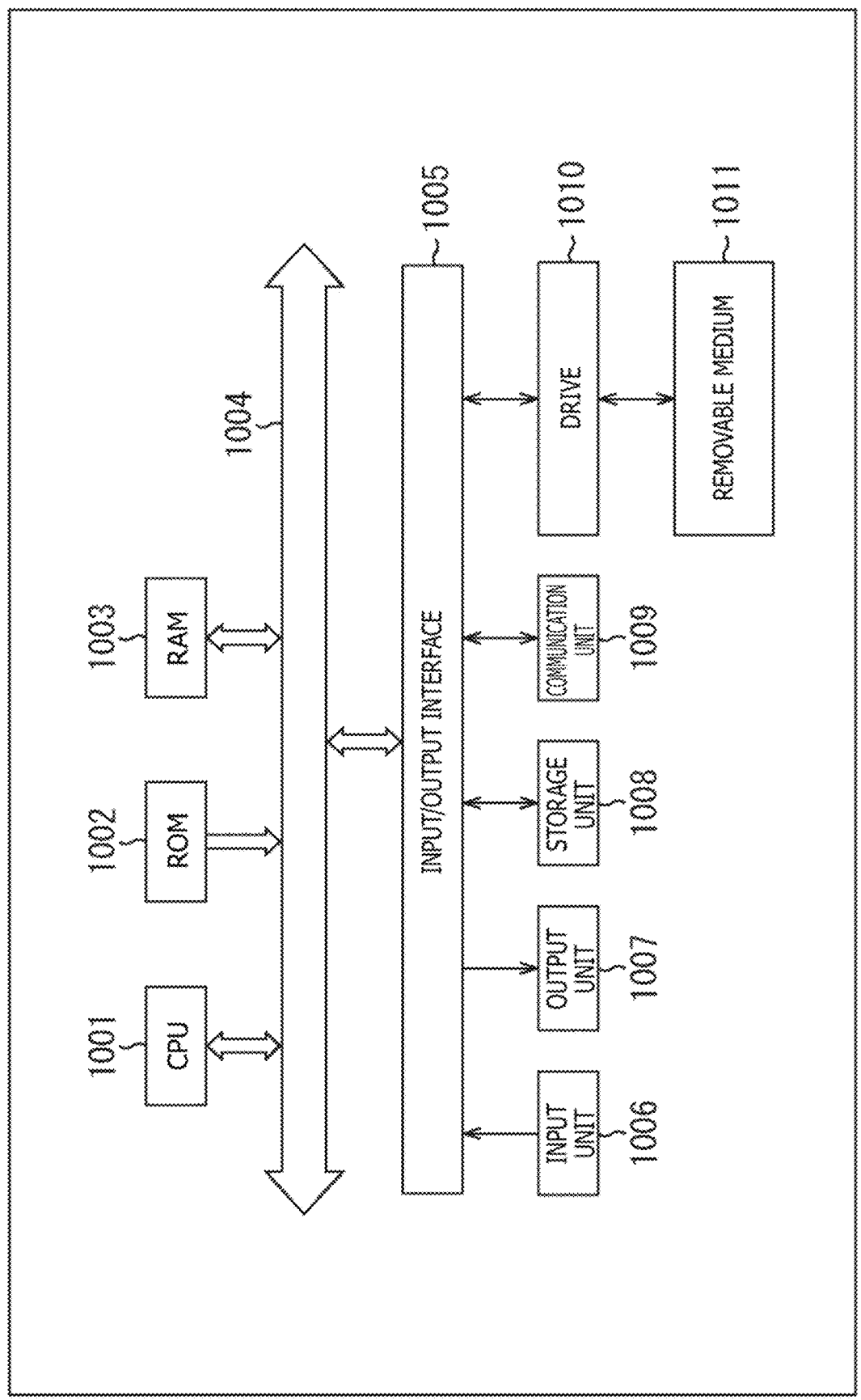
FIG. 37 is a diagram explaining a configuration example of a general-purpose personal computer.

FIG. 37 depicts a configuration example of a general-purpose personal computer. This personal computer includes a built-in CPU (Central Processing Unit) 1001. An input/output interface 1005 is connected to the CPU 1001 via a bus 1004. A ROM (Read Only Memory) 1002 and a RAM (Random Access Memory) 1003 are connected to the bus 1004.

An input unit 1006 including an input device, such as a keyboard and a mouse, through which the user inputs an operation command, an output unit 1007 which outputs a processing operation screen and an image presenting a processing result to a display device, a storage unit 1008 including a hard disk drive and the like for storing programs and various types of data, and a communication unit 1009 including a LAN (Local Area Network) adapter and the like and executing a communication process via a network, typically the Internet, are all connected to the input/output interface 1005. Moreover, a drive 1010 which reads and writes data from and to a removable medium 1011, such as a magnetic disk (including flexible disk), an optical disk (including CD-ROM (Compact Disc-Read Only Memory) and a DVD (Digital Versatile Disc)), a magneto-optical disk (including MD (Mini Disc)), and a semiconductor memory, is connected.

The CPU 1001 executes various types of processes under programs stored in the ROM 1002, or programs read from the removable medium 1011 such as a magnetic disk, an optical disk, a magneto-optical and a semiconductor memory and installed in the storage unit 1008, and loaded from the storage unit 1008 into the RAM 1003. The RAM 1003 also appropriately stores data and the like necessary for executing various types of processes by the CPU 1001.

According to the computer configured as above, the CPU 1001 executes the programs stored in the storage unit 1008 and loaded into the RAM 1003 via the input/output interface 1005 and the bus 1004 to perform the series of processes described above, for example.

The programs executed by the computer (CPU 1001) may be recorded in the removable medium 1011 as a package media or the like, and provided in the form of removable medium 1011. Alternatively, the programs may be provided via a wired or wireless transmission medium, such as a local area network, the Internet, and digital satellite broadcasting.

The programs may be installed from the removable medium 1011 attached to the drive 1010 of the computer into the storage unit 1008 via the input/output interface 1005. Alternatively, the programs may be received by the communication unit 1009 via a wired or wireless transmission medium, and installed into the storage unit 1008. Instead, the programs may be installed in the ROM 1002 or the storage unit 1008 beforehand.

Note that the programs executed by the computer may be programs processed in time series in an order described in the present description, or programs processed in parallel, or at necessary timing such as a call.

Note that the CPU 1001 in FIG. 37 corresponds to the control unit 83, that the input unit 1006 and the output unit 1007 correspond to the imaging unit 81 and the operation unit 86, and that the communication unit 1009 corresponds to the communication unit 85.

In addition, in the present description, a system refers to a group of a plurality of constituent elements (apparatuses, modules (parts) and others). All the constituent elements need not be included in the same housing. Accordingly, a plurality of apparatuses accommodated in separate housings and connected with each other via a network, and one apparatus including a plurality of modules accommodated in one housing are all regarded as systems.

Note that embodiments according to the present disclosure are not limited to the embodiments described above, but may be modified in various manners without departing from the subject matters of the present disclosure.

For example, the present disclosure may have a configuration of cloud computing which has a function shared by a plurality of apparatuses and processed in cooperation with each other via a network.

Moreover, each of the steps described in the above flowcharts may be executed by one apparatus, or shared and executed by a plurality of apparatuses.

Furthermore, in a case where a plurality of processes is included in one step, the plurality of processes included in the one step may be executed by one apparatus, or shared and executed by a plurality of apparatuses.

Note that the present disclosure may also have following configurations.

<1> An imaging apparatus including:

an imaging device that includes a plurality of divided pixels defined by pupil division and captures an image;

a disparity detection section that detects a disparity between the divided pixels in units of pupil; and a processing unit that performs processing for pixel values of the plurality of divided pixels defined by the pupil division, the processing being performed in units of pupil and in accordance with the disparity.

<2> The imaging apparatus according to <1>, in which the processing unit includes an addition section that calculates an average of pixel values of the plurality of divided pixels in units of pupil, and designates the average as an added pixel value, and a pixel value blend processing section that blends a pixel value of the divided pixel and the added pixel value in accordance with the disparity.

<3> The imaging apparatus according to <2>, further including:

a pixel value blend ratio calculation section that calculates a pixel value blend ratio for blending a pixel value of the divided pixel and the added pixel value in accordance with the disparity, in which the pixel value blend processing section blends a pixel value of the divided pixel and the added pixel value at the pixel value blend ratio calculated in accordance with the disparity.

<4> The imaging apparatus according to <3>, in which the pixel value blend ratio calculation section calculates a pixel value blend ratio which increases a proportion of the added pixel value as the disparity increases, and calculates a pixel value blend ratio which increases a proportion of the pixel value of the divided pixel as the disparity decreases.

<5> The imaging apparatus according to <3>, in which the imaging device includes a first imaging device and a second imaging device, the first imaging device including RGB pixels disposed in a predetermined color arrangement in units of pupil, the second imaging device including only white pixels, the disparity detection section includes a first disparity detection section that detects a first disparity in units of pupil on the basis of a pixel value of each of the divided pixels captured by the first imaging device, and a second disparity detection section that detects a second disparity in units of pupil on the basis of a pixel value of each of the divided pixels captured by the second imaging device, the addition section includes a first addition section that adds pixel values of the plurality of divided pixels captured by the first imaging device in units of pupil to designate an average of the added pixel values as a first added pixel value, and a second addition section that adds pixel values of the plurality of divided pixels captured by the second imaging device in units of pupil to designate an average of the added pixel values as a second added pixel value, the pixel value blend processing section includes a first blend processing section that blends a pixel value of the divided pixel captured by the first imaging device and the first added pixel value in accordance with the first disparity, and a second blend processing section that blends a pixel value of the divided pixel captured by the second imaging device and the second added pixel value in accordance with the second disparity, and the processing unit includes a luminance blend processing section that blends a first luminance of a pixel value blended by the first blend processing section and a second luminance of a pixel value blended by the second blend processing section.

<6> The imaging apparatus according to <5>, in which the luminance blend processing section blends the first luminance of the pixel value blended by the first blend processing section and the second luminance of the pixel value blended by the second blend processing section at a predetermined luminance blend ratio.

<7> The imaging apparatus according to <5>, further including:

a luminance blend ratio calculation section that calculates the luminance blend ratio on the basis of the first luminance and the second luminance.

<8> The imaging apparatus according to <7>, in which the luminance blend ratio calculation section includes a difference luminance blend ratio calculation section that calculates a difference luminance blend ratio on the basis of a difference between the first luminance and the second luminance, a dynamic range luminance blend ratio calculation section that calculates a dynamic range luminance blend ratio for the second luminance on the basis of a dynamic range obtained from a maximum value and a minimum value of peripheral pixels of each pixel, and a selection section that selects, as the luminance blend ratio, a smaller ratio from the difference luminance blend ratio and the dynamic range luminance blend ratio <9> The imaging apparatus according to <3>, further including:

an optical unit that collects light that enters the imaging device in a stage preceding the imaging device;

a focus controlling unit that controls a focal position at which the light is collected by controlling the optical unit, and outputs information associated with a position that is a reference of the focal position; and a depth detection unit that detects a depth and generates a depth map, in which the pixel value blend ratio calculation section calculates a pixel blend ratio used for blending the added pixel value and a pixel value of the divided pixel in a region included in the depth map and having a depth substantially equivalent to a depth of the position on the basis of the depth map, the region being such a region where the disparity is considered to be substantially zero.

<10> The imaging apparatus according to any one of <1> to <9>, in which the processing unit includes an estimation section that estimates, on the basis of the disparity, a pixel value of the divided pixel from a sum of products of a coefficient of a predetermined numeral obtained by predetermined learning, and pixel values of respective pixels included in an estimation tap including a pixel group having a predetermined positional relationship with the divided pixel, and the processing unit outputs an estimation result received from the estimation section as a processing result obtained by processing in units of pupil in accordance with the disparity.

<11> The imaging apparatus according to <10>, further including:

a classification section that classifies each of the divided pixels into a class on the basis of a class tap including a pixel group having a predetermined positional relationship with the divided pixel, and a disparity detected by the disparity detection section; and a coefficient set storage section that stores a coefficient set including a predetermined number of the coefficients for each of the classes, in which the estimation section reads the coefficient set corresponding to the class established by the classification section from the coefficient set storage section and estimates a pixel value of the divided pixel on the basis of a sum of products of respective coefficients of the coefficient set and pixel values of respective pixels included in an estimation tap that includes a pixel group having a predetermined positional relationship with the divided pixel.

<12> The imaging apparatus according to <10>, in which
the predetermined learning includes learning that uses a teacher image that is a high resolution image, and a student image generated by warping the teacher image on the basis of the disparity in units of the pupil and lowering image quality of the teacher image, and determines a coefficient such that an error between a pixel value at a pixel position corresponding to the teacher image and a result of a sum of products of the coefficient of the predetermined numeral and pixel values of pixels included in an estimation tap including a pixel group having a predetermined positional relationship with each pixel of the student image becomes statistically minimum.

<13> The imaging apparatus according to any one of <1> to <12>, further including:
a noise removal section that removes noise on the basis of the disparity from pixel values of the plurality of divided pixels processed by the processing unit on the basis of the disparity in units of pupil.

<14> The imaging apparatus according to any one of <1> to <13>, in which
during zooming a part of the image, pixel values of pixels in a range for which the zooming is designated include pixel values of the plurality of divided pixels defined by the pupil division and processed by the processing unit in units of pupil in accordance with the disparity.

<15> The imaging apparatus according to any one of <1> to <14>, in which
the imaging device includes an image surface phase difference type imaging device.

<16> The imaging apparatus according to any one of <1> to <15>, in which
the divided pixel of the imaging device includes a divided pixel defined by pupil division in a horizontal direction.

<17> The imaging apparatus according to any one of <1> to <16>, in which
the imaging device includes a light field camera.

<18> An imaging method including the steps of:
detecting a disparity between a plurality of divided pixels of an imaging device that captures an image, the divided pixels included in the imaging device being defined by pupil division; and
performing processing for pixel values of the plurality of divided pixels defined by the pupil division, the processing being performed in units of pupil and in accordance with the disparity.

<19> An image processing apparatus including:
an imaging device that includes a plurality of divided pixels defined by pupil division and captures an image;
a disparity detection section that detects a disparity between the divided pixels in units of pupil; and
a processing unit that performs processing for pixel values of the plurality of divided pixels defined by the pupil division, the processing being performed in units of pupil and in accordance with the disparity.

<20> An image processing method including the steps of:
detecting a disparity between a plurality of divided pixels of an imaging device that captures an image, the divided pixels included in the imaging device being defined by pupil division; and
performing processing for pixel values of the plurality of divided pixels defined by the pupil division, the processing being performed in units of pupil and in accordance with the disparity.

REFERENCE SIGNS LIST

11 Imaging apparatus, 31, 31-1, 31-2 Optical unit, 32, 32-1, 32-2, 32-2' to 32-2''' Imaging device, 33 Image processing unit, 51 Disparity detection section, 52 determination section, 53 Zoom processing section, 71 Addition section, 72 Frame memory, 73, 73-1, 73-2 Demosaic processing section, 74-1, 74-2 Frame memory, 75 Blend processing section, 91 Noise removal section, 111 AF control unit, 112 Depth detection unit, 121 Determination section, 141 Zoom processing section, 161 Camera simulation processing section, 162 Learning section, 181 Classification section, 182 Coefficient set DB, 183 Estimation section, 184 Frame memory, 201, 201-1, 201-2 L-R Addition section, 202 Disparity detection section, 203 Warp processing section, 204, 204-1, 204-2 Disparity detection section, 205, 205-1, 205-2 Determination section, 206, 206-1, 206-2 Zoom processing section, 207 Fusion processing section, 221 Signal conversion section, 222 Blend processing section, 223 Signal processing section, 224 Frame memory, 225 Blend ratio calculation section, 241 Difference determination section, 242 DR determination section, 251 Difference calculation section, 252 Determination section, 253 Selection section, 261 Maximum and minimum extraction section, 262 Determination section, 301 Beam splitter, 341-1 to 341-8 Disparity detection section, 342 Determination section, 343 Zoom processing section, 381 Focus and non-focus instruction section, 382 L-R addition section, 383 Frame memory

The invention claimed is:

1. An imaging apparatus comprising:
an imaging device that includes a plurality of divided pixels defined by pupil division and captures an image;
a disparity detection section that detects a disparity between the divided pixels in units of pupil; and
a processing unit that performs processing for pixel values of the plurality of divided pixels defined by the pupil division, the processing being performed in units of pupil and in accordance with the disparity,
wherein the processing unit includes
an addition section that calculates an average of pixel values of the plurality of divided pixels in units of pupil, and designates the average as an added pixel value, and
a pixel value blend processing section that blends a pixel value of the divided pixel and the added pixel value in accordance with the disparity, and
wherein the disparity detection section, the processing unit, the addition section, and the pixel value blend processing section are each implemented via at least one processor.

2. The imaging apparatus according to claim 1, further comprising:
a pixel value blend ratio calculation section that calculates a pixel value blend ratio for blending a pixel value of the divided pixel and the added pixel value in accordance with the disparity,
wherein the pixel value blend processing section blends a pixel value of the divided pixel and the added pixel value at the pixel value blend ratio calculated in accordance with the disparity, and
wherein the pixel value blend ration calculation section is implemented via at least one processor.

3. The imaging apparatus according to claim 2, wherein the pixel value blend ratio calculation section calculates a pixel value blend ratio which increases a proportion of the added pixel value as the disparity increases, and calculates a pixel value blend ratio which increases a proportion of the pixel value of the divided pixel as the disparity decreases.

4. The imaging apparatus according to claim 2, wherein the imaging device includes a first imaging device and a second imaging device,
the first imaging device including RGB pixels disposed in a predetermined color arrangement in units of pupil,
the second imaging device including only white pixels,
the disparity detection section includes
a first disparity detection section that detects a first disparity in units of pupil on a basis of a pixel value of each of the divided pixels captured by the first imaging device, and
a second disparity detection section that detects a second disparity in units of pupil on a basis of a pixel value of each of the divided pixels captured by the second imaging device,
the addition section includes
a first addition section that adds pixel values of the plurality of divided pixels captured by the first imaging device in units of pupil to designate an average of the added pixel values as a first added pixel value, and
a second addition section that adds pixel values of the plurality of divided pixels captured by the second imaging device in units of pupil to designate an average of the added pixel values as a second added pixel value,
the pixel value blend processing section includes
a first blend processing section that blends a pixel value of the divided pixel captured by the first imaging device and the first added pixel value in accordance with the first disparity, and
a second blend processing section that blends a pixel value of the divided pixel captured by the second imaging device and the second added pixel value in accordance with the second disparity, and
the processing unit includes
a luminance blend processing section that blends a first luminance of a pixel value blended by the first blend processing section and a second luminance of a pixel value blended by the second blend processing section,
wherein the first disparity detection section, the second disparity detection section, the first addition section, the second addition section, the first blend processing section, the second blend processing section, and the luminance blend processing section are each implemented via at least one processor.

5. The imaging apparatus according to claim 4, wherein the luminance blend processing section blends the first luminance of the pixel value blended by the first blend processing section and the second luminance of the pixel value blended by the second blend processing section at a predetermined luminance blend ratio.

6. The imaging apparatus according to claim 4, further comprising:
a luminance blend ratio calculation section that calculates the luminance blend ratio on a basis of the first luminance and the second luminance,
wherein the luminance blend ratio calculation section is implemented via at least one processor.

7. The imaging apparatus according to claim 6, wherein the luminance blend ratio calculation section includes a difference luminance blend ratio calculation section that calculates a difference luminance blend ratio on a basis of a difference between the first luminance and the second luminance,
a dynamic range luminance blend ratio calculation section that calculates a dynamic range luminance blend ratio for the second luminance on a basis of a dynamic range obtained from a maximum value and a minimum value of peripheral pixels of each pixel, and
a selection section that selects, as the luminance blend ratio, a smaller ratio from the difference luminance blend ratio and the dynamic range luminance blend ratio,
wherein the difference luminance blend ratio calculation section, the dynamic range luminance blend ratio calculation section, and the selection section are each implemented via at least one processor.

8. The imaging apparatus according to claim 2, further comprising:
an optical unit that collects light that enters the imaging device in a stage preceding the imaging device;
a focus controlling unit that controls a focal position at which the light is collected by controlling the optical unit, and outputs information associated with a position that is a reference of the focal position; and
a depth detection unit that detects a depth and generates a depth map, wherein
the pixel value blend ratio calculation section calculates a pixel blend ratio used for blending the added pixel value and a pixel value of the divided pixel in a region included in the depth map and having a depth substantially equivalent to a depth of the position on a basis of the depth map, the region being such a region where the disparity is considered to be substantially zero.

9. The imaging apparatus according to claim 1, wherein the processing unit includes
an estimation section that estimates, on a basis of the disparity, a pixel value of the divided pixel from a sum of products of a coefficient of a predetermined numeral obtained by predetermined learning, and pixel values of respective pixels included in an estimation tap including a pixel group having a predetermined positional relationship with the divided pixel,
the processing unit outputs an estimation result received from the estimation section as a processing result obtained by processing in units of pupil in accordance with the disparity, and
the estimation section is implemented via at least one processor.

10. The imaging apparatus according to claim 9, further comprising:
a classification section that classifies each of the divided pixels into a class on a basis of a class tap including a pixel group having a predetermined positional relationship with the divided pixel, and a disparity detected by the disparity detection section; and
a coefficient set storage section that stores a coefficient set including a predetermined number of the coefficients for each of the classes,
wherein the estimation section reads the coefficient set corresponding to the class established by the classification section from the coefficient set storage section and estimates a pixel value of the divided pixel on a basis of a sum of products of respective coefficients of the coefficient set and pixel values of respective pixels included in an estimation tap that includes a pixel group having a predetermined positional relationship with the divided pixel, and wherein the classification section and the coefficient set storage section are each implemented via at least one processor.

11. The imaging apparatus according to claim 9, wherein the predetermined learning includes learning that uses a teacher image that is a high resolution image, and a student image generated by warping the teacher image on a basis of the disparity in units of the pupil and lowering image quality of the teacher image, and determines a coefficient such that an error between a pixel value at a pixel position corresponding to the teacher image and a result of a sum of products of the coefficient of the predetermined numeral and pixel values of pixels included in an estimation tap including a pixel group having a predetermined positional relationship with each pixel of the student image becomes statistically minimum.

12. The imaging apparatus according to claim 1, further comprising:

a noise removal section that removes noise on a basis of the disparity from pixel values of the plurality of divided pixels processed by the processing unit on a basis of the disparity in units of pupil, wherein the noise removal section is implemented via at least one processor.

13. The imaging apparatus according to claim 1, wherein during zooming a part of the image, pixel values of pixels in a range for which the zooming is designated include pixel values of the plurality of divided pixels defined by the pupil division and processed by the processing unit in units of pupil in accordance with the disparity.

14. The imaging apparatus according to claim 1, wherein the imaging device includes an image surface phase difference type imaging device.

15. The imaging apparatus according to claim 1, wherein the divided pixel of the imaging device includes a divided pixel defined by pupil division in a horizontal direction.

16. The imaging apparatus according to claim 1, wherein the imaging device includes a light field camera.

17. An imaging method comprising the steps of:

detecting a disparity between a plurality of divided pixels of an imaging device that captures an image, the divided pixels included in the imaging device being defined by pupil division; and performing processing for pixel values of the plurality of divided pixels defined by the pupil division, the processing being performed in units of pupil and in accordance with the disparity, wherein the performed processing includes calculating an average of pixel values of the plurality of divided pixels in units of pupil, and designating the average as an added pixel value, and blending a pixel value of the divided pixel and the added pixel value in accordance with the disparity.

18. An image processing apparatus comprising:

an imaging device that includes a plurality of divided pixels defined by pupil division and captures an image;

a disparity detection section that detects a disparity between the divided pixels in units of pupil; and a processing unit that performs processing for pixel values of the plurality of divided pixels defined by the pupil division, the processing being performed in units of pupil and in accordance with the disparity, wherein the processing unit includes an addition section that calculates an average of pixel values of the plurality of divided pixels in units of pupil, and designates the average as an added pixel value, and a pixel value blend processing section that blends a pixel value of the divided pixel and the added pixel value in accordance with the disparity, and wherein the disparity detection section, the processing unit, the addition section, and the pixel value blend processing section are each implemented via at least one processor.

19. An image processing method comprising the steps of:

detecting a disparity between a plurality of divided pixels of an imaging device that captures an image, the divided pixels included in the imaging device being defined by pupil division; and performing processing for pixel values of the plurality of divided pixels defined by the pupil division, the processing being performed in units of pupil and in accordance with the disparity, wherein the performed processing includes calculating an average of pixel values of the plurality of divided pixels in units of pupil, and designating the average as an added pixel value, and blending a pixel value of the divided pixel and the added pixel value in accordance with the disparity.

* * * * *